(12) United States Patent
Lu

(10) Patent No.: US 12,434,068 B2
(45) Date of Patent: Oct. 7, 2025

(54) ACCESSING SPINAL NETWORKS TO ADDRESS SEXUAL DYSFUNCTION

(71) Applicant: The Regents of the University of California, Oakland, CA (US)

(72) Inventor: Daniel C. Lu, Los Angeles, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 16/615,765

(22) PCT Filed: May 22, 2018

(86) PCT No.: PCT/US2018/033942
§ 371 (c)(1),
(2) Date: Nov. 21, 2019

(87) PCT Pub. No.: WO2018/217791
PCT Pub. Date: Nov. 29, 2018

(65) Prior Publication Data
US 2020/0155865 A1  May 21, 2020

Related U.S. Application Data

(60) Provisional application No. 62/510,245, filed on May 23, 2017.

(51) Int. Cl.
*A61N 2/00* (2006.01)
*A61N 2/02* (2006.01)
(52) U.S. Cl.
CPC ............... *A61N 2/006* (2013.01); *A61N 2/02* (2013.01)

(58) Field of Classification Search
CPC .................. A61N 2/006; A61N 2/02
See application file for complete search history.

(56) References Cited

U.S. PATENT DOCUMENTS

| | | | |
|---|---|---|---|
| 2,868,343 | A | 1/1959 | Sproul |
| 3,543,761 | A | 12/1970 | Bradley |
| 3,650,277 | A | 3/1972 | Sjostrand et al. |
| 3,662,758 | A | 5/1972 | Glover |
| 3,724,467 | A | 4/1973 | Avery et al. |
| 4,044,774 | A | 8/1977 | Corbin et al. |
| 4,102,344 | A | 7/1978 | Conway et al. |
| 4,141,365 | A | 2/1979 | Fischell et al. |
| 4,285,347 | A | 8/1981 | Hess |

(Continued)

FOREIGN PATENT DOCUMENTS

| | | |
|---|---|---|
| AU | 2012204526 A1 | 7/2013 |
| CA | 2649663 A1 | 11/2007 |

(Continued)

OTHER PUBLICATIONS

US Office Action dated Apr. 8, 2015 issued in U.S. Appl. No. 14/355,812.

(Continued)

*Primary Examiner* — Christine H Matthews
(74) *Attorney, Agent, or Firm* — Quarles & Brady LLP

(57) ABSTRACT

In various embodiments methods and devices are provided for facilitating sexual function in a subject with a neuromotor disorder. In certain embodiments the methods involve providing magnetic stimulation of the spinal cord at a location, frequency and intensity sufficient to facilitate sexual function.

14 Claims, 6 Drawing Sheets

(56) References Cited

U.S. PATENT DOCUMENTS

| | | |
|---|---|---|
| 4,340,063 A | 7/1982 | Maurer |
| 4,379,462 A | 4/1983 | Borkan et al. |
| 4,398,537 A | 8/1983 | Holmbo |
| 4,414,986 A | 11/1983 | Dickhudt et al. |
| 4,538,624 A | 9/1985 | Tarjan |
| 4,549,556 A | 10/1985 | Tajan et al. |
| 4,559,948 A | 12/1985 | Liss et al. |
| 4,569,352 A | 2/1986 | Petrofsky et al. |
| 4,573,481 A | 3/1986 | Bullara et al. |
| 4,724,842 A | 2/1988 | Charters |
| 4,800,898 A | 1/1989 | Hess et al. |
| 4,934,368 A | 6/1990 | Lynch |
| 4,969,452 A | 11/1990 | Petrofsky et al. |
| 5,002,053 A | 3/1991 | Garcia-Rill et al. |
| 5,031,618 A | 7/1991 | Mullett |
| 5,066,272 A | 11/1991 | Eaton et al. |
| 5,081,989 A | 1/1992 | Graupe et al. |
| 5,121,754 A | 6/1992 | Mullett |
| 5,344,439 A | 9/1994 | Otten |
| 5,354,320 A | 10/1994 | Schaldach et al. |
| 5,366,813 A | 11/1994 | Berlin |
| 5,374,285 A | 12/1994 | Vaiani et al. |
| 5,417,719 A | 5/1995 | Hull et al. |
| 5,476,441 A | 12/1995 | Durfee et al. |
| 5,562,718 A | 10/1996 | Palermo |
| 5,643,330 A | 7/1997 | Holsheimer et al. |
| 5,733,322 A | 3/1998 | Starkebaum |
| 5,983,141 A | 11/1999 | Sluijter et al. |
| 6,058,331 A | 5/2000 | King |
| 6,066,163 A | 5/2000 | John |
| 6,104,957 A | 8/2000 | Alo et al. |
| 6,122,548 A | 9/2000 | Starkebaum et al. |
| 6,308,103 B1 | 10/2001 | Gielen |
| 6,319,241 B1 | 11/2001 | King et al. |
| 6,463,327 B1 | 10/2002 | Lurie et al. |
| 6,470,213 B1 | 10/2002 | Alley |
| 6,500,110 B1 | 12/2002 | Davey et al. |
| 6,503,231 B1 | 1/2003 | Prausnitz et al. |
| 6,505,074 B2 | 1/2003 | Boveja et al. |
| 6,516,227 B1 | 2/2003 | Meadows et al. |
| 6,551,849 B1 | 4/2003 | Kenney |
| 6,587,724 B2 | 7/2003 | Mann |
| 6,662,053 B2 | 12/2003 | Borkan |
| 6,666,831 B1 | 12/2003 | Edgerton et al. |
| 6,685,729 B2 | 2/2004 | Gonzalez |
| 6,748,276 B1 | 6/2004 | Daignault, Jr. et al. |
| 6,819,956 B2 | 11/2004 | DiLorenzo |
| 6,839,594 B2 | 1/2005 | Cohen et al. |
| 6,862,479 B1 | 3/2005 | Whitehurst et al. |
| 6,871,099 B1 | 3/2005 | Whitehurst et al. |
| 6,878,112 B2 | 4/2005 | Linberg et al. |
| 6,892,098 B2 | 5/2005 | Ayal et al. |
| 6,895,280 B2 | 5/2005 | Meadows et al. |
| 6,895,283 B2 | 5/2005 | Erickson et al. |
| 6,937,891 B2 | 8/2005 | Leinders et al. |
| 6,950,706 B2 | 9/2005 | Rodriguez et al. |
| 6,975,907 B2 | 12/2005 | Zanakis et al. |
| 6,988,006 B2 | 1/2006 | King et al. |
| 6,999,820 B2 | 2/2006 | Jordan |
| 7,020,521 B1 | 3/2006 | Brewer et al. |
| 7,024,247 B2 | 4/2006 | Gliner et al. |
| 7,035,690 B2 | 4/2006 | Goetz |
| 7,047,084 B2 | 5/2006 | Erickson et al. |
| 7,065,408 B2 | 6/2006 | Herman et al. |
| 7,096,070 B1 | 8/2006 | Jenkins et al. |
| 7,110,820 B2 | 9/2006 | Tcheng et al. |
| 7,127,287 B2 | 10/2006 | Duncan et al. |
| 7,127,296 B2 | 10/2006 | Bradley |
| 7,127,297 B2 | 10/2006 | Law et al. |
| 7,149,773 B2 | 12/2006 | Haller et al. |
| 7,153,242 B2 | 12/2006 | Goffer |
| 7,184,837 B2 | 2/2007 | Goetz |
| 7,200,443 B2 | 4/2007 | Faul |
| 7,209,787 B2 | 4/2007 | DiLorenzo |
| 7,228,179 B2 | 6/2007 | Campen et al. |
| 7,239,920 B1 | 7/2007 | Thacker et al. |
| 7,251,529 B2 | 7/2007 | Greenwood-Van Meerveld |
| 7,252,090 B2 | 8/2007 | Goetz |
| 7,313,440 B2 | 12/2007 | Miesel et al. |
| 7,324,853 B2 | 1/2008 | Ayal et al. |
| 7,330,760 B2 | 2/2008 | Heruth et al. |
| 7,337,005 B2 | 2/2008 | Kim et al. |
| 7,337,006 B2 | 2/2008 | Kim et al. |
| 7,340,298 B1 | 3/2008 | Barbut |
| 7,381,192 B2 | 6/2008 | Brodard et al. |
| 7,415,309 B2 | 8/2008 | Mcintyre |
| 7,463,927 B1 | 12/2008 | Chaouat |
| 7,463,928 B2 | 12/2008 | Lee et al. |
| 7,467,016 B2 | 12/2008 | Colborn |
| 7,493,170 B1 | 2/2009 | Segel et al. |
| 7,496,404 B2 | 2/2009 | Meadows et al. |
| 7,502,652 B2 | 3/2009 | Gaunt et al. |
| 7,536,226 B2 | 5/2009 | Williams et al. |
| 7,544,185 B2 | 6/2009 | Bengtsson |
| 7,584,000 B2 | 9/2009 | Erickson |
| 7,590,454 B2 | 9/2009 | Garabedian et al. |
| 7,603,178 B2 | 10/2009 | North et al. |
| 7,620,502 B2 | 11/2009 | Selifonov et al. |
| 7,628,750 B2 | 12/2009 | Cohen et al. |
| 7,647,115 B2 | 1/2010 | Levin et al. |
| 7,660,636 B2 | 2/2010 | Castel et al. |
| 7,697,995 B2 | 4/2010 | Cross et al. |
| 7,725,193 B1 | 5/2010 | Chu |
| 7,729,781 B2 | 6/2010 | Swoyer et al. |
| 7,734,340 B2 | 6/2010 | De Ridder |
| 7,734,351 B2 | 6/2010 | Testerman et al. |
| 7,742,037 B2 | 6/2010 | Sako et al. |
| 7,769,463 B2 | 8/2010 | Katsnelson |
| 7,797,057 B2 | 9/2010 | Harris |
| 7,801,601 B2 | 9/2010 | Maschino et al. |
| 7,813,803 B2 | 10/2010 | Heruth et al. |
| 7,813,809 B2 | 10/2010 | Strother et al. |
| 7,840,270 B2 | 11/2010 | Ignagni et al. |
| 7,856,264 B2 | 12/2010 | Firlik et al. |
| 7,877,146 B2 | 1/2011 | Rezai et al. |
| 7,890,182 B2 | 2/2011 | Parramon et al. |
| 7,949,395 B2 | 5/2011 | Kuzma |
| 7,949,403 B2 | 5/2011 | Palermo et al. |
| 7,987,000 B2 | 7/2011 | Moffitt et al. |
| 7,991,465 B2 | 8/2011 | Bartic et al. |
| 8,019,427 B2 | 9/2011 | Moffitt |
| 8,050,773 B2 | 11/2011 | Zhu |
| 8,108,051 B2 | 1/2012 | Cross, Jr. et al. |
| 8,108,052 B2 | 1/2012 | Boling |
| 8,131,358 B2 | 3/2012 | Moffitt et al. |
| 8,135,473 B2 | 3/2012 | Miesel et al. |
| 8,155,750 B2 | 4/2012 | Jaax et al. |
| 8,168,481 B2 | 5/2012 | Hanaoka et al. |
| 8,170,660 B2 | 5/2012 | Dacey, Jr. et al. |
| 8,190,262 B2 | 5/2012 | Gerber et al. |
| 8,195,304 B2 | 6/2012 | Strother et al. |
| 8,214,048 B1 | 7/2012 | Whitehurst et al. |
| 8,229,565 B2 | 7/2012 | Kim et al. |
| 8,239,038 B2 | 8/2012 | Wolf, II |
| 8,260,436 B2 | 9/2012 | Gerber et al. |
| 8,271,099 B1 | 9/2012 | Swanson |
| 8,295,936 B2 | 10/2012 | Wahlstrand et al. |
| 8,311,644 B2 | 11/2012 | Moffitt et al. |
| 8,326,569 B2 | 12/2012 | Lee et al. |
| 8,332,029 B2 | 12/2012 | Glukhovsky et al. |
| 8,332,047 B2 | 12/2012 | Libbus et al. |
| 8,346,366 B2 | 1/2013 | Arle et al. |
| 8,352,036 B2 | 1/2013 | DiMarco et al. |
| 8,355,791 B2 | 1/2013 | Moffitt |
| 8,355,797 B2 | 1/2013 | Caparso et al. |
| 8,364,273 B2 | 1/2013 | De Ridder |
| 8,369,961 B2 | 2/2013 | Christman et al. |
| 8,374,696 B2 | 2/2013 | Sanchez et al. |
| 8,412,345 B2 | 4/2013 | Moffitt |
| 8,428,728 B2 | 4/2013 | Sachs |
| 8,442,655 B2 | 5/2013 | Moffitt et al. |
| 8,452,406 B2 | 5/2013 | Arcot-Krishmamurthy et al. |
| 8,543,200 B2 | 9/2013 | Lane et al. |
| 8,588,884 B2 | 11/2013 | Hegde et al. |

(56) References Cited

U.S. PATENT DOCUMENTS

| | | | |
|---|---|---|---|
| 8,700,145 B2 | 4/2014 | Kilgard et al. |
| 8,712,546 B2 | 4/2014 | Kim et al. |
| 8,740,825 B2 | 6/2014 | Ehrenreich et al. |
| 8,750,957 B2 | 6/2014 | Tang et al. |
| 8,768,481 B2 | 7/2014 | Lane |
| 8,805,542 B2 | 8/2014 | Tai et al. |
| 9,072,891 B1 | 7/2015 | Rao |
| 9,079,039 B2 | 7/2015 | Carlson et al. |
| 9,101,769 B2 | 8/2015 | Edgerton et al. |
| 9,205,259 B2 | 12/2015 | Kim et al. |
| 9,205,260 B2 | 12/2015 | Kim et al. |
| 9,205,261 B2 | 12/2015 | Kim et al. |
| 9,248,291 B2 | 2/2016 | Mashiach |
| 9,272,139 B2 | 3/2016 | Hamilton et al. |
| 9,272,143 B2 | 3/2016 | Libbus et al. |
| 9,283,391 B2 | 3/2016 | Ahmed |
| 9,314,630 B2 | 4/2016 | Levin et al. |
| 9,393,409 B2 | 7/2016 | Edgerton et al. |
| 9,409,023 B2 | 8/2016 | Burdick et al. |
| 9,415,218 B2 | 8/2016 | Edgerton et al. |
| 9,421,365 B2 | 8/2016 | Sumners et al. |
| 9,597,517 B2 | 3/2017 | Moffitt |
| 9,610,442 B2 | 4/2017 | Yoo et al. |
| 9,802,052 B2 | 10/2017 | Marnfeldt |
| 9,895,545 B2 | 2/2018 | Rao et al. |
| 9,993,642 B2 | 6/2018 | Gerasimenko et al. |
| 10,092,750 B2 | 10/2018 | Edgerton et al. |
| 10,124,166 B2 | 11/2018 | Edgerton et al. |
| 10,137,299 B2 | 11/2018 | Lu et al. |
| 10,449,371 B2 | 10/2019 | Serrano Carmona |
| 10,751,533 B2 | 8/2020 | Edgerton et al. |
| 10,773,074 B2 | 9/2020 | Liu et al. |
| 10,806,927 B2 | 10/2020 | Edgerton et al. |
| 10,806,935 B2 | 10/2020 | Rao et al. |
| 11,097,122 B2 | 8/2021 | Lu |
| 11,123,312 B2 | 9/2021 | Lu et al. |
| 11,266,850 B2 * | 3/2022 | Prouza ............... A61N 2/02 |
| 11,400,284 B2 | 8/2022 | Gerasimenko et al. |
| 2001/0016266 A1 | 8/2001 | Okazaki et al. |
| 2001/0032992 A1 | 10/2001 | Wendt |
| 2002/0042814 A1 | 4/2002 | Fukasawa et al. |
| 2002/0052539 A1 | 5/2002 | Haller et al. |
| 2002/0055779 A1 | 5/2002 | Andrews |
| 2002/0083240 A1 | 6/2002 | Hoese et al. |
| 2002/0111661 A1 | 8/2002 | Cross et al. |
| 2002/0115945 A1 | 8/2002 | Herman et al. |
| 2002/0188332 A1 | 12/2002 | Lurie et al. |
| 2002/0193843 A1 | 12/2002 | Hill et al. |
| 2003/0032992 A1 | 2/2003 | Thacker et al. |
| 2003/0078633 A1 | 4/2003 | Firlik et al. |
| 2003/0093021 A1 | 5/2003 | Goffer |
| 2003/0093131 A1 | 5/2003 | Loeb et al. |
| 2003/0100933 A1 | 5/2003 | Ayal et al. |
| 2003/0114894 A1 | 6/2003 | Dar et al. |
| 2003/0158583 A1 | 8/2003 | Burnett et al. |
| 2003/0220679 A1 | 11/2003 | Han |
| 2003/0233137 A1 | 12/2003 | Paul, Jr. |
| 2004/0039425 A1 | 2/2004 | Greenwood-Van Meerveld |
| 2004/0044380 A1 | 3/2004 | Bruninga et al. |
| 2004/0111118 A1 | 6/2004 | Hill et al. |
| 2004/0111126 A1 | 6/2004 | Tanagho et al. |
| 2004/0122483 A1 | 6/2004 | Nathan et al. |
| 2004/0127954 A1 | 7/2004 | McDonald, III |
| 2004/0133248 A1 | 7/2004 | Frei et al. |
| 2004/0138518 A1 | 7/2004 | Rise et al. |
| 2004/0172027 A1 | 9/2004 | Speitling et al. |
| 2004/0172097 A1 | 9/2004 | Brodard et al. |
| 2004/0181263 A1 | 9/2004 | Balzer et al. |
| 2004/0267320 A1 | 12/2004 | Taylor et al. |
| 2005/0004622 A1 | 1/2005 | Cullen et al. |
| 2005/0061315 A1 | 3/2005 | Lee et al. |
| 2005/0070982 A1 | 3/2005 | Heruth et al. |
| 2005/0075669 A1 | 4/2005 | King |
| 2005/0075678 A1 | 4/2005 | Faul |
| 2005/0090756 A1 | 4/2005 | Wolf et al. |
| 2005/0101827 A1 * | 5/2005 | Delisle ............... A61N 2/02<br>600/13 |
| 2005/0102007 A1 | 5/2005 | Ayal et al. |
| 2005/0113882 A1 | 5/2005 | Cameron et al. |
| 2005/0119713 A1 | 6/2005 | Whitehurst et al. |
| 2005/0125045 A1 | 6/2005 | Brighton et al. |
| 2005/0209655 A1 | 9/2005 | Bradley et al. |
| 2005/0231186 A1 | 10/2005 | Saavedra Barrera et al. |
| 2005/0246004 A1 | 11/2005 | Cameron et al. |
| 2005/0277999 A1 | 12/2005 | Strother et al. |
| 2005/0278000 A1 | 12/2005 | Strother et al. |
| 2006/0003090 A1 | 1/2006 | Rodger et al. |
| 2006/0015153 A1 | 1/2006 | Gliner et al. |
| 2006/0018360 A1 | 1/2006 | Tai et al. |
| 2006/0041225 A1 | 2/2006 | Wallace et al. |
| 2006/0041295 A1 | 2/2006 | Osypka |
| 2006/0089696 A1 | 4/2006 | Olsen et al. |
| 2006/0100671 A1 | 5/2006 | Ridder |
| 2006/0111754 A1 | 5/2006 | Rezai et al. |
| 2006/0122678 A1 | 6/2006 | Olsen et al. |
| 2006/0142337 A1 | 6/2006 | Ikeura et al. |
| 2006/0142816 A1 | 6/2006 | Fruitman et al. |
| 2006/0142822 A1 | 6/2006 | Tulgar |
| 2006/0149333 A1 | 7/2006 | Tanagho et al. |
| 2006/0149337 A1 | 7/2006 | John |
| 2006/0189839 A1 * | 8/2006 | Laniado ............ A61N 2/004<br>600/14 |
| 2006/0195153 A1 | 8/2006 | DiUbaldi et al. |
| 2006/0239482 A1 | 10/2006 | Hatoum |
| 2006/0241356 A1 | 10/2006 | Flaherty |
| 2006/0282127 A1 | 12/2006 | Zealear |
| 2007/0004567 A1 | 1/2007 | Shetty et al. |
| 2007/0016097 A1 | 1/2007 | Farquhar et al. |
| 2007/0016266 A1 | 1/2007 | Paul, Jr. |
| 2007/0016329 A1 | 1/2007 | Herr et al. |
| 2007/0021513 A1 | 1/2007 | Agee et al. |
| 2007/0027495 A1 | 2/2007 | Gerber |
| 2007/0047852 A1 | 3/2007 | Sharp et al. |
| 2007/0049814 A1 | 3/2007 | Muccio |
| 2007/0055337 A1 | 3/2007 | Tanrisever |
| 2007/0060954 A1 | 3/2007 | Cameron et al. |
| 2007/0060980 A1 | 3/2007 | Strother et al. |
| 2007/0067003 A1 | 3/2007 | Sanchez et al. |
| 2007/0073357 A1 | 3/2007 | Rooney et al. |
| 2007/0083240 A1 | 4/2007 | Peterson et al. |
| 2007/0100389 A1 | 5/2007 | Jaax et al. |
| 2007/0121702 A1 | 5/2007 | LaGuardia et al. |
| 2007/0121709 A1 | 5/2007 | Ittogi |
| 2007/0142874 A1 | 6/2007 | John |
| 2007/0150023 A1 | 6/2007 | Ignagni et al. |
| 2007/0150034 A1 | 6/2007 | Rooney et al. |
| 2007/0156172 A1 | 7/2007 | Alvarado |
| 2007/0156179 A1 | 7/2007 | Karashurov |
| 2007/0156200 A1 | 7/2007 | Kornet et al. |
| 2007/0168008 A1 | 7/2007 | Olsen |
| 2007/0179534 A1 | 8/2007 | Firlik et al. |
| 2007/0179579 A1 | 8/2007 | Feler et al. |
| 2007/0191709 A1 | 8/2007 | Swanson |
| 2007/0208381 A1 | 9/2007 | Hill et al. |
| 2007/0233204 A1 | 10/2007 | Lima et al. |
| 2007/0255372 A1 | 11/2007 | Metzler et al. |
| 2007/0265621 A1 | 11/2007 | Matthis et al. |
| 2007/0265679 A1 | 11/2007 | Bradley et al. |
| 2007/0265691 A1 | 11/2007 | Swanson |
| 2007/0276449 A1 | 11/2007 | Gunter et al. |
| 2007/0276450 A1 | 11/2007 | Meadows et al. |
| 2007/0293910 A1 | 12/2007 | Strother et al. |
| 2008/0002227 A1 | 1/2008 | Tsujimoto |
| 2008/0004674 A1 | 1/2008 | King et al. |
| 2008/0009927 A1 | 1/2008 | Vilims |
| 2008/0021513 A1 | 1/2008 | Thacker et al. |
| 2008/0027346 A1 | 1/2008 | Litt et al. |
| 2008/0046049 A1 | 2/2008 | Skubitz et al. |
| 2008/0051851 A1 | 2/2008 | Lin |
| 2008/0071325 A1 | 3/2008 | Bradley |
| 2008/0077192 A1 | 3/2008 | Harry et al. |
| 2008/0103579 A1 | 5/2008 | Gerber |
| 2008/0105185 A1 | 5/2008 | Kuhlman |
| 2008/0140152 A1 | 6/2008 | Imran et al. |

(56) References Cited

U.S. PATENT DOCUMENTS

| | | |
|---|---|---|
| 2008/0140162 A1 | 6/2008 | Goetz et al. |
| 2008/0140169 A1 | 6/2008 | Imran |
| 2008/0147143 A1 | 6/2008 | Popovic et al. |
| 2008/0154329 A1 | 6/2008 | Pyles et al. |
| 2008/0183224 A1 | 7/2008 | Barolat |
| 2008/0200749 A1 | 8/2008 | Zheng et al. |
| 2008/0202940 A1 | 8/2008 | Jiang et al. |
| 2008/0207985 A1 | 8/2008 | Farone |
| 2008/0208287 A1 | 8/2008 | Palermo et al. |
| 2008/0215113 A1 | 9/2008 | Pawlowicz |
| 2008/0221653 A1 | 9/2008 | Agrawal et al. |
| 2008/0224226 A1 | 9/2008 | Suzuki et al. |
| 2008/0228241 A1 | 9/2008 | Sachs |
| 2008/0228250 A1 | 9/2008 | Mironer |
| 2008/0234121 A1 | 9/2008 | Kim et al. |
| 2008/0234791 A1 | 9/2008 | Arle et al. |
| 2008/0279896 A1 | 11/2008 | Heinen et al. |
| 2008/0294211 A1 | 11/2008 | Moffitt |
| 2009/0012436 A1 | 1/2009 | Lanfermann et al. |
| 2009/0024997 A1 | 1/2009 | Kobayashi |
| 2009/0093854 A1 | 4/2009 | Leung et al. |
| 2009/0112281 A1 | 4/2009 | Miyazawa et al. |
| 2009/0118365 A1 | 5/2009 | Benson, III et al. |
| 2009/0131995 A1 | 5/2009 | Sloan et al. |
| 2009/0157141 A1 | 6/2009 | Chiao et al. |
| 2009/0198305 A1 | 8/2009 | Naroditsky et al. |
| 2009/0204173 A1 | 8/2009 | Fang et al. |
| 2009/0229166 A1 | 9/2009 | Sawrie |
| 2009/0270960 A1 | 10/2009 | Zhao et al. |
| 2009/0281529 A1 | 11/2009 | Carriazo |
| 2009/0281599 A1 | 11/2009 | Thacker et al. |
| 2009/0293270 A1 | 12/2009 | Brindley et al. |
| 2009/0299166 A1 | 12/2009 | Nishida et al. |
| 2009/0299167 A1 | 12/2009 | Seymour |
| 2009/0306491 A1 | 12/2009 | Haggers |
| 2010/0004715 A1 | 1/2010 | Fahey |
| 2010/0010646 A1 | 1/2010 | Drew et al. |
| 2010/0023103 A1 | 1/2010 | Elborno |
| 2010/0029040 A1 | 2/2010 | Nomoto |
| 2010/0042193 A1 | 2/2010 | Slavin |
| 2010/0070007 A1 | 3/2010 | Parker et al. |
| 2010/0114205 A1 | 5/2010 | Donofrio et al. |
| 2010/0114239 A1 | 5/2010 | McDonald et al. |
| 2010/0125313 A1 | 5/2010 | Lee et al. |
| 2010/0137938 A1 | 6/2010 | Kishawi et al. |
| 2010/0145428 A1 | 6/2010 | Cameron et al. |
| 2010/0152811 A1 | 6/2010 | Flaherty |
| 2010/0166546 A1 | 7/2010 | Mahan et al. |
| 2010/0168820 A1 | 7/2010 | Maniak et al. |
| 2010/0185253 A1 | 7/2010 | Dimarco et al. |
| 2010/0198298 A1 | 8/2010 | Glukhovsky et al. |
| 2010/0217355 A1 | 8/2010 | Tass et al. |
| 2010/0228310 A1 | 9/2010 | Shuros et al. |
| 2010/0241191 A1 | 9/2010 | Testerman et al. |
| 2010/0268299 A1 | 10/2010 | Farone |
| 2010/0274312 A1 | 10/2010 | Alataris et al. |
| 2010/0280570 A1 | 11/2010 | Sturm et al. |
| 2010/0305660 A1 | 12/2010 | Hegi et al. |
| 2010/0312304 A1 | 12/2010 | York et al. |
| 2010/0318168 A1 | 12/2010 | Bighetti |
| 2010/0331925 A1 | 12/2010 | Peterson |
| 2011/0006793 A1 | 1/2011 | Peschke et al. |
| 2011/0009919 A1 | 1/2011 | Carbunaru et al. |
| 2011/0016081 A1 | 1/2011 | Basak et al. |
| 2011/0029040 A1 | 2/2011 | Walker et al. |
| 2011/0029044 A1 | 2/2011 | Hyde et al. |
| 2011/0034277 A1 | 2/2011 | Brandes |
| 2011/0034977 A1 | 2/2011 | Janik et al. |
| 2011/0040349 A1 | 2/2011 | Graupe |
| 2011/0054567 A1 | 3/2011 | Lane et al. |
| 2011/0054568 A1 | 3/2011 | Lane et al. |
| 2011/0054570 A1 | 3/2011 | Lane |
| 2011/0054579 A1 | 3/2011 | Kumar et al. |
| 2011/0077660 A1 | 3/2011 | Janik et al. |
| 2011/0082515 A1 | 4/2011 | Libbus et al. |
| 2011/0084489 A1 | 4/2011 | Kaplan |
| 2011/0093043 A1 | 4/2011 | Torgerson et al. |
| 2011/0112601 A1 | 5/2011 | Meadows et al. |
| 2011/0125203 A1 | 5/2011 | Simon et al. |
| 2011/0130804 A1 | 6/2011 | Lin et al. |
| 2011/0152967 A1 | 6/2011 | Simon et al. |
| 2011/0160810 A1 | 6/2011 | Griffith |
| 2011/0166546 A1 | 7/2011 | Jaax et al. |
| 2011/0184482 A1 | 7/2011 | Eberman et al. |
| 2011/0184488 A1 | 7/2011 | De Ridder |
| 2011/0184489 A1 | 7/2011 | Nicolelis et al. |
| 2011/0202107 A1 | 8/2011 | Sunagawa et al. |
| 2011/0208265 A1 | 8/2011 | Erickson et al. |
| 2011/0213266 A1 | 9/2011 | Williams et al. |
| 2011/0218590 A1 | 9/2011 | DeGiorgio et al. |
| 2011/0218594 A1 | 9/2011 | Doran et al. |
| 2011/0224153 A1 | 9/2011 | Levitt et al. |
| 2011/0224665 A1 | 9/2011 | Crosby et al. |
| 2011/0224752 A1 | 9/2011 | Rolston et al. |
| 2011/0224753 A1 | 9/2011 | Palermo et al. |
| 2011/0224757 A1 | 9/2011 | Zdeblick et al. |
| 2011/0230101 A1 | 9/2011 | Tang et al. |
| 2011/0230701 A1 | 9/2011 | Simon et al. |
| 2011/0230702 A1 | 9/2011 | Honour |
| 2011/0231326 A1 | 9/2011 | Marino |
| 2011/0237221 A1 | 9/2011 | Prakash et al. |
| 2011/0237921 A1 | 9/2011 | Askin, III et al. |
| 2011/0245734 A1 | 10/2011 | Wagner et al. |
| 2011/0276107 A1 | 11/2011 | Simon et al. |
| 2011/0288609 A1 | 11/2011 | Tehrani et al. |
| 2011/0295100 A1 | 12/2011 | Rolston et al. |
| 2012/0006793 A1 | 1/2012 | Swanson |
| 2012/0011222 A1 | 1/2012 | Yasukawa et al. |
| 2012/0011950 A1 | 1/2012 | Kracke |
| 2012/0013041 A1 | 1/2012 | Cao et al. |
| 2012/0013126 A1 | 1/2012 | Molloy |
| 2012/0016448 A1 | 1/2012 | Lee |
| 2012/0029528 A1 | 2/2012 | Macdonald et al. |
| 2012/0035684 A1 | 2/2012 | Thompson et al. |
| 2012/0041518 A1 | 2/2012 | Kim et al. |
| 2012/0052432 A1 | 3/2012 | Matsuura |
| 2012/0053645 A1 | 3/2012 | Ayanoor-Vitikkate et al. |
| 2012/0071250 A1 | 3/2012 | O'Neil et al. |
| 2012/0071950 A1 | 3/2012 | Archer |
| 2012/0083709 A1 | 4/2012 | Parker et al. |
| 2012/0101326 A1 | 4/2012 | Simon et al. |
| 2012/0109251 A1 | 5/2012 | Lebedev et al. |
| 2012/0109295 A1 | 5/2012 | Fan |
| 2012/0116476 A1 | 5/2012 | Kothandaraman |
| 2012/0123223 A1 | 5/2012 | Freeman et al. |
| 2012/0123293 A1 | 5/2012 | Shah et al. |
| 2012/0126392 A1 | 5/2012 | Kalvesten et al. |
| 2012/0136408 A1 | 5/2012 | Grill et al. |
| 2012/0165899 A1 | 6/2012 | Gliner |
| 2012/0172222 A1 | 7/2012 | Artigas Puerto |
| 2012/0172246 A1 | 7/2012 | Nguyen et al. |
| 2012/0172946 A1 | 7/2012 | Altaris et al. |
| 2012/0179222 A1 | 7/2012 | Jaax et al. |
| 2012/0185020 A1 | 7/2012 | Simon et al. |
| 2012/0197338 A1 | 8/2012 | Su et al. |
| 2012/0203055 A1* | 8/2012 | Pletnev .......... A61N 2/002 600/14 |
| 2012/0203131 A1 | 8/2012 | DiLorenzo |
| 2012/0221073 A1 | 8/2012 | Southwell et al. |
| 2012/0232615 A1 | 9/2012 | Barolat et al. |
| 2012/0252874 A1 | 10/2012 | Feinstein et al. |
| 2012/0259380 A1 | 10/2012 | Pyles |
| 2012/0265006 A1* | 10/2012 | Makower .......... A61B 17/0401 600/38 |
| 2012/0271372 A1 | 10/2012 | Osorio |
| 2012/0277824 A1 | 11/2012 | Li |
| 2012/0277834 A1 | 11/2012 | Mercanzini et al. |
| 2012/0283697 A1 | 11/2012 | Kim et al. |
| 2012/0283797 A1 | 11/2012 | De Ridder |
| 2012/0302821 A1 | 11/2012 | Burnett |
| 2012/0310305 A1 | 12/2012 | Kaula et al. |
| 2012/0310315 A1 | 12/2012 | Savage et al. |
| 2012/0330321 A1 | 12/2012 | Johnson et al. |
| 2012/0330391 A1 | 12/2012 | Bradley et al. |

(56) References Cited

U.S. PATENT DOCUMENTS

| | | |
|---|---|---|
| 2013/0012853 A1 | 1/2013 | Brown |
| 2013/0013041 A1 | 1/2013 | Glukhovsky et al. |
| 2013/0026640 A1 | 1/2013 | Ito et al. |
| 2013/0030312 A1 | 1/2013 | Keel et al. |
| 2013/0030319 A1 | 1/2013 | Hettrick et al. |
| 2013/0030501 A1 | 1/2013 | Feler et al. |
| 2013/0035745 A1 | 2/2013 | Ahmed et al. |
| 2013/0053734 A1 | 2/2013 | Barriskill et al. |
| 2013/0053922 A1 | 2/2013 | Ahmed et al. |
| 2013/0066392 A1 | 3/2013 | Simon et al. |
| 2013/0066411 A1 | 3/2013 | Thacker et al. |
| 2013/0085317 A1 | 4/2013 | Feinstein |
| 2013/0085361 A1 | 4/2013 | Mercanzini et al. |
| 2013/0096640 A1 | 4/2013 | Possover |
| 2013/0096661 A1 | 4/2013 | Greenberg et al. |
| 2013/0096662 A1 | 4/2013 | Swanson |
| 2013/0110196 A1 | 5/2013 | Alataris et al. |
| 2013/0116751 A1 | 5/2013 | Moffitt et al. |
| 2013/0123568 A1 | 5/2013 | Hamilton et al. |
| 2013/0123659 A1 | 5/2013 | Bartol et al. |
| 2013/0138167 A1 | 5/2013 | Bradley et al. |
| 2013/0165991 A1 | 6/2013 | Kim et al. |
| 2013/0197408 A1 | 8/2013 | Goldfarb et al. |
| 2013/0204324 A1 | 8/2013 | Thacker et al. |
| 2013/0211477 A1 | 8/2013 | Cullen et al. |
| 2013/0237948 A1 | 9/2013 | Donders et al. |
| 2013/0253222 A1 | 9/2013 | Nakao |
| 2013/0253229 A1 | 9/2013 | Sawant et al. |
| 2013/0253299 A1 | 9/2013 | Weber et al. |
| 2013/0253611 A1 | 9/2013 | Lee et al. |
| 2013/0268016 A1 | 10/2013 | Xi et al. |
| 2013/0268021 A1 | 10/2013 | Moffitt |
| 2013/0281890 A1 | 10/2013 | Mishelevich |
| 2013/0289446 A1 | 10/2013 | Stone et al. |
| 2013/0289664 A1 | 10/2013 | Johanek |
| 2013/0289667 A1 | 10/2013 | Wacnik et al. |
| 2013/0296965 A1 | 11/2013 | Mokelke et al. |
| 2013/0303873 A1 | 11/2013 | Voros et al. |
| 2013/0304159 A1 | 11/2013 | Simon et al. |
| 2013/0310211 A1 | 11/2013 | Wilton et al. |
| 2013/0310911 A1 | 11/2013 | Tai et al. |
| 2014/0005753 A1 | 1/2014 | Carbunaru |
| 2014/0031893 A1 | 1/2014 | Walker et al. |
| 2014/0046407 A1 | 2/2014 | Ben-Ezra et al. |
| 2014/0058292 A1 | 2/2014 | Alford et al. |
| 2014/0058490 A1 | 2/2014 | DiMarco |
| 2014/0066950 A1 | 3/2014 | Macdonald et al. |
| 2014/0067007 A1 | 3/2014 | Drees et al. |
| 2014/0067354 A1 | 3/2014 | Kaula et al. |
| 2014/0074190 A1 | 3/2014 | Griffith |
| 2014/0081011 A1 | 3/2014 | Vaught et al. |
| 2014/0081071 A1 | 3/2014 | Simon et al. |
| 2014/0088674 A1 | 3/2014 | Bradley |
| 2014/0100633 A1 | 4/2014 | Mann et al. |
| 2014/0107397 A1 | 4/2014 | Simon et al. |
| 2014/0107398 A1 | 4/2014 | Simon et al. |
| 2014/0114374 A1 | 4/2014 | Rooney et al. |
| 2014/0142652 A1 | 5/2014 | Francois et al. |
| 2014/0163640 A1 | 6/2014 | Edgerton et al. |
| 2014/0172045 A1 | 6/2014 | Yip et al. |
| 2014/0180361 A1 | 6/2014 | Burdick et al. |
| 2014/0213842 A1 | 7/2014 | Simon et al. |
| 2014/0228905 A1 | 8/2014 | Bolea |
| 2014/0236257 A1 | 8/2014 | Parker et al. |
| 2014/0243923 A1 | 8/2014 | Doan et al. |
| 2014/0277271 A1 | 9/2014 | Chan et al. |
| 2014/0296752 A1 | 10/2014 | Edgerton et al. |
| 2014/0303901 A1 | 10/2014 | Sadeh |
| 2014/0316484 A1 | 10/2014 | Edgerton et al. |
| 2014/0316503 A1 | 10/2014 | Tai et al. |
| 2014/0324118 A1 | 10/2014 | Simon et al. |
| 2014/0330067 A1 | 11/2014 | Jordan |
| 2014/0330335 A1 | 11/2014 | Errico et al. |
| 2014/0336722 A1 | 11/2014 | Rocon De Lima et al. |
| 2014/0357936 A1 | 12/2014 | Simon et al. |
| 2015/0005840 A1 | 1/2015 | Pal et al. |
| 2015/0065559 A1 | 3/2015 | Feinstein et al. |
| 2015/0066111 A1 | 3/2015 | Blum et al. |
| 2015/0165226 A1 | 6/2015 | Simon et al. |
| 2015/0182784 A1 | 7/2015 | Barriskill et al. |
| 2015/0190634 A1 | 7/2015 | Rezai et al. |
| 2015/0196231 A1 | 7/2015 | Ziaie et al. |
| 2015/0217120 A1 | 8/2015 | Nandra et al. |
| 2015/0231396 A1 | 8/2015 | Burdick et al. |
| 2015/0265830 A1 | 9/2015 | Simon et al. |
| 2015/0328462 A1 | 11/2015 | Griffith |
| 2016/0001096 A1 | 1/2016 | Mishelevich |
| 2016/0030737 A1 | 2/2016 | Gerasimenko et al. |
| 2016/0030748 A1 | 2/2016 | Edgerton et al. |
| 2016/0030750 A1 | 2/2016 | Bokil et al. |
| 2016/0045727 A1 | 2/2016 | Rezai et al. |
| 2016/0045731 A1 | 2/2016 | Simon et al. |
| 2016/0074663 A1 | 3/2016 | De Ridder |
| 2016/0121109 A1 | 5/2016 | Edgerton et al. |
| 2016/0121114 A1 | 5/2016 | Simon et al. |
| 2016/0121116 A1 | 5/2016 | Simon et al. |
| 2016/0121121 A1 | 5/2016 | Mashiach |
| 2016/0143588 A1 | 5/2016 | Hoitink et al. |
| 2016/0157389 A1 | 6/2016 | Hwang |
| 2016/0175586 A1 | 6/2016 | Edgerton et al. |
| 2016/0220813 A1 | 8/2016 | Edgerton et al. |
| 2016/0235977 A1 | 8/2016 | Lu et al. |
| 2016/0271413 A1 | 9/2016 | Vallejo et al. |
| 2016/0279418 A1 | 9/2016 | Courtine et al. |
| 2016/0279429 A1 | 9/2016 | Hershey et al. |
| 2016/0310739 A1 | 10/2016 | Burdick et al. |
| 2016/0339239 A1 | 11/2016 | Yoo et al. |
| 2017/0007831 A1 | 1/2017 | Edgerton et al. |
| 2017/0128729 A1 | 5/2017 | Netoff et al. |
| 2017/0157389 A1 | 6/2017 | Tai et al. |
| 2017/0157396 A1 | 6/2017 | Dixon et al. |
| 2017/0161454 A1 | 6/2017 | Grill et al. |
| 2017/0165497 A1 | 6/2017 | Lu |
| 2017/0173326 A1 | 6/2017 | Bloch et al. |
| 2017/0246450 A1 | 8/2017 | Liu et al. |
| 2017/0246452 A1 | 8/2017 | Liu et al. |
| 2017/0266455 A1 | 9/2017 | Steinke |
| 2017/0274209 A1 | 9/2017 | Edgerton et al. |
| 2017/0296837 A1 | 10/2017 | Jin |
| 2017/0354819 A1 | 12/2017 | Bloch et al. |
| 2017/0361093 A1 | 12/2017 | Yoo et al. |
| 2018/0008826 A1 | 1/2018 | Dimarco |
| 2018/0056078 A1 | 3/2018 | Kashyap et al. |
| 2018/0085583 A1 | 3/2018 | Zhang et al. |
| 2018/0104479 A1 | 4/2018 | Grill et al. |
| 2018/0110992 A1 | 4/2018 | Parramon et al. |
| 2018/0117334 A1 | 5/2018 | Jung |
| 2018/0125416 A1* | 5/2018 | Schwarz ............... A61B 5/1128 |
| 2018/0178008 A1 | 6/2018 | Bouton et al. |
| 2018/0185642 A1 | 7/2018 | Lu |
| 2018/0185648 A1 | 7/2018 | Nandra et al. |
| 2018/0193655 A1 | 7/2018 | Zhang et al. |
| 2018/0229037 A1 | 8/2018 | Edgerton et al. |
| 2018/0229038 A1 | 8/2018 | Burdick et al. |
| 2018/0236240 A1 | 8/2018 | Harkema et al. |
| 2018/0256906 A1 | 9/2018 | Pivonka et al. |
| 2018/0280693 A1 | 10/2018 | Edgerton et al. |
| 2018/0353755 A1 | 12/2018 | Edgerton et al. |
| 2018/0361146 A1 | 12/2018 | Gerasimenko et al. |
| 2019/0022371 A1 | 1/2019 | Chang et al. |
| 2019/0033622 A1 | 1/2019 | Olgun et al. |
| 2019/0160294 A1 | 5/2019 | Peterson et al. |
| 2019/0167987 A1 | 6/2019 | Lu et al. |
| 2019/0192852 A1 | 6/2019 | De Ridder |
| 2019/0192864 A1 | 6/2019 | Koop et al. |
| 2019/0247650 A1 | 8/2019 | Tran |
| 2019/0269917 A1 | 9/2019 | Courtine et al. |
| 2019/0381313 A1 | 12/2019 | Lu |
| 2019/0381328 A1 | 12/2019 | Wechter et al. |
| 2020/0228901 A1 | 7/2020 | Baek |
| 2021/0069052 A1 | 3/2021 | Burke |
| 2021/0187278 A1 | 6/2021 | Lu |
| 2021/0236837 A1 | 8/2021 | Lu |
| 2021/0378991 A1 | 12/2021 | Lu et al. |

(56) References Cited

U.S. PATENT DOCUMENTS

| | | | |
|---|---|---|---|
| 2022/0161042 A1 | 5/2022 | Lu | |
| 2022/0233848 A1 | 7/2022 | Gad et al. | |
| 2022/0313993 A1 | 10/2022 | Gerasimenko et al. | |

FOREIGN PATENT DOCUMENTS

| | | |
|---|---|---|
| CA | 2 823 592 A1 | 7/2012 |
| CA | 2 856 202 A1 | 5/2013 |
| CA | 2 864 473 A1 | 5/2013 |
| CN | 101227940 A | 7/2008 |
| CN | 103263727 A | 8/2013 |
| CN | 104307098 A | 1/2015 |
| EP | 0630987 A1 | 12/1994 |
| EP | 2130326 A1 | 12/2009 |
| EP | 2141851 A2 | 1/2010 |
| EP | 2160127 A1 | 3/2010 |
| EP | 2178319 A1 | 4/2010 |
| EP | 2192897 A1 | 6/2010 |
| EP | 2226114 A1 | 9/2010 |
| EP | 2258496 A1 | 12/2010 |
| EP | 2361631 A1 | 8/2011 |
| EP | 2368401 A1 | 9/2011 |
| EP | 2387467 A1 | 11/2011 |
| EP | 2396995 A1 | 12/2011 |
| EP | 2397788 A1 | 12/2011 |
| EP | 2445990 A2 | 5/2012 |
| EP | 2471518 A2 | 7/2012 |
| EP | 2475283 A1 | 7/2012 |
| EP | 2486897 A2 | 8/2012 |
| EP | 2626051 A1 | 8/2013 |
| EP | 2628502 A1 | 8/2013 |
| EP | 2661307 A2 | 11/2013 |
| EP | 2668642 A2 | 1/2014 |
| EP | 2810689 A1 | 12/2014 |
| EP | 2810690 A1 | 12/2014 |
| EP | 2868343 A1 | 5/2015 |
| EP | 2966422 A1 | 1/2016 |
| EP | 2968940 A1 | 1/2016 |
| EP | 3184145 A1 | 6/2017 |
| EP | 3323468 A1 | 5/2018 |
| EP | 3328481 A1 | 6/2018 |
| EP | 3527258 A1 | 8/2019 |
| JP | H03-26620 A | 2/1991 |
| JP | 3184145 B2 | 7/2001 |
| JP | 2002517283 A | 6/2002 |
| JP | 2002200178 A | 7/2002 |
| JP | 2004065529 A | 3/2004 |
| JP | 2007-526798 A | 9/2007 |
| JP | 2008067917 A | 3/2008 |
| JP | 2008-543429 A | 12/2008 |
| JP | 2011502586 A | 1/2011 |
| JP | 2012515060 A | 7/2012 |
| JP | 2013508119 A | 3/2013 |
| JP | 2014514043 A | 6/2014 |
| JP | 2016506255 A | 3/2016 |
| JP | 6132856 B2 | 5/2017 |
| JP | 2017104685 A | 6/2017 |
| JP | 2017525509 A | 9/2017 |
| JP | 2018524113 A | 8/2018 |
| RU | 2130326 C1 | 5/1999 |
| RU | 2141851 C1 | 11/1999 |
| RU | 2160127 C1 | 12/2000 |
| RU | 2178319 C2 | 1/2002 |
| RU | 2192897 C2 | 11/2002 |
| RU | 2001102533 | 11/2002 |
| RU | 2226114 C1 | 3/2004 |
| RU | 2258496 C2 | 8/2005 |
| RU | 2361631 C2 | 7/2009 |
| RU | 2368401 C1 | 9/2009 |
| RU | 2387467 C1 | 4/2010 |
| RU | 2396995 C2 | 8/2010 |
| RU | 2397788 C2 | 8/2010 |
| RU | 2445990 C1 | 3/2012 |
| RU | 2471518 C2 | 1/2013 |
| RU | 2475283 C2 | 2/2013 |
| RU | 2661307 C1 | 7/2018 |
| WO | WO 97/047357 A1 | 12/1997 |
| WO | WO-0234331 A2 | 5/2002 |
| WO | WO-02092165 A1 | 11/2002 |
| WO | WO-03005887 A2 | 1/2003 |
| WO | WO 03/026735 A2 | 4/2003 |
| WO | WO 03/092795 A1 | 11/2003 |
| WO | WO 2004/087116 A2 | 10/2004 |
| WO | WO-2005002663 A2 | 1/2005 |
| WO | WO 2005/051306 A2 | 6/2005 |
| WO | WO 2005/065768 A1 | 7/2005 |
| WO | WO 2005/087307 A2 | 9/2005 |
| WO | WO 2006/138069 A1 | 12/2006 |
| WO | WO-2006135751 A2 | 12/2006 |
| WO | WO 2007/007058 A1 | 1/2007 |
| WO | WO 2007/012114 A1 | 2/2007 |
| WO | WO-2007047852 A2 | 4/2007 |
| WO | WO-2007081764 A2 | 7/2007 |
| WO | WO 2007/107831 A2 | 9/2007 |
| WO | WO-2008075294 A1 | 6/2008 |
| WO | WO 2008/109862 A1 | 9/2008 |
| WO | WO-2008070807 A3 | 9/2008 |
| WO | WO 2008/121891 A1 | 10/2008 |
| WO | WO 2009/042217 A1 | 4/2009 |
| WO | WO 2009/111142 A2 | 9/2009 |
| WO | WO-2010021977 A1 | 2/2010 |
| WO | WO 2010/055421 A1 | 5/2010 |
| WO | WO-2010083308 A1 | 7/2010 |
| WO | WO 2010/114998 A1 | 10/2010 |
| WO | WO 2010/124128 A1 | 10/2010 |
| WO | WO-2011005607 A1 | 1/2011 |
| WO | WO-2011136875 A1 | 11/2011 |
| WO | WO-2012050200 A1 | 4/2012 |
| WO | WO-2012075195 A1 | 6/2012 |
| WO | WO-2012080964 A1 | 6/2012 |
| WO | WO 2012/094346 A2 | 7/2012 |
| WO | WO 2012/100260 A2 | 7/2012 |
| WO | WO 2012/129574 A2 | 9/2012 |
| WO | WO 2013/071307 A1 | 5/2013 |
| WO | WO 2013/071309 A1 | 5/2013 |
| WO | WO-2013152124 A1 | 10/2013 |
| WO | WO 2013/188965 A1 | 12/2013 |
| WO | WO-2014005075 A1 | 1/2014 |
| WO | WO-2014031412 A1 | 2/2014 |
| WO | WO-2014089299 A2 | 6/2014 |
| WO | WO 2014/144785 A1 | 9/2014 |
| WO | WO-2014149895 A1 | 9/2014 |
| WO | WO-2014205356 A2 | 12/2014 |
| WO | WO-2014209877 A1 | 12/2014 |
| WO | WO-2015000800 A1 | 1/2015 |
| WO | WO 2015/048563 A2 | 4/2015 |
| WO | WO-2015063127 A1 | 5/2015 |
| WO | WO-2015106286 A1 | 7/2015 |
| WO | WO 2016/029159 A2 | 2/2016 |
| WO | WO 2016/033369 A1 | 3/2016 |
| WO | WO 2016/033372 A1 | 3/2016 |
| WO | WO-2016064761 A1 | 4/2016 |
| WO | WO-2016110804 A1 | 7/2016 |
| WO | WO-2016112398 A1 | 7/2016 |
| WO | WO-2016172239 A1 | 10/2016 |
| WO | WO 2017/011410 A1 | 1/2017 |
| WO | WO 2017/024276 A1 | 2/2017 |
| WO | WO 2017/035512 A1 | 3/2017 |
| WO | WO 2017/044904 A1 | 3/2017 |
| WO | WO-2017058913 A1 | 4/2017 |
| WO | WO-2017062508 A1 | 4/2017 |
| WO | WO-2017117450 A1 | 7/2017 |
| WO | WO-2017146659 A1 | 8/2017 |
| WO | WO-2018039296 A2 | 3/2018 |
| WO | WO 2018/106843 A1 | 6/2018 |
| WO | WO 2018/140531 A1 | 8/2018 |
| WO | WO 2018/217791 A1 | 11/2018 |
| WO | WO-2019211314 A1 | 11/2019 |
| WO | WO 2020/041502 A1 | 2/2020 |

(56) References Cited

FOREIGN PATENT DOCUMENTS

| | | |
|---|---|---|
| WO | WO 2020/041633 A1 | 2/2020 |
| WO | WO 2020/236946 A1 | 11/2020 |

OTHER PUBLICATIONS

US Final Office Action dated Sep. 21, 2015 issued in U.S. Appl. No. 14/355,812.
US Notice of Allowance dated Apr. 13, 2016 issued in U.S. Appl. No. 14/355,812.
US Office Action dated Oct. 18, 2016 issued in U.S. Appl. No. 15/208,529.
US Final Office Action dated Jul. 13, 2017 issued in U.S. Appl. No. 15/208,529.
US Office Action dated Jul. 27, 2018 issued in U.S. Appl. No. 15/208,529.
US Final Office Action dated Apr. 19, 2019 issued in U.S. Appl. No. 15/208,529.
US Office Action dated Oct. 28, 2019 issued in U.S. Appl. No. 15/208,529.
US Office Action dated Oct. 3, 2017 issued in U.S. Appl. No. 15/025,201.
US Notice of Allowance dated Aug. 1, 2018 issued in U.S. Appl. No. 15/025,201.
US Office Action dated Apr. 10, 2020 issued in U.S. Appl. No. 16/200,467.
US Office Action dated Jul. 13, 2016 issued in U.S. Appl. No. 14/775,618.
US Final Office Action dated Apr. 25, 2017 issued in U.S. Appl. No. 14/775,618.
US Notice of Allowance dated Jan. 18, 2018 issued in U.S. Appl. No. 14/775,618.
US Office Action dated Jan. 8, 2020 issued in U.S. Appl. No. 15/750,499.
US Office Action dated Oct. 31, 2019 issued in U.S. Appl. No. 15/750,499.
US Office Action dated Jul. 22, 2019 issued in U.S. Appl. No. 15/506,696.
US Office Action dated Jun. 4, 2019 issued in U.S. Appl. No. 15/505,053.
US Notice of Allowance dated Feb. 13, 2020 issued in U.S. Appl. No. 15/505,053.
US Office Action dated Apr. 7, 2020 issued in U.S. Appl. No. 15/740,323.
US Office Action dated Apr. 17, 2019 issued in U.S. Appl. No. 15/344,381.
US Final Office Action dated Dec. 30, 2019 issued in U.S. Appl. No. 15/344,381.
PCT International Search Report dated Jul. 30, 2012 issued in PCT/US2012/020112.
PCT International Preliminary Report on Patentability and Written Opinion dated Jul. 10, 2013 issued in PCT/US2012/020112.
PCT International Search Report and Written Opinion dated Mar. 19, 2013 issued in PCT/US2012/064878.
PCT International Preliminary Report on Patentability dated May 22, 2014 issued in PCT/US2012/064878.
Australian Patent Examination Report No. 1 dated Jul. 11, 2016 issued in AU 2012334926.
Canadian Office Action dated Aug. 31, 2018 issued in CA 2,864,473.
Canadian Office Action dated Jul. 30, 2019 issued in CA 2,864,473.
European Communication pursuant to Rule 114(2) EPC regarding observations by a third party dated Mar. 27, 2015 issued in EP 12 847 885.6.
European Extended Search Report dated May 6, 2015 issued in EP 12 847 885.6.
European Office Action dated Apr. 15, 2016 issued in EP 12 847 885.6.
European Reply to Communication of Apr. 15, 2016 dated Oct. 24, 2016 in EP 12 847 885.6.
European Second Office Action dated Feb. 16, 2017 issued in EP 12 847 885.6.
PCT Declaration of Non-Establishment of International Search Report and Written Opinion dated Dec. 24, 2014 issued in PCT/US2014/057886.
PCT International Preliminary Report on Patentability and Written Opinion dated Apr. 7, 2016 issued in PCT/US2014/057886.
Australian Examination report No. 1 dated Jan. 11, 2019 issued in AU 2014324660.
Australian Examination report No. 2 dated Nov. 7, 2019 issued in AU 2014324660.
Australian Examination report No. 3 dated Jan. 6, 2020 issued in AU 2014324660.
European Extended Search Report dated May 10, 2017 issued in EP 14849355.4.
European Office Action dated Jul. 20, 2018 issued in EP 14849355.4.
PCT International Search Report and Written Opinion dated Aug. 6, 2014 issued in PCT/US2014/029340.
PCT International Preliminary Report on Patentability dated Sep. 24, 2015 issued in PCT/US2014/029340.
Australian Patent Examination Report No. 1 dated May 11, 2018 issued in AU 2014228794.
Australian Patent Examination Report No. 1 dated Jan. 6, 2020 issued in AU 2019206059.
European Extended Search Report dated Nov. 8, 2016 issued in EP 14765477.6.
European Office Action dated Nov. 14, 2018 issued in EP 14765477.6.
European Office Action dated Sep. 27, 2019 issued in EP 14765477.6.
PCT International Search Report and Written Opinion dated Dec. 5, 2016 issued in PCT/US2016/045898.
PCT International Preliminary Report on Patentability and Written Opinion dated Feb. 15, 2018 issued in PCT/US2016/045898.
European Extended Search Report dated Dec. 13, 2018 issued in EP 16833973.7.
PCT International Search Report and Written Opinion dated Dec. 8, 2015 issued in PCT/US2015/047268.
PCT International Preliminary Report on Patentability and Written Opinion dated Feb. 28, 2017 issued in PCT/US2015/047268.
Australian Patent Examination Report No. 1 dated Jul. 18, 2019 issued in AU 2015308779.
European Extended Search Report dated Mar. 1, 2018 issued in EP 15836927.2.
European Extended Search Report dated Apr. 21, 2020 issued in EP 19201998.2.
PCT International Search Report and Written Opinion dated Dec. 3, 2015 issued in PCT/US2015/047272.
PCT International Preliminary Report on Patentability and Written Opinion dated Feb. 28, 2017 issued in PCT/US2015/047272.
PCT Declaration of Non-Establishment of International Search Report and Written Opinion dated Dec. 1, 2015 issued in PCT/US2015/046378.
PCT International Preliminary Report on Patentability and Written Opinion dated Feb. 21, 2017 issued in PCT/US2015/046378.
Australian Patent Examination Report No. 1 dated Jun. 14, 2019 issued in AU 2015305237.
Australian Patent Examination Report No. 2 dated Apr. 17, 2020 issued in AU 2015305237.
European Extended Search Report dated Apr. 4, 2018 issued in EP 15834593.4.
European Office Action dated Jul. 17, 2019 issued in EP 15834593.4.
PCT International Search Report and Written Opinion dated Sep. 12, 2016 issued in PCT/US2016/041802.
PCT International Preliminary Report on Patentability and Written Opinion dated Jan. 25, 2018 issued in PCT/US2016/041802.
European Extended Search Report dated Feb. 19, 2019 issued in EP 16825005.8.
PCT International Search Report and Written Opinion dated Dec. 5, 2016 issued in PCT/US2016/049129.

(56) References Cited

OTHER PUBLICATIONS

PCT International Preliminary Report on Patentability and Written Opinion dated Mar. 8, 2018 issued in PCT/US2016/049129.
PCT International Search Report and Written Opinion dated Mar. 12, 2018 issued in PCT/US2018/015098.
PCT International Preliminary Report on Patentability and Written Opinion dated Jul. 30, 2019 issued in PCT/US2018/015098.
PCT International Search Report and Written Opinion dated Aug. 31, 2018 issued in PCT/US2018/033942.
PCT International Preliminary Report on Patentability and Written Opinion dated Nov. 26, 2019 issued in PCT/US2018/033942.
PCT International Search Report and Written Opinion dated Nov. 14, 2019 issued in PCT/US2019/047777.
PCT International Search Report and Written Opinion dated Nov. 21, 2019 issued in PCT/US2019/047551.
PCT International Search Report dated Mar. 19, 2013 issued in PCT/US2012/064874 [1958711.2WO].
PCT International Search Report dated Mar. 19, 2013 issued in PCT/US2012/064878 [312350-11WO0].
PCT International Search Report dated Sep. 3, 2012 issued in PCT/US2012/022257 [68243-031WO1].
PCT International Search Report dated Oct. 31, 2012 issued in PCT/US2012/030624 [68243-031WO2].
Andersson, et al., (2003) "CNS Involvement in Overactive Bladder." *Drugs*, 63(23): 2595-2611.
Angeli et al. (2014) "Altering spinal cord excitability enables voluntary movements after chronic complete paralysis in humans" *Brain* 137: 1394-1409.
Courtine, Grégoire et al. (2007) "Modulation of multisegmental monosynaptic responses in a variety of leg muscles during walking and running in humans," *J Physiol.* 582.3:1125-1139.
Danner S.M., Hofstoetter U.S., Ladenbauer J., Rattay F., and Minassian K. (Mar. 2011) "Can the human lumbar posterior columns be stimulated by transcutaneous spinal cord stimulation? A modeling study" *Europe PMC Funders Author Manuscripts, Artif Organs* 35(3):257-262, 12 pp.
DeSantana et al. (Dec. 2008) "Effectiveness of Transcutaneous Electrical Nerve Stimulation for Treatment of Hyperalgesia and Pain," *Curr Rheumatol Rep.* 10(6):492-499, 12 pp.
Dubinsky, Richard M. and Miyasaki, Janis, "Assessment: Efficacy of transcutaneous electric nerve stimulation in the treatment of pain in neurologic disorders (an evidence-based review)," Report of the Therapeutics and Technology Assessment Subcommittee of the American Academy of Neurology, (2010) *Neurology*, 74:173-176.
Edgerton and Harkema (2011) "Epidural stimulation of the spinal cord in spinal cord injury: current status and future challenges" *Expert Rev Neurother.* 11(10): 1351-1353. doi:10.1586/ern.11.129 [NIH Public Access—Author Manuscript—5 pages].
Fong et al. (2009) "Recovery of control of posture and locomotion after a spinal cord injury: solutions staring US in the face," *Progress in Brain Research*, Elsevier Amsterdam, NL, 175:393-418.
Ganley et al., (2005) "Epidural Spinal Cord Stimulation Improves Locomotor Performance in Low ASIA C, Wheelchair-Dependent, Spinal Cord-Injured Individuals: Insights from Metabolic Response," *Top. Spinal Cord Inj. Rehabil*; 11(2):50-63.
Gerasimenko Y., Gorodnichev R., Machueva E., Pivovarova E., Semyenov D., Savochin A., Roy R.R., and Edgerton V.R., (Mar. 10, 2010) "Novel and Direct Access to the Human Locomotor Spinal Circuitry," *J Neurosci.* 30(10):3700-3708, PMC2847395.
Gerasimenko Y.P., Ichiyama R.M., Lavrov I.A., Courtine G., Cai L., Zhong H., Roy R.R., and Edgerton V.R. (2007) "Epidural Spinal Cord Stimulation Plus Quipazine Administration Enable Stepping in Complete Spinal Adult Rats," *J Neurophysiol.* 98:2525-2536.
Harkema et al. (2011) "Effect of Epidural stimulation of the lumbosacral spinal cord on voluntary movement, standing, and assisted stepping after motor complete paraplegia: a case study" *Lancet* 377(9781): 1938-1947; NIH Public Access Author Manuscript 17 pages [doi:10.1016/S0140-6736(11)60547-3].
Herman R., He J., D'Luzansky S., Willis W., Dilli S., (2002) "Spinal cord stimulation facilitates functional walking in a chronic, incomplete spinal cord injured," *Spinal Cord*. 40:65-68.
Hofstoetter, U.S. et al. (Aug. 2008) "Modification of Reflex Responses to Lumbar Posterior Root Stimulation by Motor Tasks in Healthy Subjects," *Artif Organs*, 32(8):644-648.
Ichiyama et al. (2005) "Hindlimb stepping movements in complete spinal rats induced by epidural spinal cord stimulation" *Neuroscience Letters*, 383:339-344.
Kapetanakis, et al. (2017) "Cauda Equina Syndrome Due to Lumbar Disc Herniation: a Review of Literature," *Folia Medica*, 59(4): 377-86.
Kitano K., Koceja D.M. (2009) "Spinal reflex in human lower leg muscles evoked by transcutaneous spinal cord stimulation," *J Neurosci Methods*. 180:111-115.
Minasian et al. (2010) "Transcutaneous stimulation of the human lumbar spinal cord: Facilitating locomotor output in spinal cord injury," *Conf. Proceedings Soc. for Neurosci.*, Abstract No. 286.19, 1 page.
Minassian et al. (Aug. 2011) "Transcutaneous spinal cord stimulation," *International Society for Restorative Neurology*, http://restorativeneurology.org/resource-center/assessments/transcutaneous-lumbar-spinal-cord-stimulation/; http://restorativeneurology.org/wp-content/uploads/2011/08/Transcutaneous-spinal-cord-stimulation_long.pdf, 6 pp.
Minassian et al. (Mar. 2007) "Posterior root-muscle reflexes elicited by transcutaneous stimulation of the human lumbosacral cord," *Muscle & Nerve* 35:327-336.
Nandra et al., (2014) "Microelectrode Implants for Spinal Cord Stimulation in Rats," *Thesis, California Institute of Technology*, Pasadena, California, Defended on Sep. 24, 2014, 104 pages.
Nandra et al., (Jan. 23, 2011) "A Parylene-Based Microelectrode Arrary Implant for Spinal Cord Stimulation in Rats," *Conf. Proc. IEEE Eng. Med. Biol. Soc.*, pp. 1007-1010.
Rodger et al., (2007) "High Density Flexible Parylene-Based Multielectrode Arrays for Retinal and Spinal Cord Stimulation," Transducers & Eurosensors, Proc. Of the 14th International Conference on Solid-State Sensors, Actuators and Microsystems, Lyon, France, Jun. 10-14, 2007, *IEEE*, pp. 1385-1388.
Seifert et al. (Nov. 1, 2002) "Restoration of Movement Using Functional Electrical Stimulation and Bayes' Theorem," *The Journal of Neuroscience*, 22(1):9465-9474.
Tanabe et al. (2008) "Effects of transcutaneous electrical stimulation combined with locomotion-like movement in the treatment of post-stroke gait disorder: a single-case study," 30(5):411-416 abstract, 1 page.
Wang, et al. (2017) "Incidence of C5 nerve root palsy after cervical surgery," *Medicine*, 96(45), 14 pages.
Ward, Alex R. (Feb. 2009) "Electrical Stimulation Using Kilohertz-Frequency Alternating Current ," (2009) *Phys Ther.*89(2):181-190 [published online Dec. 18, 2008].
US Notice of Allowance dated Jun. 17, 2020 issued in U.S. Appl. No. 15/208,529.
US Office Action dated Nov. 24, 2020 issued in U.S. Appl. No. 16/200,467.
US Notice of Allowance dated May 19, 2021 issued in U.S. Appl. No. 16/200,467.
US Final Office Action dated Jul. 29, 2020 issued in U.S. Appl. No. 15/975,678.
US Office Action dated Feb. 10, 2021 issued in U.S. Appl. No. 15/975,678.
US Final Office Action dated Jul. 20, 2021 issued in U.S. Appl. No. 15/975,678.
US Final Office Action dated Aug. 6, 2020 issued in U.S. Appl. No. 15/750,499.
US Office Action dated Aug. 6, 2021 issued in U.S. Appl. No. 15/750,499.
US Notice of Allowance dated May 4, 2020 issued in U.S. Appl. No. 15/740,323.
US 2nd Notice of Allowance dated Jun. 4, 2020 issued in U.S. Appl. No. 15/740,323.
US Final Office Action dated Nov. 20, 2020 issued in U.S. Appl. No. 15/740,323.

(56) References Cited

OTHER PUBLICATIONS

US Office Action dated Mar. 29, 2021 issued in U.S. Appl. No. 15/753,963.
US Office Action dated Aug. 4, 2020 issued in U.S. Appl. No. 15/753,963.
US Notice of Allowance dated Apr. 27, 2021 issued in U.S. Appl. No. 15/753,963.
US Office Action dated Nov. 13, 2020 issued in U.S. Appl. No. 15/753,963.
US Final Office Action dated Jul. 16, 2021 issued in U.S. Appl. No. 15/753,963.
Canadian Office Action dated Aug. 14, 2020 issued in CA 2,864,473.
Australian Examination report No. 1 dated Dec. 21, 2020 issued in AU 2020200152.
Canadian Office Action dated Nov. 27, 2020 issued in CA 2,925,754.
Canadian 2nd Office Action dated Sep. 28, 2021 issued in CA 2,925,754.
European Extended Search Report dated Jan. 22, 2021 issued in EP 20175385.2.
Canadian Office Action dated May 7, 2020 issued in CA 2,906,779.
Canadian 2nd Office Action dated Apr. 9, 2021 issued in CA 2,906,779.
European Extended Search Report dated Aug. 17, 2021 issued in EP 21166801.7.
Chinese First Office Action dated Jan. 6, 2021 issued in CN 201680058067.8.
Australian Patent Examination Report No. 2 dated May 20, 2020 issued in AU 2015308779.
Cannadian Office Action dated Oct. 21, 2021 issued in CA 2,958,924.
European Office Action dated Jul. 30, 2020 issued in EP 15834593.4.
Japanese Office Action dated Jul. 13, 2020 issued in JP 2018-501208.
Japanese 2nd Office Action dated Mar. 22, 2021 issued in JP 2018-501208.
European Extended Search Report dated Sep. 7, 2020 issued in EP 18744685.1.
PCT International Preliminary Report on Patentability and Written Opinion dated Feb. 23, 2021 issued in PCT/US2019/047777.
PCT International Preliminary Report on Patentability and Written Opinion dated Feb. 23, 2021 issued in PCT/US2019/047551.
PCT International Search Report and Written Opinion dated Oct. 14, 2020 issued in PCT/US2020/033830.
Drummond, et al. (1996) "Thoracic impedance used for measuring chest wall movement in postoperative patients," *British Journal of Anaesthesia*, 77: 327-332.
Hovey, et al. (2006) "The Guide to Magnetic Stimulation," *The Magstim Company Ltd*, 45 pages.
Kondo, et al. (1997) "Laser monitoring of chest wall displacement," *Eur Respir J.*, 10: 1865-1869.
Niu et al., (2018) "A Proof-of-Concept Study of Transcutaneous Magnetic Spinal Cord Stimulation for Neurogenic Bladder," *Scientific Reports*, 8: 12549 (12 pages).
Szava et al., (Jan. 2011) "Transcutaneous electrical spinal cord stimulation: Biophysics of a new rehabilitation method after spinal cord injury", ISBN: 978-3-639-34154-6 [95 pages].
Dimitrijevic et al. (1998) "Evidence for a spinal central pattern generator in humans." Ann N Y Acad Sci. 860:360-76.
European Office Action [Decision to Refuse] dated Oct. 28, 2021 issued in EP 15834593.4.
European Search Report dated Apr. 19, 2022, in Application No. EP20190851613.
European Search Report dated Apr. 19, 2022, in Application No. EP20190852797.
Gerasimenko et al. (2015) "Initiation and modulation of locomotor circuitry output with multisite transcutaneous electrical stimulation of the spinal cord in noninjured humans." J Neurophysiol. 113:834-42.
Gerasimenko et al. (2015) "Transcutaneous electrical spinal-cord stimulation in humans." Ann Phys Rehabil Med. 58(4):225-231. doi:10.1016/j.rehab.2015.05.003.
JP Office Action dated Nov. 29, 2021, in Application No. JP2019-539960 with English translation.
Krenn et al. (2013) "Selectivity of transcutaneous stimulation of lumbar posterior roots at different spinal levels in humans." Biomed Tech (Berl) 58 (Suppl. 1) DOI 10.1515/bmt-2013-4010, 2 pages.
Ladenbauer et al. (2010) "Stimulation of the human lumbar spinal cord with implanted and surface electrodes: a computer simulation study." IEEE Trans Neural Syst Rehabil Eng. 18:637-45.
PCT International Preliminary Report on Patentability and Written Opinion dated Dec. 2, 2021 issued in PCT/US2020/033830.
Roy et al. (2012) "Effect of percutaneous stimulation at different spinal levels on the activation of sensory and motor roots." Exp Brain Res. 223:281-9.
Sayenko et al. (2014) "Neuromodulation of evoked muscle potentials induced by epidural spinal-cord stimulation in paralyzed individuals." J Neurophysiol. 111:1088-99.
Sayenko et al. (2015) "Spinal segment-specific transcutaneous stimulation differentially shapes activation pattern among motor pools in humans." J Appl Physiol. 118:1364-74.
Shafik, A (1996) "Extrapelvic cavernous nerve stimulation in erectile dysfunction. Human study" Andrologia 28(3):151-6. doi: 10.1111/j.1439-0272.1996.tb02774.x [Abstract—2 pages].
Shafik, et al. (2000) "Magnetic stimulation of the cavernous nerve for the treatment of erectile dysfunction in humans" International Journal of Impotence Research 12: 137-141.
Temel, et al. (2004) "Deep brain stimulation of the thalamus can influence penile erection" International Journal of Impotence Research 16: 91-94.
Troni et al. (2011) "A methodological reappraisal of non invasive high voltage electrical stimulation of lumbosacral nerve roots." Clin Neurophysiol. 122:2071-80.
US Final Office Action dated Nov. 26, 2021 issued in U.S. Appl. No. 15/740,323.
U.S. Non-Final office Action dated May 11, 2022, in U.S. Appl. No. 15/740,323.
US Notice of Allowance dated Dec. 13, 2021 issued in U.S. Appl. No. 15/753,963.
US Notice of Allowance dated Mar. 4, 2022 issued in U.S. Appl. No. 15/975,678.
US Office Action dated Jan. 5, 2022 issued in U.S. Appl. No. 17/269,970.
U.S. Restriction Requirement dated Apr. 19, 2022 in U.S. Appl. No. 16/479,201.
Vital Signs—Cleveland Clinic [retrieved on Nov. 22, 2021] Retrieved from the Internet: URL: https://my.clevelandclinic.org/health/articles/10881-vital-signs [7 pages].
CA Office Action dated Jul. 14, 2022 in Application No. CA2958924.
CA Office Action dated Sep. 6, 2022, in Application No. CA3030615.
Giuliano, F. et al., "Neural control of erection", Physiology & Behavior, vol. 83, No. 2, Nov. 15, 2004, pp. 189-201.
JP Office Action dated Nov. 21, 2022, in Application No. 2021-188658 with English translation.
JP Office Action dated Sep. 26, 2022, in Application No. JP2019-539960 with English translation.
Augustine GJ, Purves D, Fitzpatrick D, eds., "Autonomic Regulation of the Bladder." Neuroscience, 2nd edition, Sunderland (MA): Sinauer Associates; 2001, Available from: https://www.ncbi.nlm.nih.gov/books/NBK10886/; downloaded Dec. 4, 2022, 2 pp.
U.S. Final Office Action dated Oct. 13, 2022, in U.S. Appl. No. 17/269,970.
U.S. Non Final Office Action dated Aug. 25, 2022 in U.S. Appl. No. 16/479,201.
U.S. Restriction Requirement dated Dec. 1, 2022 in U.S. Appl. No. 17/270,402.
Abernethy, J. et al., "Competing in the Dark: An Efficient Algorithm for Bandit Linear Optimization", Conference on Learning Theory, (2008), 13 pages.
Ada, L. et al., "Mechanically assisted walking with body weight support results in more independent walking than assisted overground

(56) References Cited

OTHER PUBLICATIONS walking in non-ambulatory patients early after stroke: a systematic review," Journal of Physiotherapy, vol. 56, No. 3, (Sep. 2010), 9 pages.
Alto, L. et al., "Chemotropic Guidance Facilitates Axonal Regeneration and Synapse Formation after Spinal Cord Injury," Nature Neuroscience, vol. 12, No. 9, Published Online Aug. 2, 2009, (Sep. 2009), 21 pages.
Anderson, K., "Targeting Recovery: Priorities of the Spinal Cord-Injured Population," Journal of Neurotrauma, vol. 11, No. 10, Oct. 2004, 13 pages.
Auer, P. et al., "Finite-time Analysis of the Multiarmed Bandit Problem", Machine Learning, vol. 47, No. 2, (2002), pp. 235-256.
Auer, P. "Using Confidence Bounds for Exploitation-Exploration Trade-offs", Journal of Machine Learning Research, vol. 3, (2002), pp. 397-422.
Azimi, J. et al., "Batch Active Learning via Coordinated Matching", In Proceedings of the 29th International Conference on Machine Learning, (2012), 8 pages.
Azimi, J. et al., "Batch Bayesian Optimization via Simulation Matching", In Advances in Neural Information Processing Systems (NIPS), (2010), 9 pages.
Azimi, J. et al., "Hybrid Batch Bayesian Optimization", In Proceedings of the 29th International Conference on Machine Learning, (2012), 12 pages.
Barbeau, H. et al., "Recovery of locomotion after chronic spinalization in the adult cat", Brain Research, vol. 412, No. 1, (May 26, 1987), 12 pages.
Bareyre, F. et al., "The injured spinal cord spontaneously forms a new intraspinal circuit in adult rats," Nature Neuroscience, vol. 7, No. 3, Published Online Feb. 15, 2004, (Mar. 2004), 9 pages.
Basso, D. et al., "MASCIS Evaluation of Open Field Locomotor Scores: Effects of Experience and Teamwork on Reliability," Journal of Neurotrauma, vol. 13, No. 7, (Jul. 1996), 17 pages.
Brochu, et al., "A Tutorial on Bayesian Optimization of Expensive Cost Functions, with Application to Active User Modeling and Hierarchical Reinforcement Learning", In TR-2009-23, UBC, (2009), 49 pages.
Brosamle, C. et al., "Cells of Origin, Course, and Termination Patterns of the Ventral, Uncrossed Component of the Mature Rat Corticospinal Tract," The Journal of Comparative Neurology, vol. 386, No. 2, (Sep. 22, 1997), 11 pages.
Bubeck, S. et al., "Online Optimization in X-Armed Bandits", Advances in Neural Information Processing Systems (NIPS), (2008), 8 pages.
Bubeck, S. et al., "Pure Exploration in Finitely-Armed and Continuous-Armed Bandits problems" In ALT, (2009), 35 pages.
Burke, R., "Group Ia Synaptic Input to Fast and Slow Twitch Motor Units of Cat Triceps Surae", The Journal of Physiology, vol. 196, vol. 3, (Jun. 1, 1968), 26 pages.
CA Office Action dated Jun. 19, 2023, in Application No. CA3030615.
Cai, L. et al., "Implications of Assist-As-Needed Robotic Step Training after a Complete Spinal Cord Injury on Intrinsic Strategies of Motor Learning", The Journal of Neuroscience, vol. 26, No. 41, (Oct. 11, 2006), 5 pages.
Capogrosso, M., et al., "A Computational Model for Epidural Electrical Stimulation of Spinal Sensorimotor Circuits", Journal of Neuroscience, Dec. 4, 2013, vol. 33, No. 49, pp. 19326-19340.
Carhart, M. et al., "Epidural Spinal-Cord Stimulation Facilitates Recovery of Functional Walking Following Incomplete Spinal-Cord Injury," IEEE Transactions on Neural Systems and Rehabilitation Engineering, vol. 12, No. 1, (Mar. 15, 2004), 11 pages.
Colgate, E. et al., "An Analysis of Contact Instability in Terms of Passive Physical Equivalents," Proceedings of the 1989 IEEE International Conference on Robotics and Automation, Scottsdale, Arizona, (May 14, 1989), 6 pages.
Courtine, G. et al., "Can experiments in nonhuman primates expedite the translation of treatments for spinal cord injury in humans?", Nature Medicine, vol. 13, No. 5, (May 2007), 13 pages.

Courtine, G. et al., "Recovery of supraspinal control of stepping via indirect propriospinal relay connections after spinal cord injury," Nature Medicine, vol. 14, No. 1, (Jan. 6, 2008), 6 pages.
Cowley, K. et al., "Propriospinal neurons are sufficient for bulbospinal transmission of the locomotor command signal in the neonatal rat spinal cord," The Journal of Physiology, vol. 586, No. 6, Published Online Jan. 31, 2008, (Mar. 15, 2008), 13 pages.
Danner, S. et al., "Human spinal locomotor control is based on flexibly organized burst generators," Brain, vol. 138, No. 3, Available Online Jan. 12, 2015, Mar. 2015, 12 pages.
Danner, S. M. et al., "Body Position Influences Which neural structures are recruited by lumbar transcutaneous spinal cord stimulation", PLoS One, vol. 11, No. 1, (2016), 13 pages.
Dimitrijevic, M. M. et al., "Clinical Elements for the Neuromuscular Stimulation and Functional Electrical Stimulation protocols in the Practice of Neurorehabilitation", Artificial Organs, vol. 26, No. 3, (2002), pp. 256-259.
Dimitrijevic, M. R. et al., "Electrophysiological characteristics of H-reflexes elicited by percutaneous stimulation of the cauda equina", Abstract No. 4927, 34th Annual Meeting of the Society for Neuroscience, San Diego, CA (2004), 1 Page.
Drew, T. et al., "Cortical mechanisms involved in visuomotor coordination during precision walking," Brain Research Reviews, vol. 57, No. 1, Published Online Aug. 22, 2007, (Jan. 2007), 13 pages.
Duschau-Wicke, A. et al., "Patient-cooperative control increases active participation of individuals with SCI during robot-aided gait training," Journal of NeuroEngineering and Rehabilitation, vol. 7, No. 43, (Sep. 10, 2010), 13 pages.
Edgerton, V. et al., "Robotic Training and Spinal Cord Plasticity," Brain Research Bulletin, vol. 78, No. 1, Published Online Nov. 14, 2008, (Jan. 15, 2009), 19 pages.
Edgerton, V. et al., "Training Locomotor Networks," Brain Research Reviews, vol. 57, Published Online Sep. 16, 2007, (Jan. 2008), 25 pages.
European Office Action dated Jun. 9, 2022 in Application No. EP16825005.8.
Fleshman, J. et al., "Electronic Architecture of Type—Identified a-Motoneurons in the Cat Spinal Cord," Journal of Neurophysiology, vol. 60, No. 1, (Jul. 1, 1988), 26 pages.
Frey, M. et al., "A Novel Mechatronic Body Weight Support System," IEEE Transactions on Neural Systems and Rehabilitation Engineering, vol. 14, No. 3, (Sep. 18, 2006), 11 pages.
Fuentes, R. et al., "Spinal Cord Stimulation Restores Locomotion in Animal Models of Parkinson's Disease," Science, vol. 323, No. 5921, (Mar. 20, 2009), 14 pages.
Gerasimenko, Yu. P. et al., "Control of Locomotor Activity in Humans and Animals in the Absence of Supraspinal Influences", Neuroscience and Behavioral Physiology, vol. 32, No. 4, (2002), pp. 417-423.
Gerasimenko, Yu. P. et al., "Noninvasive Reactivation of Motor Descending Control after Paralysis", Journal of Neurotrauma, vol. 32, (2015), 13 pages.
Gilja, V. et al., "A high-performance neural prosthesis enabled by control algorithm design," Nature Neuroscience, vol. 15, No. 12, Published Online Nov. 18, 2012, (Dec. 2012), 56 pages.
Gittins, J. C., "Bandit Processes and Dynamic Allocation Indices", Journal of the Royal Statistical Society B, vol. 41, No. 2, (1979), pp. 148-164.
Guyatt, G. H. et al., "The 6-minute walk: a new measure of exercise capacity in patients with chronic heart failure," Canadian Medical Association Journal, vol. 132, No. 8, (Apr. 15, 1985), 5 pages.
Hagglund, M. et al., "Activation of groups of excitatory neurons in the mammalian spinal cord or hindbrain evokes locomotion," Nature Neuroscience, vol. 13, No. 2, Published Online Jan. 17, 2010, (Feb. 2010), 8 pages.
Harkema, S. et al., "Human Lumbosacral Spinal Cord Interprets Loading During Stepping," Journal of Neurophysiology, vol. 77, No. 2, (Feb. 1, 1997), 15 pages.
Harrison, P. et al., "Individual Excitatory Post-Synaptic Potentials Due to Muscle Spindle Ia Afferents in Cat Triceps Surae Motoneurones," The Journal of Physiology, vol. 312, No. 1, (Mar. 1981), pp. 455-470.

(56) References Cited

OTHER PUBLICATIONS

Hashtrudi-Zaad, K. et al., "On the Use of Local Force Feedback for Transparent Teleoperation," Proceedings of the 1999 IEEE International Conference on Robotics and Automation, (May 10, 1999), 7 pages.
Hennig, P. et al., "Entropy search for information-efficient global optimization" Journal of Machine Learning Research (JMLR), vol. 13, (Jun. 2012), pp. 1809-1837.
Hidler, J. et al., "ZeroG: Overground gait and balance training system," Journal of Rehabilitation Research & Development, vol. 48, No. 4, Available as Early as Jan. 1, 2011, (2011), 12 pages.
Hines, M. L. et al., "The Neuron Simulation Environment," Neural Computation, vol. 9, No. 6, (Aug. 15, 1997), 26 pages.
Hofstoetter, U. S. et al., "Effects of transcutaneous spinal cord stimulation on voluntary locomotor activity in an incomplete spinal cord injured individual", Biomed Tech, vol. 58 (Suppl. 1), (2013), 3 pages.
Hofstoetter, U. S. et al., "Model of spinal cord reflex circuits in humans: Stimulation frequency-dependence of segmental activities and their interactions", Second Congress International Society of Intraoperative Neurophysiology (ISIN), Dubrovnik, Croatia, (2009), 149 pages.
Hofstoetter, U. S. et al., "Modification of spasticity by transcutaneous spinal cord stimulation in individuals with incomplete spinal cord injury", The Journal of Spinal Cord Medicine, vol. 37, No. 2, (2014), pp. 202-211.
International Preliminary Report on Patentability dated Oct. 26, 2023, in Application No. PCT/US2022/024673.
International Search Report and Written Opinion dated Jun. 28, 2022, in PCT Application No. PCT/US2022/024673.
Ivanenko, Y. P. et al., "Temporal Components of the Motor Patterns Expressed by the Human Spinal Cord Reflect Foot Kinematics," Journal of Neurophysiology, vol. 90, No. 5, Nov. 2003, Published Online Jul. 9, 2003, (2003), 11 pages.
Jarosiewicz, B. et al., "Supplementary Materials for Virtual typing by people with tetraplegia using a self-calibrating intracortical brain-computer interface," Science Translational Medicine, vol. 7, No. 313, (Nov. 11, 2015), 26 pages.
Jarosiewicz, B. et al., "Virtual typing by people with tetraplegia using a self-calibrating intracortical brain-computer interface," Science Translational Medicine, vol. 7, No. 313, (Nov. 11, 2015), 11 pages.
Jilge, B. et al., "Initiating extension of the lower limbs in subjects with complete spinal cord injury by epidural lumbar cord stimulation", Exp Brain Res., vol. 154, (2004), pp. 308-326.
Johnson, W. L. et al., "Application of a Rat Hindlimb Model: A Prediction of Force Spaces Reachable Through Stimulation of Nerve Fascicles," IEEE Transactions on Bio-Medical Engineering, vol. 58, No. 12, Available Online Jan. 17, 2011, (Dec. 2011), 11 pages.
Jones, D. R. et al., "Efficient Global Optimization of Expensive Black-Box Functions", Journal of Global Optimization, vol. 13, (1998), pp. 455-492.
Jones, K. E. et al., "Computer Simulation of the Responses of Human Motoneurons to Composite 1A EPSPS: Effects of Background Firing Rate," The Journal of Physiology, vol. 77, No. 1, (1997), 16 pages.
JP Office Action dated Aug. 21, 2023 in Application No. JP2021-510130 with English Translation.
JP Office Action dated Dec. 11, 2023 in JP Application No. 2019-539960 with English Translation.
JP Office Action dated Dec. 11, 2023, in JP Application No. 2023-10295 with English translation.
JP Office Action dated Feb. 17, 2023 in Application No. JP2019-539960 with English translation.
JP Office Action dated Jul. 18, 2023 in Application No. JP2021-509772 with English translation.
JP Office Action dated Sep. 4, 2023, in Application No. JP2021-188658 with English translation.
Kakulas, B., "A Review of the Neuropathology of Human Spinal Cord Injury with Emphasis on Special Features," Proceedings of the Donald Munro Memorial Lecture at the American Paraplegia Society 44th Annual Conference, Las Vegas, Nevada, (Sep. 9, 1998), 6 pages.
Kirkwood, P., "Neuronal Control of Locomotion: From Mollusc to Man—G.N. Orlovsky, T.G. Deliagina and S. Grillner. Oxford University Press, Oxford, 1999. ISBN 0198524056 (Hbk), 322 pp.," Clinical Neurophysiology, vol. 111, No. 8, Published Online Jul. 17, 2000, (Aug. 1, 2000), 2 pages.
Kleinberg, R. et al., "Multi-armed bandits in metric spaces", In STOC, Computer and Automation Research Institute of the Hungarian Academy of Sciences, Budapest, Hungary, (2008), pp. 681-690.
Kocsis, L. et al. "Bandit Based Monte-Carlo Planning", European Conference on Machine Learning, Springer, Berlin, Heidelberg, (Sep. 2006), pp. 282-293.
Krassioukov, A. et al., "A Systematic Review of the Management of Autonomic Dysreflexia Following Spinal Cord Injury," Archives of Physical Medicine and Rehabilitation, vol. 90, No. 4, Apr. 2009, 27 pages.
Krassioukov, A. et al., "A Systematic Review of the Management of Orthostatic Hypotension Following Spinal Cord Injury," Archives of Physical Medicine and Rehabilitation, vol. 90, No. 5, May 2009, 22 pages.
Krause, A. et al. "Contextual Gaussian Process Bandit Optimization", In Advances in Neural Information Processing Systems (NIPS), (2011), 9 pages.
Krause, A. et al., "Near-optimal Nonmyopic Value of Information in Graphical Models", In UAI, (2005), 8 pages.
Krause, A. et al. "Near-Optimal Sensor Placements in Gaussian Processes: Theory, Efficient Algorithms and Empirical Studies", Journal of Machine Learning Research (JMLR), vol. 9, (Feb. 2008), pp. 235-284.
Kwakkel, G. et al., "Effects of Robot-assisted therapy on upper limb recovery after stroke: A Systematic Review," Neurorehabilitation and Neural Repair, vol. 22, No. 2, Published Online Sep. 17, 2007, (Mar. 2008), 11 pages.
Lavrov, I. et al., "Epidural Stimulation Induced Modulation of Spinal Locomotor Networks in Adult Spinal Rats," Journal of Neuroscience, vol. 28, No. 23, (Jun. 4, 2008), 8 pages.
Liu, J. et al., "Stimulation of the Parapyramidal Region of the Neonatal Rat Brain Stem Produces Locomotor-Like Activity Involving Spinal 5-HT7 and 5-HT2A Receptors", Journal of Neurophysiology, vol. 94, No. 2, Published Online May 4, 2005, (Aug. 1, 2005), 13 pages.
Lizotte, D. et al., "Automatic gait optimization with Gaussian process regression", In IJCAI, (2007), pp. 944-949.
Lovely, R. et al., "Effects of Training on the Recovery of Full-Weight-Bearing Stepping in the Adult Spinal Cat," Experimental Neurology, vol. 92, No. 2, (May 1986), 15 pages.
Lozano, A. et al., "Probing and Regulating Dysfunctional Circuits Using Deep Brain Stimulation," Neuron, vol. 77, No. 3, (Feb. 6, 2013), 19 pages.
McIntyre, C. C. et al., "Modeling the Excitability of Mammalian Nerve Fibers: Influence of Afterpotentials on the Recovery Cycle," Journal of Neurophysiology, vol. 87, No. 2, (Feb. 2002), 12 pages.
Minassian et al., "Mechanisms of rhythm generation of the human lumbar spinal cord in repose to tonic stimulation without and with step-related sensory feedback", Biomed Tech, vol. 58, (Suppl. 1), (2013), 3 pages.
Minassian, K. et al., "Human lumbar cord circuitries can be activated by extrinsic tonic input to generate locomotor-like activity", Human Movement Science, vol. 26, No. 2, (2007), pp. 275-295.
Minassian, K. et al., "Neuromodulation of lower limb motor control in restorative neurology", Clinical Neurology and Neurosurgery, vol. 114, (2012), pp. 489-497.
Minassian, K. et al., "Peripheral and Central Afferent Input to the Lumbar Cord", Biocybernetics and Biomedical Engineering, vol. 25, No. 3, (2005), pp. 11-29.
Minassian, K. et al., "Stepping-like movements in humans with complete spinal cord injury induced by epidural stimulation of the

(56) References Cited

OTHER PUBLICATIONS lumbar cord: electromyographic study of compound muscle action potentials", Spinal Cord, vol. 42, (2004), pp. 401-416.
Minev, I. R. et al., "Electronic dura mater for long-term multimodal neural interfaces," Science Magazine, vol. 347, No. 6218, (Jan. 9, 2015), 64 pages.
Minoux, M., Accelerated greedy algorithms for maximizing submodular set functions. Optimization Techniques, LNCS, (1978), pp. 234-243.
Moraud, E. et al., "Mechanisms Underlying the Neuromodulation of Spinal Circuits for Correcting Gait and Balance Deficits after Spinal Cord Injury," Neuron, vol. 89, No. 4, Feb. 17, 2016, Published Online Feb. 4, 2016, 15 pages.
Murg, M et al., "Epidural electric stimulation of posterior structures of the human lumbar spinal cord: 1. Muscle twitches—a functional method to define the site of stimulation", Spinal Cord, vol. 38, (2000), pp. 394-402.
Musienko, P. et al., "Combinatory Electrical and Pharmacological Neuroprosthetic Interfaces to Regain Motor Function After Spinal Cord Injury," IEEE Transactions on Biomedical Engineering, vol. 56, No. 11, Published Online Jul. 24, 2009, (Nov. 2009), 5 pages.
Musienko, P. et al., "Controlling specific locomotor behaviors through multidimensional monoaminergic modulation of spinal circuitries," The Journal of Neuroscience, vol. 31, No. 25, (Jun. 22, 2011), 15 pages.
Musienko, P. et al. "Multi-system neurorehabilitative strategies to restore motor functions following severe spinal cord injury," Experimental Neurology, vol. 235, No. 1, Published Online Sep. 7, 2011, (May 2012), 10 pages.
Musselman, K. et al., "Spinal Cord Injury Functional Ambulation Profile: A New Measure of Walking Ability," Neurorehabilitation and Neural Repair, vol. 25, No. 3, Published Online Feb. 25, 2011, (Mar. 2011), 9 pages.
Nandra, M. S. et al., "A wireless microelectrode implant for spinal cord stimulation and recording in rats", Presentation Abstract, 2013, 104 Pages.
National Health Service., "Lumbar Decompression Surgery: When it's used", NHS, Apr. 28, 2022, https://www.nhs.uk/conditions/lumbar-decompression-surgery/why-its-done/#:-:text=Cauda%20equina%20syndrome%20is%20a,is%20severe%20or%20getting%20worse.
Nessler, J. et al., "A Robotic Device for Studying Rodent Locomotion After Spinal Cord Injury," IEEE Transactions on Neural Systems and Rehabilitation Engineering, vol. 13, No. 4, (Dec. 12, 2005), 10 pages.
Pearson, K. G., "Generating the walking gait: role of sensory feedback," Progress in Brain Research, vol. 143, Chapter 12, Published Online Nov. 28, 2003, (2004), 7 pages.
Phillips, A. et al., "Contemporary Cardiovascular Concerns after Spinal Cord Injury: Mechanisms, Maladaptations, and Management," Journal of Neurotrama, vol. 32, No. 24, Dec. 15, 2015, 17 pages.
Phillips, A. et al., "Perturbed and spontaneous regional cerebral blood flow responses to changes in blood pressure after high-level spinal cord injury: the effect of midodrine," Journal of Applied Physiology, vol. 116, No. 6, Mar. 15, 2014, Available Online Jan. 16, 2014, 9 pages.
Phillips, A. et al., "Regional neurovascular coupling and cognitive performance in those with low blood pressure secondary to high-level spinal cord injury: improved by alpha-1 agonist midodrine hydrochloride," Journal of Cerebral Blood Flow & Metabolism, vol. 34, No. 5, May 2014, 8 pages.
Pratt, G. et al., "Stiffness Isn't Everything," Proceedings of the Fourth International Symposium on Experimental Robotics, (Jun. 30, 1995), 6 pages.
Pratt, J. et al., "Series elastic actuators for high fidelity force control," Industrial Robot: An International Journal, vol. 29, No. 3, Available as Early as Jan. 1, 2002, 13 pages.
Prochazka, A. et al., "Ensemble firing of muscle afferents recorded during normal locomotion in cats," The Journal of Physiology, vol. 507, No. 1, (Feb. 15, 1998), 12 pages.
Prochazka, A. et al., "Models of ensemble filing of muscle spindle afferents recorded during normal locomotion in cats," The Journal of Physiology, vol. 507, No. 1, (Feb. 15, 1998), 15 pages.
Pudo, D. et al., "Estimating Intensity Fluctuations in High Repetition Rate Pulse Trains Generated Using the Temporal Talbot Effect", IEEE Photonics Technology Letters, vol. 18, No. 5, (Mar. 1, 2006), 3 pages.
Rasmussen, C. E. et al., "Gaussian Processes for Machine Learning (GPML) Toolbox", The Journal of Machine Learning Research, vol. 11, (2010), pp. 3011-3015.
Rasmussen, C. E. et al., "Gaussian Processes for Machine Learning", The MIT Press, Cambridge, Massachusetts, (2006), 266 pages.
Rasmussen, C. E. "Gaussian Processes in Machine Learning", L.N.A.I., vol. 3176, (2003) pp. 63-71.
Rattay, F. et al., "Epidural electrical stimulation of posterior structures of the human lumbosacral cord: 2. Quantitative analysis by computer modeling", Spinal Cord, vol. 38, (2000), pp. 473-489.
Reinkensmeyer, D. et al., "Tools for understanding and optimizing robotic gait training," Journal of Rehabilitation Research & Development, vol. 43, No. 5, (Aug. 2006), 14 pages.
Rejc, E. et al., "Effects of Lumbosacral Spinal Cord Epidural Stimulation for Standing after Chronic Complete Paralysis in Humans," PLoS One, vol. 10, No. 7, (Jul. 24, 2015), 20 pages.
Robbins, H., "Some Aspects of the Sequential Design of Experiments", Bull. Amer. Math. Soc., vol. 58, (1952), pp. 527-535.
Rosenzweig, E. et al., "Extensive Spontaneous Plasticity of Corticospinal Projections After Primate Spinal Cord Injury", Nature Neuroscience, vol. 13, No. 12, Published Online Nov. 14, 2010, (Dec. 2010), 19 pages.
Ryzhov, I. O. et al., "The knowledge gradient algorithm for a general class of online learning problems", Operations Research, vol. 60, No. 1, (2012), pp. 180-195.
Sayenko, D. et al., "Neuromodulation of evoked muscle potentials induced by epidural spinal-cord stimulation in paralyzed individuals," Journal of Neurophysiology, vol. 111, No. 5, Published Online Dec. 11, 2013, (2014), 12 pages.
Shamir, R. R. et al., "Machine Learning Approach to Optimizing Combined Stimulation and Medication Therapies for Parkinson's Disease," Brain Stimulation, vol. 8, No. 6, Published Online Jun. 15, 2015, (Nov. 2015), 22 pages.
Srinivas, N. et al., "Gaussian process optimization in the bandit setting: No regret and experimental design", In Proceedings of the 27th International Conference on Machine Learning, (2010), 17 pages.
Steward, O. et al., "False Resurrections: Distinguishing Regenerated from Spared Axons in the Injured Central Nervous System", The Journal of Comparative Neurology, vol. 459, No. 1, (Apr. 21, 2003), 8 pages.
Stienen, A. H. A. et al., "Analysis of reflex modulation with a biologically realistic neural network," Journal of Computer Neuroscience, vol. 23, No. 3, Available Online May 15, 2007, (Dec. 2007), 16 pages.
Sun, F. et al., "Sustained axon regeneration induced by co-deletion of PTEN and SOCS3", Nature, vol. 480, No. 7377, Published Online Nov. 6, 2011, (Dec. 15, 2011), 12 pages.
Takeoka, A. et al., "Muscle Spindle Feedback Directs Locomotor Recovery and Circuit Reorganization after Spinal Cord Injury", Cell, vol. 159, No. 7, (Dec. 18, 2014), 27 pages.
Tenne, Y. et al., "Computational Intelligence in Expensive Optimization Problems", vol. 2 of Adaptation, Learning, and Optimization, Springer, Berlin Heidelberg, (2010), pp. 131-162.
Timozyk, W. et al., "Hindlimb loading determines stepping quantity and quality following spinal cord transection," Brain Research, vol. 1050, No. 1-2, Published Online Jun. 24, 2005, (Jul. 19, 2005), 10 pages.
U.S. Final Office Action dated Jun. 1, 2023 in U.S. Appl. No. 16/479,201.
U.S. Final Office Action dated Nov. 28, 2023 in U.S. Appl. No. 17/270,402.

(56) References Cited

OTHER PUBLICATIONS

U.S. Non-Final Office Action dated Apr. 28, 2023, in U.S. Appl. No. 17/270,402.
U.S. Non-Final Office Action dated Aug. 16, 2023, in U.S. Appl. No. 17/269,970.
U.S. Non-Final Office Action dated Feb. 15, 2023 in U.S. Appl. No. 15/740,323.
U.S. Non-Final Office Action dated Sep. 13, 2023, in U.S. Appl. No. 17/407,043.
Vallery, H. et al., "Compliant Actuation of Rehabilitation Robots," IEEE Robotics & Automation Magazine, vol. 15, No. 3, (Sep. 12, 2008), 10 pages.
Van Den Brand, R. et al., "Restoring Voluntary Control of Locomotion after Paralyzing Spinal Cord Injury," Science Magazine, vol. 336, No. 6085, (Jun. 1, 2012), 5 pages.
Wan, D. et al., "Life-threatening outcomes associated with autonomic dysreflexia: A clinical review," Journal of Spinal Cord Medicine, vol. 37, No. 1, (Jan. 2014), 9 pages.
Wenger, N. et al. "Closed-loop neuromodulation of spinal sensorimotor circuits controls refined locomotion after complete spinal cord injury" Sci Transl Med. Sep. 24, 2014, vol. 6, Issue 255, (10 pages).
Wenger, N. et al., "Spatiotemporal neuromodulation therapies engaging muscle synergies improve motor control after spinal cord injury," Natural Medicine, vol. 22, No. 2, Available Online Jan. 18, 2016, (Feb. 2016), 33 pages.
Wenger, N. et al., "Supplementary Materials for Closed-loop neuromodulation of spinal sensorimotor circuits controls refined locomotion after complete spinal cord injury," Science Translational Medicine, vol. 6, No. 255, Sep. 24, 2014, 14 pages.
Wernig, A. et al., "Laufband locomotion with body weight support improved walking in persons with severe spinal cord injuries", Paraplegia, vol. 30, No. 4, (Apr. 1992), 10 pages.
Wernig, A., "Ineffectiveness of Automated Locomotor Training," Archives of Physical Medicine and Rehabilitation, vol. 86, No. 12, (Dec. 2005), 2 pages.
Wessels, M. et al., "Body Weight-Supported Gait Training for Restoration of Walking in People With an Incomplete Spinal Cord Injury: A Systematic Review," Journal of Rehabilitation Medicine, vol. 42, No. 6, (Jun. 2010), 7 pages.
Widmer, C. et al., Inferring latent task structure for multitask learning by multiple kernel learning, BMC Bioinformatics, vol. 11, (Suppl 8:S5), (2010), 8 pages.
Winter, D. A. et al., "An integrated EMG/biomechanical model of upper body balance and posture during human gait," Progress in Brain Research, vol. 97, Ch. 32, Available as Early as Jan. 1, 1993, (1993), 9 pages.
Wirz, M. et al., "Effectiveness of automated locomotor training in patients with acute incomplete spinal cord injury: A randomized controlled multicenter trial," BMC Neurology, vol. 11, No. 60, (May 27, 2011), 9 pages.
Yakovenko, S. et al., "Spatiotemporal Activation of Lumbosacral Motoneurons in the Locomotor Step Cycle," Journal of Neurophysiology, vol. 87, No. 3, (Mar. 2002), 12 pages.
Zhang, T. C. et al., "Mechanisms and models of spinal cord stimulation for the treatment of neuropathic pain," Brain Research, vol. 1569, Published Online May 4, 2014, (Jun. 20, 2014), 13 pages.
Zorner, B. et al., "Profiling locomotor recovery: comprehensive quantification of impairments after CNS damage in rodents," Nature Methods, vol. 7, No. 9, Published Online Aug. 15, 2010, (Sep. 2010), 11 pages.

\* cited by examiner

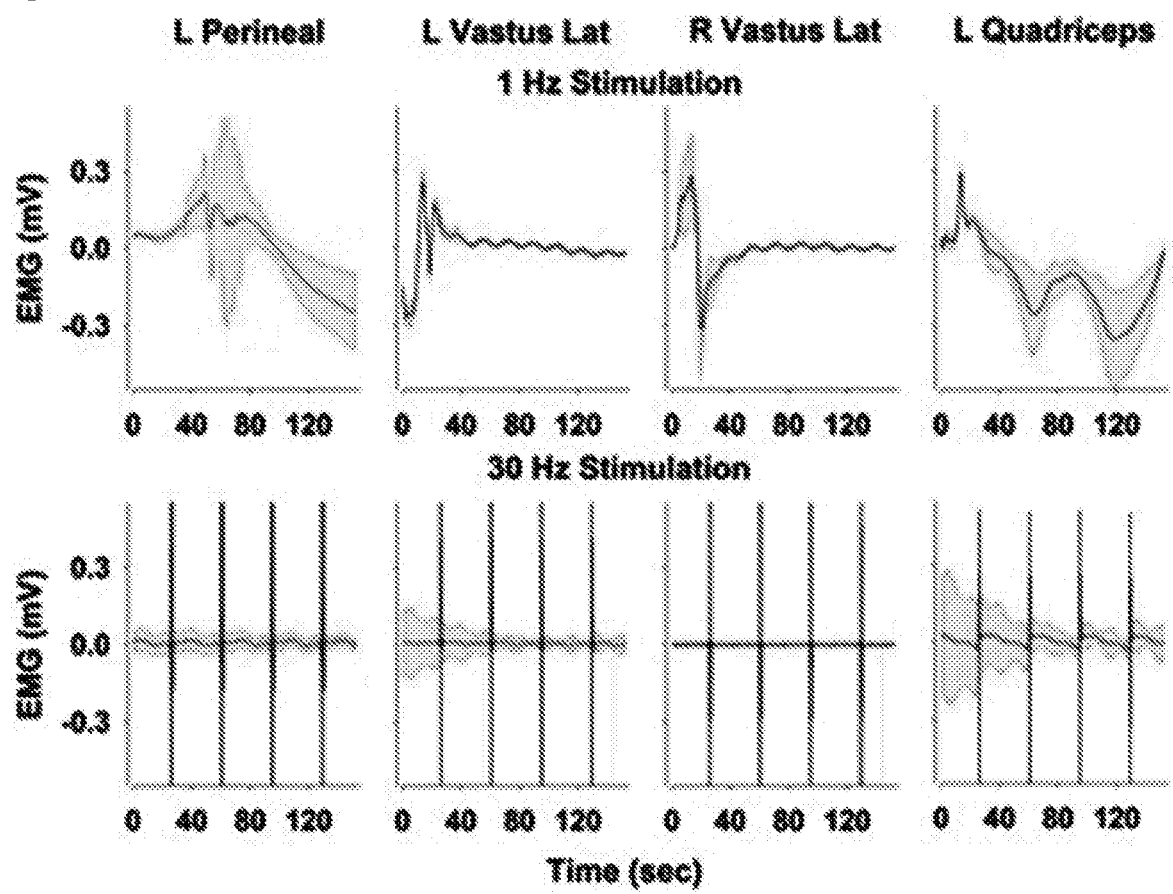
*Fig. 2, cont'd.*

ACCESSING SPINAL NETWORKS TO ADDRESS SEXUAL DYSFUNCTION

CROSS-REFERENCE TO RELATED APPLICATIONS

This application is a U.S. 371 National Phase of PCT/US2018/033942, filed on May 22, 2018, which claims benefit of and priority to U.S. Ser. No. 62/510,245, filed on May 23, 2017, both of which are incorporated herein by reference in their entirety for all purposes.

STATEMENT OF GOVERNMENTAL SUPPORT

This invention was made with government support under W81XWH-14-2-0129 awarded by the Medical Research and Development Command, and TR000124 awarded by the National Institutes of Health. The government has certain rights in the invention.

BACKGROUND

Spinal cord injury is a serious condition that frequently leads to long-term disabilities and significant social and economic consequences. The incidence annually is approximately 12.7 to 52.2 per 1 million (Oteir et al. (2014) *Prehospital and Disaster Med.,* 29: 399-402). The annual total cost in the US is estimated to be approximately 10 billion dollars (Ma et al. (2014) *Arch. Phys. Med. Rehab.,* 95: 986-995). Currently, there are more than 250,000 spinal cord injured individuals living in the US. Multiple studies have shown that bladder function, along with sexual function, consistently rank as the top health and quality of life priorities in these individuals (see, e.g., Simpson et al. (2012) *J. Neurotrauma,* 29: 1548-1555; Bloemen-Vrencken et al. (2005) *Disabil. Rehab.* 27: 1381-1389).

Oral medications or pills for erectile dysfunction for men after spinal cord injury have been found to be helpful in sustaining erections. Examples of medications commonly prescribed to help erections are: VIAGRA® (sildenafil citrate) typically taken 20-60 minutes before having sex, LEVITRA® (vardenafil) typically taken 60 minutes before sexual activity, and CIALIS® (tadalafil) typically taken 30 minutes before sexual activity or once daily. These medications work in the body by decreasing blood pressure. As a result, they can have serious side effects if not used correctly. They also may interact with other medications often prescribed after spinal cord injury. Thus, these medications may work for some, they are not safe for everyone to take.

Sometimes medications are injected directly into the penis. They work by helping blood vessels open. This causes the penis to fill with blood and results in an erection. The most common medication is CAVERJECT® (alprotadil) and is only available by prescription from a doctor.

In certain instances, penile implants are used. Penile implants are rods that are placed in the penis. The rods are placed in the penis through surgery. The rods are permanent unless surgically removed. The rods are successful at creating an erection when needed. However, there is always a risk of complications. Risks may include infection, pressure sores, or scar tissue forming in the penis.

Other sexual aids include vacuum pumps and tension rings. A vacuum pump is a cylinder device with an air pump. It is placed over the penis and when the device is pumped, blood is drawn into the penis resulting in an erection. To maintain the erection, a ring is place at the base of the penis to slow to flow of blood out of the penis. This is a good option for men who cannot achieve an erection on their own. However, risks include bruising and damage to the penis especially if the ring is left on for more than 30 minutes. Penile skin and tissue can be severely damaged as well.

Implanted epidural stimulation has been shown to improve sexual function in research studies of SCI subjects. However, the procedure is invasive and requires surgery.

SUMMARY

In various embodiments methods and devices are provided to restore the function of the injured brain, spinal cord, nerve roots, or peripheral nerves thereby regaining sexual function. The orchestrated neuromuscular control of sexual function by the sensory, motor and autonomic nervous systems can be impaired by degenerative or traumatic changes, such as multiple sclerosis, spinal cord injury, stroke, and age. It was discovered that stimulation (especially magnetic stimulation) of the spinal cord and associated nerve roots can restore and improve sexual function.

This strategy can be used to rehabilitate individuals without, or with diminished sexual function after injury such a stroke, TBI, multiple sclerosis, cauda equina syndrome, amyotrophic lateral sclerosis, or spinal cord injury. Moreover, it was surprisingly discovered that magnetic stimulation can restore subsequent volitional control of sexual function in subjects with impaired sexual function.

Various embodiments contemplated herein may include, but need not be limited to, one or more of the following:

Various embodiments contemplated herein may include, but need not be limited to, one or more of the following:

Embodiment 1: A method of improving or restoring sexual function in in a subject with impaired sexual function, said method comprising:
   providing magnetic stimulation of the spinal cord at a location, frequency and intensity sufficient to improve or restore (e.g., to facilitate) sexual function in said subject.

Embodiment 2: The method of embodiment 1, wherein said subject is a subject without a neuromotor disorder but having impaired sexual function (e.g., erectile dysfunction).

Embodiment 3: The method of embodiment 2, wherein said subject is a subject with erectile dysfunction (ED), but who is otherwise healthy.

Embodiment 4: The method of embodiment 2, wherein said subject is a subject with erectile dysfunction (ED), who is diagnosed with a pathology associated with said ED, other than a neuromotor disorder.

Embodiment 5: The method of embodiment 4, wherein said subject has a pathology selected from the group consisting of heart disease, atherosclerosis, high cholesterol, high blood pressure, diabetes, obesity, metabolic syndrome, Parkinson's disease, multiple sclerosis, prostate cancer or enlarged prostate.

Embodiment 6: The method of embodiment 2, wherein said erectile dysfunction is after prostate biopsy.

Embodiment 7: The method of embodiment 1, wherein said subject is a subject with a neuromotor disorder.

Embodiment 8: The method according to any one of embodiments 1-7, wherein said subject is a male.

Embodiment 9: The method of embodiment 8, wherein said stimulation initiates or increases/improves erectile function in a male.

Embodiment 10: The method according to any one of embodiments 1-9, wherein said method amelioriates erectile dysfunction.

Embodiment 11: The method according to any one of embodiments 1-10, wherein said method improves a sexual health inventor for men (SHIM) score of said subject.

Embodiment 12: The method according to any one of embodiments 1-11, wherein said magnetic stimulation comprises stimulation at a frequency ranging from about 0.1 Hz, or from about 0.5 Hz or from about 1 Hz, or from about 5 Hz, or from about 10 Hz up to about 100 Hz, or up to about 80 Hz, or up to about 60 Hz, or up to about 50 Hz, or up to about 40 Hz, or up to about 20 Hz.

Embodiment 13: The method according to any one of embodiments 1-11, wherein said magnetic stimulation comprises stimulation at a frequency of about 1 Hz.

Embodiment 14: The method according to any one of embodiments 1-13, wherein said magnetic stimulation comprises magnetic pulses ranging in duration from about 5 μs, or from about 10 μs, or from about 15 μs, or from about 20 μs up to about 500 μs, or up to about 400 μs, or up to about 300 μs, or up to about 200 μs, or up to about 100 μs, or up to about 50 μs.

Embodiment 15: The method of embodiment 14, wherein said magnetic pulses are about 25 μs in duration.

Embodiment 16: The method according to any one of embodiments 1-15, wherein said magnetic stimulation is monophasic.

Embodiment 17: The method according to any one of embodiments 1-16, wherein a single treatment of said magnetic stimulation comprises 1, or 2, or 3, or 4, or 5, or 6, or 7, or 8, or 9, or 10 or more continuous stimulation periods.

Embodiment 18: The method of embodiment 17, wherein a single treatment of said magnetic stimulation comprises about 3 continuous stimulation periods.

Embodiment 19: The method according to any one of embodiments 17-18, wherein said continuous stimulation periods range in duration from about 10 sec, or from about 20 sec, or from about 3 sec or from about 40 sec, or from about 50 sec, or from about 1 min, or from about 2 minutes up to about 30 minutes, or up to about 15 minutes, or up to about 10 minutes, or up to about 8 minutes, or up to about 6 minutes.

Embodiment 20: The method of embodiment 19, wherein said continues stimulation periods are about 4 minutes in duration.

Embodiment 21: The method according to any one of embodiments 17-20, wherein a delay between continuous stimulation periods ranges from about 5 sec, or from about 10 sec, or from about 15 sec, or from about 20 sec up to about 5 minutes, or up to about 4 minutes, or up to about 3 minutes, or up to about 2 minutes, or up to about 1 min, or up to about 45 sec, or up to about 30 sec.

Embodiment 22: The method of embodiment 21, wherein a delay between continuous stimulation periods is about 30 sec.

Embodiment 23: The method according to any one of embodiments 17-22, wherein said treatment is repeated.

Embodiment 24: The method of embodiment 23, wherein said treatment is repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days.

Embodiment 25: The method according to any one of embodiments 23-24, wherein the treatment is repeated over a period of at least 1 week, or at least two weeks, or at least 3 weeks, or at least 4 weeks, or at least 5 weeks, or at least 6 weeks, or at least 7 weeks, or at least 8 weeks, or at least 9 weeks, or at least 10 weeks, or at least 11 weeks, or at least 12 weeks, or at least 4 months, or at least 5 months, or at least 6 months, or at least 7 months, or at least 8 months, or at least 9 months, or at least 10 months, or at least 11 months, or at least 12 months.

Embodiment 26: The method according to any one of embodiments 1-25, wherein treatment of said subject with said magnetic stimulation facilitates sexual function at a later time without magnetic stimulation.

Embodiment 27: The method according to any one of embodiments 23-26, wherein said treatment is repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days until the subject obtains volitional control of sexual function.

Embodiment 28: The method of embodiment 27, wherein the frequency of treatment is reduced after the subject obtains volitional control of sexual function.

Embodiment 29: The method of embodiment 28, wherein the frequency of treatment is reduced to a level sufficient to maintain volitional control of sexual function.

Embodiment 30: The method of embodiment 29, wherein the frequency of treatment is reduced to every three days, or to a weekly treatment, or to about every 10 days, or to about every 2 weeks.

Embodiment 31: The method according to any one of embodiments 1-30, wherein said magnetic stimulation is applied over the thoracic and/or lumbosacral spinal cord.

Embodiment 32: The method according to any one of embodiments 1-31, wherein said magnetic stimulation is applied over one or more regions straddling or spanning a region selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T11-T11, T11-T12, T12-T12.

Embodiment 33: The method according to any one of embodiments 1-32, wherein said magnetic stimulation is applied over one or more regions straddling or spanning a region selected from the group consisting of L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6.

Embodiment 34: The method according to any one of embodiments 1-33, wherein said magnetic stimulation is applied over one or more regions straddling or spanning a region selected from the group consisting of C0-C1, C0-C2, C0-C3, C0-C4, C0-C5, C0-C6, C0-C7, C0-T1, C1-C1, C1-C2, C1-C3, C1-C4, C1-C7, C1-C6, C1-C7, C1-T1, C2-C2, C2-C3, C2-C4, C2-C5, C2-C6, C2-C7, C2-T1, C3-C3, C3-C4, C3-C5, C3-C6, C3-C7, C3-T1, C4-C4, C4-05, C4-C6, C4-C7, C4-T1, C5-C5, C5-C6, C5-C7, C5-T1, C6-C6, C6-C7, C6-T1, C7-C7, and C7-T1.

Embodiment 35: The method of embodiment 31, wherein said magnetic stimulation is applied over a region between T11 and L4.

Embodiment 36: The method of embodiment 35, wherein said magnetic stimulation is applied over one or more regions selected from the group consisting of T11-T12, L1-L2, and L2-L3.

Embodiment 37: The method of embodiment 35, wherein said magnetic stimulation is applied over L1-L2 and/or over T11-T12.

Embodiment 38: The method of embodiment 35, wherein said magnetic stimulation is applied over L1.

Embodiment 39: The method according to any one of embodiments 1-38, wherein said magnetic stimulation is applied at the midline of spinal cord.

Embodiment 40: The method according to any one of embodiments 1-39, wherein said magnetic stimulation produces a magnetic field of at least about 1 tesla, or at least about 2 tesla, or at least about 3 tesla, or at least about 4 tesla, or at least about 5 tesla.

Embodiment 41: The method according to any one of embodiments 1-40, wherein said magnetic stimulation is applied using a single coil stimulator.

Embodiment 42: The method according to any one of embodiments 1-40, wherein said magnetic stimulation is applied using a double coil stimulator.

Embodiment 43: The method according to any one of embodiments 1-42, wherein the stimulation applied by the subject.

Embodiment 44: The method according to any one of embodiments 1-42, wherein the stimulation is applied by medical care personnel.

Embodiment 45: The method according to any one of embodiments 1-44, wherein said subject is administered one or more drugs for an erectile dysfunction.

Embodiment 46: The method of embodiment 45, wherein said subject is administered one or more drugs selected from the group consisting of tadalafil (CIALIS®), sildenafil (VIAGRA®), vardenafil (STAXYN®, LEVITRA®), and alprostadil (CAVERJECT IMPULSE®).

Embodiment 47: The method according to any one of embodiments 1-46, wherein said subject is administered at least one monoaminergic agonist.

Embodiment 48: The method of embodiment 47, wherein said at least one monoaminergic agonist comprises an agent selected from the group consisting of a serotonergic drug, a dopaminergic drug, a noradrenergic drug, a GABAergic drug, and a glycinergic drug.

Embodiment 49: The method of embodiment 48, wherein said agent is selected from the group consisting of 8-hydroxy-2-(di-n-propylamino)tetralin (8-OH-DPAT), 4-(benzodioxan-5-yl)1-(indan-2-yl)piperazine (S15535), N-{2-[4-(2-methoxyphenyl)-1-piperazinyl]ethyl}-N-(2-pyridinyl) cyclo-hexanecarboxamide (WAY 100.635), Quipazine, Ketanserin, 4-amino-(6-chloro-2-pyridyl)-1 piperidine hydrochloride (SR 57227A), Ondanesetron, Buspirone, Methoxamine, Prazosin, Clonidine, Yohimbine, 6-chloro-1-phenyl-2,3,4,5-tetrahydro-1H-3-benzazepine-7,8-diol (SKF-81297), 7-chloro-3-methyl-1-phenyl-1,2,4,5-tetrahydro-3-benzazepin-8-ol (SCH-23390), Quinpirole, and Eticlopride.

Embodiment 50: The method of embodiment 48, wherein said monoaminergic agonist is buspirone.

Embodiment 51: The method according to any one of embodiments 1-50, wherein said subject is a non-human mammal.

Embodiment 52: The method according to any one of embodiments 1-50, wherein said subject is a human.

Embodiment 53: The method according to any one of embodiments 7-52, wherein said neuromotor disorder comprises a spinal cord injury.

Embodiment 54: The method of embodiment 53, wherein said spinal cord injury is clinically classified as motor complete.

Embodiment 55: The method of embodiment 53, wherein said spinal cord injury is clinically classified as motor incomplete.

Embodiment 56: The method according to any one of embodiments 7-52, wherein said neuromotor disorder comprises an ischemic brain injury.

Embodiment 57: The method of embodiment 56, wherein said ischemic brain injury is brain injury from stroke or acute trauma.

Embodiment 58: The method according to any one of embodiments 7-52, wherein said neuromotor disorder comprises a neurodegenerative pathology.

Embodiment 59: The method of embodiment 58, wherein said neurodegenerative pathology is associated with a condition selected from the group consisting of stroke, Parkinson's disease, Huntington's disease, Alzheimer's disease, amyotrophic lateral sclerosis (ALS), primary lateral sclerosis (PLS), dystonia, and cerebral palsy.

Embodiment 60: A magnetic stimulator configured to facilitate sexual function in a subject with impaired sexual function, wherein said magnetic stimulator when disposed over a region of the spinal cord, provides magnetic stimulation of the spinal cord at a frequency and intensity sufficient to initiate and/or to facilitate sexual function.

Embodiment 61: The magnetic stimulator of embodiment 60, wherein stimulator is configured to facilitate sexual function in a subject without a neuromotor disorder but who has impaired sexual function.

Embodiment 62: The magnetic stimulator of embodiment 60, wherein stimulator is configured to facilitate sexual function in a subject with a neuromotor disorder.

Embodiment 63: The magnetic stimulator according to any one of embodiments 60-62, wherein said magnetic stimulator is configured to facilitate sexual function by providing magnetic stimulation of the spinal cord at a location, frequency and intensity sufficient to facilitate sexual function.

Embodiment 64: The magnetic stimulator of embodiment 63, wherein said magnetic stimulator initiates or increases/improves erectile function in a male.

Embodiment 65: The magnetic stimulator according to any one of embodiments 63-64, wherein said magnetic stimulator is configured to provide magnetic stimulation over the thoracic and/or lumbosacral spinal cord.

Embodiment 66: The magnetic stimulator of embodiment 63, wherein said magnetic stimulator is configured to provide magnetic stimulation over one or more regions selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T11-T11, T11-T12, T12-T12, L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6.

Embodiment 67: The magnetic stimulator of embodiment 63, wherein said magnetic stimulator is configured to provide magnetic stimulation over one or more regions selected from the group consisting of T11-T12, L1-L2, and L2-L3.

Embodiment 68: The magnetic stimulator of embodiment 63, wherein said magnetic stimulator is configured to provide magnetic stimulation over L1-L2 and/or over T11-T12.

Embodiment 69: The magnetic stimulator according to any one of embodiments 60-68, wherein said magnetic stimulator is configured to produce a magnetic field of at least 1 tesla, or at least 2 tesla, or at least 3 tesla, or at least 4 tesla.

Embodiment 70: The magnetic stimulator according to any one of embodiments 60-69, wherein said magnetic stimulator is configured to produce a stimulation at a frequency of at least about 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz.

Embodiment 71: The magnetic stimulator according to any one of embodiments 60-69, wherein said magnetic stimulator is configured to produce a stimulation at a frequency ranging from about 1 Hz, or from about 2 Hz, or from about 3 Hz, or from about 4 Hz, or from about 5 Hz, or from about 10 Hz, or from about 10 Hz, or from about 10 Hz, up to about 500 Hz, or up to about 400 Hz, or up to about 300 Hz, or up to about 200 Hz up to about 100 Hz, or up to about 90 Hz, or up to about 80 Hz, or up to about 60 Hz, or up to about 40 Hz, or from about 3 Hz or from about 5 Hz up to about 80 Hz, or from about 5 Hz to about 60 Hz, or up to about 30 Hz.

Embodiment 72: The magnetic stimulator according to any one of embodiments 60-69, wherein said magnetic stimulator is configured to produce a stimulation at a frequency ranging from about 20 Hz or about 30 Hz to about 90 Hz or to about 100 Hz.

Embodiment 73: The magnetic stimulator according to any one of embodiments 60-72, wherein said magnetic comprises a single stimulation coil.

Embodiment 74: The magnetic stimulator according to any one of embodiments 60-72, wherein said magnetic stimulator comprises a double stimulation coil.

Embodiment 75: The magnetic stimulator according to any one of embodiments 60-74, wherein the stimulator is configured for application of the stimulation by the subject.

Embodiment 76: The magnetic stimulator according to any one of embodiments 60-74, wherein the stimulator is configured for application of the stimulation by medical care personnel.

Embodiment 77: A method of improving or restoring sexual function in in a subject with impaired sexual function, where said subject does not have a brain or spinal cord injury, said method comprising:
providing transcutaneous stimulation of the spinal cord at a location, frequency and intensity sufficient to improve or restore sexual function in said subject.

Embodiment 78: The method of embodiment 77, wherein said subject is a subject without a neuromotor disorder but having impaired sexual function (e.g., erectile dysfunction).

Embodiment 79: The method of embodiment 78, wherein said subject is a subject with erectile dysfunction (ED), but who is otherwise healthy.

Embodiment 80: The method of embodiment 78, wherein said subject is a subject with erectile dysfunction (ED), who is diagnosed with a pathology associated with said ED, other than a neuromotor disorder.

Embodiment 81: The method of embodiment 80, wherein said subject has a pathology selected from the group consisting of heart disease, atherosclerosis, high cholesterol, high blood pressure, diabetes, obesity, metabolic syndrome, Parkinson's disease, multiple sclerosis, prostate cancer or enlarged prostate.

Embodiment 82: The method of embodiment 78, wherein said erectile dysfunction is after prostate biopsy.

Embodiment 83: The method according to any one of embodiments 77-82, wherein said subject is a male.

Embodiment 84: The method of embodiment 83, wherein said stimulation initiates or increases/improves erectile function in a male.

Embodiment 85: The method according to any one of embodiments 77-84, wherein said method mitigates erectile dysfunction.

Embodiment 86: The method according to any one of embodiments 77-85, wherein said method improves a sexual health inventor for men (SHIM) score of said subject.

Embodiment 87: The method according to any one of embodiments 77-86, wherein said transcutaneous stimulation is at a frequency, pulse width, and amplitude sufficient to improve and/or to restore sexual function in a male.

Embodiment 88: The method according to any one of embodiments 77-87, wherein said transcutaneous electrical stimulation comprises stimulation at a frequency ranging from about 0.1 Hz, or from about 0.5 Hz or from about 1 Hz, or from about 5 Hz, or from about 10 Hz up to about 100 Hz, or up to about 80 Hz, or up to about 60 Hz, or up to about 50 Hz, or up to about 40 Hz, or up to about 20 Hz.

Embodiment 89: The method according to any one of embodiments 77-88, wherein said transcutaneous electrical stimulation comprises stimulation at a frequency of about 1 Hz.

Embodiment 90: The method according to any one of embodiments 77-89, wherein said transcutaneous electrical stimulation is at an intensity ranging from about 5 mA or about 10 mA up to about 500 mA, or from about 5 mA or about 10 mA up to about 400 mA, or from about 5 mA or about 10 mA up to about 300 mA, or from about 5 mA or about 10 mA up to about 200 mA, or from about 5 mA or about 10 mA to up about 150 mA, or from about 5 mA or about 10 mA up to about 50 mA, or from about 5 mA or about 10 mA up to about 100 mA, or from about 5 mA or about 10 mA up to about 80 mA, or from about 5 mA or about 10 mA up to about 60 mA, or from about 5 mA or about 10 mA up to about 50 mA.

Embodiment 91: The method according to any one of embodiments 77-90, wherein the transcutaneous stimulation comprises pulses having a width that ranges from about 100 μs up to about 1 ms or up to about 800 μs, or up to about 600 μs, or up to about 500 μs, or up to about 400 μs, or up to about 300 μs, or up to about 200 μs, or up to about 100 μs, or from about 150 μs up to about 600 μs, or from about 200 μs up to about 500 μs, or from about 200 μs up to about 400 μs.

Embodiment 92: The method according to any one of embodiments 77-91, wherein said transcutaneous electrical stimulation pulses range in duration from about 5 µs, or from about 10 µs, or from about 15 µs, or from about 20 µs up to about 500 µs, or up to about 400 µs, or up to about 300 µs, or up to about 200 µs, or up to about 100 µs. or up to about 50 µs.

Embodiment 93: The method of embodiment 92, wherein said transcutaneous electrical pulses are about 25 µs in duration.

Embodiment 94: The method according to any one of embodiments 77-93, wherein said transcutaneous electrical stimulation is superimposed on a high frequency carrier signal.

Embodiment 95: The method of embodiment 94, wherein said high frequency carrier signal is at a frequency greater than about 1 kHz, or greater than about 2 kHz, or greater than about 3 kHz, or greater than about 5 kHz, or greater than about 10 kH.

Embodiment 96: The method according to any one of embodiments 94-95, wherein the high frequency carrier signal ranges from about 3 kHz, or about 5 kHz, or about 8 kHz up to about 30 kHz, or up to about 20 kHz, or up to about 15 kHz.

Embodiment 97: The method of embodiment 94, wherein said high frequency carrier signal is at a frequency of about 10 kHz.

Embodiment 98: The method according to any one of embodiments 94-97, wherein the carrier frequency amplitude ranges from about 30 mA, or about 40 mA, or about 50 mA, or about 60 mA, or about 70 mA, or about 80 mA up to about 300 mA, or up to about 200 mA, or up to about 150 mA.

Embodiment 99: The method according to any one of embodiments 77-98, wherein the transcutaneous electrical stimulation is a 1 Hz transcutaneous electrical stimulation evoked with a 10 kHz constant-current bipolar rectangular stimulus for 0.5 ms at 30 to 100 mA repeated at 1-40 times per second for 10 to 30 s.

Embodiment 100: The method according to any one of embodiments 77-99, wherein a single treatment of said transcutaneous electrical stimulation comprises 1, or 2, or 3, or 4, or 5, or 6, or 7, or 8, or 9, or 10 or more continuous stimulation periods.

Embodiment 101: The method of embodiment 100, wherein a single treatment of said transcutaneous electrical stimulation comprises about 3 continuous stimulation periods.

Embodiment 102: The method according to any one of embodiments 100-101, wherein said continuous stimulation periods range in duration from about 10 sec, or from about 20 sec, or from about 3 sec or from about 40 sec, or from about 50 sec, or from about 1 min, or from about 2 minutes up to about 30 minutes, or up to about 15 minutes, or up to about 10 minutes, or up to about 8 minutes, or up to about 6 minutes.

Embodiment 103: The method of embodiment 102, wherein said continues stimulation periods are about 4 minutes in duration.

Embodiment 104: The method according to any one of embodiments 100-103, wherein a delay between continuous stimulation periods ranges from about 5 sec, or from about 10 sec, or from about 15 sec, or from about 20 sec up to about 5 minutes, or up to about 4 minutes, or up to about 3 minutes, or up to about 2 minutes, or up to about 1 min, or up to about 45 sec, or up to about 30 sec.

Embodiment 105: The method of embodiment 104, wherein a delay between continuous stimulation periods is about 30 sec.

Embodiment 106: The method according to any one of embodiments 100-105, wherein said treatment is repeated.

Embodiment 107: The method of embodiment 106, wherein said treatment is repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days.

Embodiment 108: The method according to any one of embodiments 106-107, wherein the treatment is repeated over a period of at least 1 week, or at least two weeks, or at least 3 weeks, or at least 4 weeks, or at least 5 weeks, or at least 6 weeks, or at least 7 weeks, or at least 8 weeks, or at least 9 weeks, or at least 10 weeks, or at least 11 weeks, or at least 12 weeks, or at least 4 months, or at least 5 months, or at least 6 months, or at least 7 months, or at least 8 months, or at least 9 months, or at least 10 months, or at least 11 months, or at least 12 months.

Embodiment 109: The method according to any one of embodiments 77-108, wherein said transcutaneous stimulation is applied over the thoracic and/or lumbosacral spinal cord.

Embodiment 110: The method according to any one of embodiments 77-109, wherein said transcutaneous stimulation is applied over one or more regions straddling or spanning a region selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T11-T11, T11-T12, T12-T12.

Embodiment 111: The method according to any one of embodiments 77-110, wherein said transcutaneous stimulation is applied over one or more regions straddling or spanning a region selected from the group consisting of L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6.

Embodiment 112: The method according to any one of embodiments 77-111, wherein said transcutaneous stimulation is applied over one or more regions straddling or spanning a region selected from the group consisting of C0-C1, C0-C2, C0-C3, C0-C4, C0-C5, C0-C6, C0-C7, C0-T1, C1-C1, C1-C2, C1-C3, C1-C4, C1-C7, C1-C6, C1-C7, C1-T1, C2-C2, C2-C3, C2-C4, C2-C5, C2-C6, C2-C7, C2-T1, C3-C3, C3-C4, C3-C5, C3-C6, C3-C7, C3-T1, C4-C4, C4-C5, C4-C6, C4-C7, C4-T1, C5-C5, C5-C6, C5-C7, C5-T1, C6-C6, C6-C7, C6-T1, C7-C7, and C7-T1.

Embodiment 113: The method of embodiment 109, wherein said transcutaneous electrical stimulation is applied over a region between T11 and L4.

Embodiment 114: The method of embodiment 113, wherein said transcutaneous electrical stimulation is applied over one or more regions selected from the group consisting of T11-T12, L1-L2, and L2-L3.

Embodiment 115: The method of embodiment 113, wherein said transcutaneous electrical stimulation is applied over L1-L2 and/or over T11-T12.

Embodiment 116: The method of embodiment 113, wherein said transcutaneous electrical stimulation is applied over L1.

Embodiment 117: The method according to any one of embodiments 77-116, wherein said transcutaneous electrical stimulation is applied at the midline of spinal cord.

Embodiment 118: The method according to any one of embodiments 77-117, wherein the stimulation applied by the subject.

Embodiment 119: The method according to any one of embodiments 77-117, wherein the stimulation is applied by medical care personnel.

Embodiment 120: The method according to any one of embodiments 77-119, wherein said subject is administered one or more drugs for an erectile dysfunction.

Embodiment 121: The method of embodiment 120, wherein said subject is administered one or more drugs selected from the group consisting of tadalafil (CIALIS®), sildenafil (VIAGRA®), vardenafil (STAXYN®, LEVITRA®), and alprostadil (CAVERJECT IMPULSE®).

Embodiment 122: The method according to any one of embodiments 77-121, wherein said subject is administered at least one monoaminergic agonist.

Embodiment 123: The method of embodiment 122, wherein said at least one monoaminergic agonist comprises an agent selected from the group consisting of a serotonergic drug, a dopaminergic drug, a noradrenergic drug, a GABAergic drug, and a glycinergic drug.

Embodiment 124: The method of embodiment 123, wherein said agent is selected from the group consisting of 8-hydroxy-2-(di-n-propylamino)tetralin (8-OH-DPAT), 4-(benzodioxan-5-yl)1-(indan-2-yl)piperazine (S15535), N-{2-[4-(2-methoxyphenyl)-1-piperazinyl]ethyl}-N-(2-pyridinyl)cyclo-hexanecarboxamide (WAY 100.635), Quipazine, Ketanserin, 4-amino-(6-chloro-2-pyridyl)-1 piperidine hydrochloride (SR 57227A), Ondanesetron, Buspirone, Methoxamine, Prazosin, Clonidine, Yohimbine, 6-chloro-1-phenyl-2,3,4,5-tetrahydro-1H-3-benzazepine-7,8-diol (SKF-81297), 7-chloro-3-methyl-1-phenyl-1,2,4,5-tetrahydro-3-benzazepin-8-ol (SCH-23390), Quinpirole, and Eticlopride.

Embodiment 125: The method of embodiment 123, wherein said monoaminergic agonist is buspirone.

Embodiment 126: The method according to any one of embodiments 77-125, wherein said subject is a non-human mammal.

Embodiment 127: The method according to any one of embodiments 77-125, wherein said subject is a human.

Definitions

As used herein "electrical stimulation" or "stimulation" means application of an electrical signal that may be either excitatory or inhibitory to a muscle or neuron and/or to groups of neurons and/or interneurons. It will be understood that an electrical signal may be applied to one or more electrodes with one or more return electrodes.

As used herein "magnetic stimulation" or means use of a varying magnetic field to induce an electrical signal, e.g., in a neuron, that may be either excitatory or inhibitory to a muscle or neuron and/or to groups of neurons and/or interneurons.

As used herein "epidural" means situated upon the dura or in very close proximity to the dura. The term "epidural stimulation" refers to electrical epidural stimulation. In certain embodiments epidural stimulation is referred to as "electrical enabling motor control" (eEmc).

The term "transcutaneous stimulation" or "transcutaneous electrical stimulation" or "cutaneous electrical stimulation" refers to electrical stimulation applied to the skin, and, as typically used herein refers to electrical stimulation applied to the skin in order to effect stimulation of the spinal cord or a region thereof. The term "transcutaneous electrical spinal cord stimulation" may also be referred to as "tSCS". The term "pcEmc" refers to painless cutaneous electrical stimulation.

The term "motor complete" when used with respect to a spinal cord injury indicates that there is no motor function below the lesion, (e.g., no movement can be voluntarily induced in muscles innervated by spinal segments below the spinal lesion.

The term "monopolar stimulation" refers to stimulation between a local electrode and a common distant return electrode.

The term "co-administering", "concurrent administration", "administering in conjunction with" or "administering in combination" when used, for example with respect to transcutaneous electrical stimulation, epidural electrical stimulation, and pharmaceutical administration, refers to administration of the transcutaneous electrical stimulation and/or epidural electrical stimulation and/or pharmaceutical such that various modalities can simultaneously achieve a physiological effect on the subject. The administered modalities need not be administered together, either temporally or at the same site. In some embodiments, the various "treatment" modalities are administered at different times. In some embodiments, administration of one can precede administration of the other (e.g., drug before electrical and/or magnetic stimulation or vice versa). Simultaneous physiological effect need not necessarily require presence of drug and the electrical and/or magnetic stimulation at the same time or the presence of both stimulation modalities at the same time. In some embodiments, all the modalities are administered essentially simultaneously.

The phrase "spinal cord stimulation" as used herein includes stimulation of any spinal nervous tissue, including spinal neurons, accessory neuronal cells, nerves, nerve roots, nerve fibers, or tissues, that are associated with the spinal cord. It is contemplated that spinal cord stimulation may comprise stimulation of one or more areas associated with a cervical vertebral segment.

As used herein, "spinal nervous tissue" refers to nerves, neurons, neuroglial cells, glial cells, neuronal accessory cells, nerve roots, nerve fibers, nerve rootlets, parts of nerves, nerve bundles, mixed nerves, sensory fibers, motor fibers, dorsal root, ventral root, dorsal root ganglion, spinal ganglion, ventral motor root, general somatic afferent fibers, general visceral afferent fibers, general somatic efferent fibers, general visceral efferent fibers, grey matter, white matter, the dorsal column, the lateral column, and/or the ventral column associated with the spinal cord. Spinal nervous tissue includes "spinal nerve roots," that comprise any one or more of the 31 pairs of nerves that emerge from the spinal cord. Spinal nerve roots may be cervical nerve roots, thoracic nerve roots, and lumbar nerve roots.

DETAILED DESCRIPTION

Figure 1:
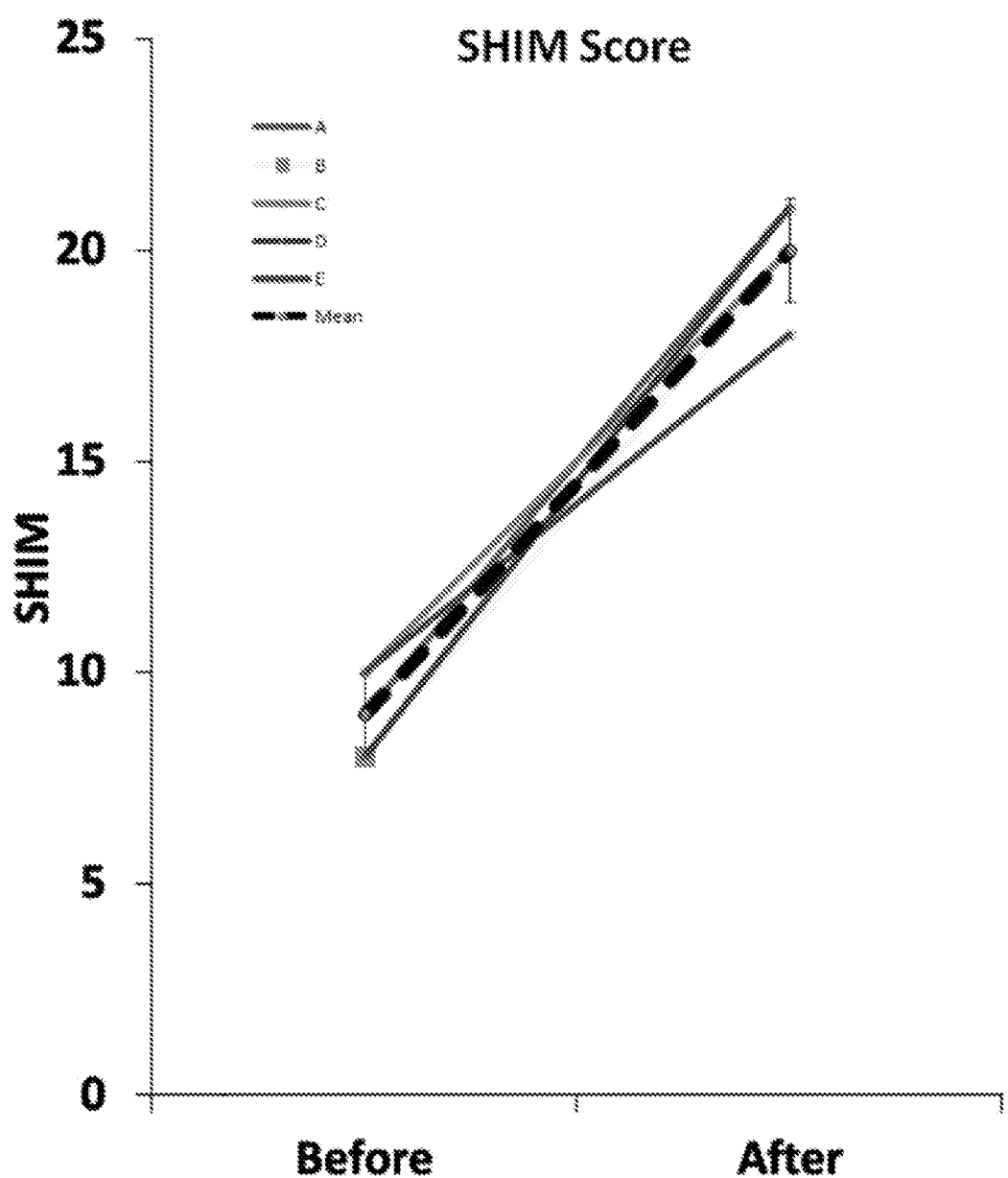
FIG. 1 shows that the Sexual Health Inventory for Men in 5 subjects demonstrated substantially improved sexual function after treatment that concomitantly improved volitional bladder function. Treatment is once weekly 1 Hz magnetic stimulation over T12-L1 vertebral body region. Assessment is taken before and after 4 weeks of once weekly intervention.

In various embodiments methods and devices are provided to improve or regain sexual function in healthy subjects with impaired sexual function, and/or in subjects with a neurodegenerative pathology and/or brain or spinal cord trauma. Such subjects include, inter alia, subjects with injury to the central nervous system (including brain stem and/or spinal cord) or degenerative neuromotor conditions (e.g., stroke, TBI, MS, ALS, Parkinson's disease, Alzheimer's disease, and the like). In certain embodiments the methods and devices can be used to improve or regain sexual function in subjects that are otherwise healthy (e.g., It was discovered that stimulation with devices that impart a magnetic field (e.g., at a frequency range from about 0.5 Hz up to about 100 Hz) can facilitate bladder and sexual function. More surprisingly it was discovered that repeated treatments with magnetic stimulation can over time increase volitional control of sexual function. Once volitional control of sexual function is realized, repeated periodic treatments (e.g., weekly, every 10 days, biweekly, etc.) can maintain this volitional control. It will be recognized that in this context volitional control of sexual function does not mean the subject can cause an rejection any time at will, but rather than an erection can be obtained without electrical and/or magnetic stimulation. In certain embodiments an erection can be obtained without electrical and/or magnetic stimulation and/or pharmaceutical administration.

Without being bound to a particular theory, it is believed that enabling the spinal circuitry can produce a coordinated behavior that is more complete and physiologic than stimulation of individual nerve roots or the peripheral nerves. Moreover, the existing devices have the disadvantages of being invasive, producing a subset of the desired locomotor or micturition behavior, and do not result in enduring plastic changes to the circuitry that allow patients to become device independent.

It was discovered that stimulation of the spinal cord can be leveraged to restore sexual function and address erectile function in subjects with traumatic brain or spinal cord injury (e.g., traumatic brain injury, spinal cord injury, stroke) or disease (amyotrophic lateral sclerosis, multiple sclerosis), and age. Additionally, it was demonstrated that non-invasive (e.g., magnetic) stimulation of the spinal cord, e.g., with parameters described herein can restore normal physiologic function.

Further, stimulation of the sympathetic plexus or paravertebral trunk, in addition to spinal cord or nerve roots can be performed to address pain conditions by the parameters listed. Furthermore, in cases of erectile or orgasmic dysfunction, nerves such as the pudendal nerve, sacral nerve roots, or spinal cord can be accessed. In particular, it was discovered, inter alia, that:

1. Non-invasive stimulation (with magnetic stimulation or electrical stimulation) of the cervical, thoracic, lumbar (vertebral body designation) spinal cord and associated nerve roots, sympathetic and parasympathetic (autonomic) plexus/ganglia and combination thereof results in improvement of erection and sexual function.
2. Stimulation with electrical current (e.g., 10 kHz constant-current bipolar rectangular stimulus) from a range of 1 Hz to 100 Hz enabled erections and sexual function.
3. Stimulation with magnetic stimulator, generating a magnetic field, within a range of 1 Hz to 100 Hz enabled micturition, enabled erections and sexual function.

It is also believed that other forms of spinal cord, nerve root, autonomic ganglia stimulation can enable sexual function and address erectile dysfunction in a variety of settings.

Additionally, locomotor training can accentuate the effects of stimulation.

In particular it was demonstrated that magnetic stimulation of the spinal cord can restore and/or improve sexual function as assessed by the Sexual Health Inventory for Men (SHIM) (see, e.g., FIG. 1). SHIM is a widely used scale for screening and diagnosis of erectile dysfunction (ED) and severity of ED in clinical practice and research. The International Index of Erectile Function (IIEF) is a widely used, multidimensional self-report instrument for the evaluation of male sexual function (Rosen et al. (1997) *Urology,* 49: 822-830; Rosen et al. (2002) *Int. J. Impot. Res.* 14: 226-244.). Briefly, the IIEF, which consists of 15 items and five domains, is a psychometrically valid and reliable instrument that was developed through consultations with an international panel of experts for use in determining efficacy of treatment in controlled clinical trials. The IIEF has high sensitivity for detecting real treatment effects and has been adopted as the gold standard treatment outcome measure for clinical trials in ED, regardless of the type of treatment intervention or study population under investigation. Designed originally and specifically for use in clinical trials, the full-scale IIEF required simplification and abbreviation in order to be adopted in broad clinical practice as a diagnostic measure for ED or as a simple office screening tool.

The National Institutes of Health's Consensus Panel on ED outlined several goals for basic and clinical research on ED (see, e.g., Manack et al. (2011) *Neurourology & Urodynamics* 30: 395-401). One of these goals was to create a staging system for the quantitative and qualitative classification of ED to improve clinical decision making and patient care. With the purpose of creating a staging system for the quantitative and qualitative classification of ED to improve clinical decision making and patient care, an abridged five-item version of the 15-item IIEF known as the IIEF-5—or the Sexual Health Inventory for Men (SHIM)—was developed and validated as a brief, easily administered, patient-reported diagnostic tool (see, e.g., Table 1, and Rosen et al. (1999) *Int. J. Impot. Res.* 11: 319-326).

TABLE 1

The Sexual Health Inventory for Men (SHIM).

PATIENT INSTRUCTIONS SUBJECT INITIALS: _____
DATE COMPLETED: _/_/_ DD/MM/YR
Sexual health is an important part of an individual's overall physical and emotional well-being. Erectile dysfunction, also known as impotence, is one type of very common medical
condition affecting sexual health. Fortunately, there are many different treatment options for erectile dysfunction. This questionnaire is designed to help you and your doctor identify if you may be experiencing erectile dysfunction. If you are, you may choose to discuss treatment options with your doctor.
Each question has several possible responses. Circle the number of the response that best describes your own situation. Please be sure that you select one and only one response for
each question.

OVER THE PAST 6 MONTHS:

1) How do you rate your confidence that you could get and keep an erection?

| Very Low | Low | Moderate | High | Almost |
|---|---|---|---|---|
| 1 | 2 | 3 | 4 | always or always |
| | | | | 5 |

2) When you had erections with sexual stimulation, how often were your erections hard enough for penetration (entering your partner)?

| No sexual activity | Almost never or never | A few times (much less than half the time) | Sometimes (about half the time) | Most times (much more than half the time) | Almost always or always |
|---|---|---|---|---|---|
| 0 | 1 | 2 | 3 | 4 | 5 |

3) During sexual intercourse, how often were you able to maintain your erection after you had penetrated (entered) you partner?

| Did not attempt intercourse | Almost never or never | A few times (much less than half the time) | Sometimes (about half the time) | Most times (much more than half the time) | Almost always or always |
|---|---|---|---|---|---|
| 0 | 1 | 2 | 3 | 4 | 5 |

TABLE 1-continued

The Sexual Health Inventory for Men (SHIM).

4) During sexual intercourse, how difficult was it to maintain your erection to completion of intercourse?

| Did not attempt intercourse 0 | Extremely difficult 1 | Very difficult 2 | Difficult 3 | Slightly difficult 4 | Not difficult 5 |
|---|---|---|---|---|---|

5) When you attempted sexual intercourse, how often was it satisfactory for you?

| Did not attempt intercourse 0 | Almost never or never 1 | A few times (much less than half the time) 2 | Sometimes (about half the time) 3 | Most times (much more than half the time) 4 | Almost always or always 5 |
|---|---|---|---|---|---|

SCORE: Add the numbers corresponding to questions 1-5. If your score is 21 or less, you may want to speak with your doctor.

Diagnostic evaluations of the SHIM have shown it to have high sensitivity and specificity, moderate-to-high correlations with (and better reliability than) a single-item self-assessment of ED severity, and tangible correlations (as expected) with improvement in erections and with treatment satisfaction for both patient and partner (Rosen et al. (1999) *Int. J. Impot. Res.* 11: 319-326; Cappelleri et al. (2001) *Clin. Ther.* 23: 1707-1719).

In view of the sensitivity, specificity and correlation with sexual function of the SHIM, the fact that magnetic stimulation produces a marked improvement in SHIM score (see, e.g., FIG. 1) it is demonstrated that magnetic stimulation can initiate, and/or improve, and/or restore sexual function.

Initiation and/or Maintenance, and/or Restoration of Sexual Function.

As explained above, the orchestrated neuromuscular control of sexual function by the sensory, motor and autonomic nervous systems can be impaired by degenerative or traumatic changes, such as multiple sclerosis, spinal cord injury, stroke. It was discovered that stimulation of the spinal cord and, optionally, associated nerve roots can restore voluntary control of sexual function.

In particular, it was discovered, inter alia, that non-invasive (e.g., magnetic or transcutaneous electrical) stimulation of the cervical, thoracic, lumbar (vertebral body designation) spinal cord and associated nerve roots and combination thereof, results in an improvement in and/or restoration of sexual function. In particular it was observed that electrical stimulation with (10 kHz constant-current bipolar rectangular stimulus) from a range of 1 Hz to 100 Hz enabled sexual function.

In certain embodiments an improvement in sexual function indicates and improvement in the ability to initiate and/or to maintain an erection (e.g., as compared to the ability to initiate and/or to maintain an erection in the absence of treatment(s) as described herein). In certain embodiments an improvement in sexual function is characterized by an improvement in the score of the subject on the 15-item IIEF, or on the IIEF-5—or the Sexual Health Inventory for Men (SHIM).

Magnetic Stimulation to Restore Sexual Function.

More generally, it was discovered that that stimulation of the spinal cord with devices that impart a magnetic field (e.g., at a frequency range from about 0.5 Hz up to about 100 Hz) can improve and/or restore sexual function.

More surprisingly it was discovered that repeated treatments with magnetic stimulation can over time increase volitional control of sexual function. Once volitional control of sexual function is realized, repeated periodic treatments (e.g., weekly, every 10 days, biweekly, etc.) can maintain this volitional sexual function.

Accordingly, in various embodiments methods of facilitating sexual function in a subject with a neuromotor disorder are provided where the methods involve providing magnetic stimulation of the spinal cord at a location, frequency and intensity sufficient to facilitate sexual function. In certain embodiments the magnetic stimulation comprises stimulation at a frequency ranging from about 0.5 Hz up to about 100 Hz to to facilitate sexual function and in certain embodiments the magnetic stimulation is at a frequency of about 1 Hz.

In certain embodiments the magnetic stimulation comprises magnetic pulses ranging in duration from about 5 μs, or from about 10 μs, or from about 15 μs, or from about 20 μs up to about 1 ms, or up to about 750 μs, or up to about 500 μs, or up to about 400 μs, or up to about 300 μs, or up to about 200 μs, or up to about 100 μs. or up to about 50 μs. In certain embodiments the magnetic pulses are about 25 μs in duration.

In certain embodiments the magnetic stimulation is monophasic, while in other embodiments, the magnetic stimulation is biphasic.

In certain embodiments a a single treatment of magnetic stimulation comprises 1, or 2, or 3, or 4, or 5, or 6, or 7, or 8, or 9, or 10 or more continuous stimulation periods. In various embodiments the continuous stimulation periods range in duration from about 10 sec, or from about 20 sec, or from about 3 sec or from about 40 sec, or from about 50 sec, or from about 1 min, or from about 2 minutes up to about 10 minutes, or up to about 8 minutes, or up to about 6 minutes. In certain embodiments the continuous stimulation periods are about 4 minutes in duration. In certain embodiments the delay between continuous stimulation periods ranges from about 2 sec, or from about 5 sec, or from about 10 sec, or from about 15 sec, or from about 20 sec up to about 5 minutes, or up to about 4 minutes, or up to about 3 minutes, or up to about 2 minutes, or up to about 1 min, or up to about 45 sec, or up to about 30 sec. In certain embodiments the delay between continuous stimulation periods is about 30 sec.

It was discovered that repeating the treatment can progressively increase subsequent volitional control of sexual function (e.g., permits volitional voiding at a later time without magnetic (or electrical) stimulation). Conversely removal of repetitive treatments can result in progressive loss of volitional control. Accordingly, in certain embodiments the treatment is repeated (e.g., repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days). In certain embodiments the treatment is repeated over a period of at least 1 week, or at least two weeks, or at least 3 weeks, or at least 4 weeks, or at least 5 weeks, or at least 6 weeks, or at least 7 weeks, or at least 8 weeks, or at least 9 weeks, or at least 10 weeks, or at least 11 weeks, or at least 12 weeks, or at least 4 months, or at least 5 months, or at least 6 months, or at least 7 months, or at least 8 months, or at least 9 months, or at least 10 months, or at least 11 months, or at least 12 months. In certain embodiments the treatment is repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days until the subject obtains volitional control of sexual function. In certain embodiments the treatment is repeated daily, or every 2 days, or every 3 days, or every 4 days, or every 5 days, or every 6 days, or every 7 days, or every 8 days, or every 9 days, or every 10 days, or every 11 days, or every 12 days, or every 13 days, or every 14 days until the subject obtains their maximal volitional control of sexual function.

In certain embodiments, once volitional control is achieved, the frequency of treatment can be reduced to a "maintenance" level. Typically, the frequency of treatment is is reduced to a level sufficient to maintain volitional control (e.g., a desired level of volitional control) of sexual function. In certain embodiments the frequency of treatment is reduced to every three days, or to a weekly treatment, or to about every 10 days, or to about every 2 weeks.

In certain embodiments the magnetic stimulation is applied over the thoracic and/or lumbosacral spinal cord.

In certain embodiments the magnetic stimulation magnetic stimulation is applied over one or more regions straddling or spanning a region selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T11-T11, T11-T12, and T12-T12.

In addition to or in alternative to the regions identified above, in certain embodiments the magnetic stimulation is applied over one or more regions straddling or spanning a region selected from the group consisting of L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6.

In addition to or in alternative to the regions identified above, in certain embodiments the magnetic stimulation is applied over one or more regions straddling or spanning a region selected from the group consisting of C0-C1, C0-C2, C0-C3, C0-C4, C0-C5, C0-C6, C0-C7, C0-T1, C1-C1, C1-C2, C1-C3, C1-C4, C1-C7, C1-C6, C1-C7, C1-T1, C2-C2, C2-C3, C2-C4, C2-C5, C2-C6, C2-C7, C2-T1, C3-C3, C3-C4, C3-C5, C3-C6, C3-C7, C3-T1, C4-C4, C4-C5, C4-C6, C4-C7, C4-T1, C5-C5, C5-C6, C5-C7, C5-T1, C6-C6, C6-C7, C6-T1, C7-C7, and C7-T1.

In certain embodiments the magnetic stimulation is applied over a region between T11 and L4. In certain embodiments the magnetic stimulation is applied over one or more regions selected from the group consisting of T11-T12, L1-L2, and L2-L3. In certain embodiments the magnetic stimulation is applied over L1-L2 and/or over T11-T12. In certain embodiments the magnetic stimulation is applied over L1.

In certain embodiments the magnetic stimulation is applied at the midline of spinal cord. In various embodiments the magnetic stimulation produces a magnetic field of at least about 0.5 tesla, or at least about 0.6 tesla, or at least about 0.7 tesla, or at least about 0.8 tesla, or at least about 0.9 tesla, or at least about 1 tesla, or at least about 2 tesla, or at least about 3 tesla, or at least about 4 tesla, or at least about 5 tesla. In certain embodiments the magnetic stimulation is at a frequency of at least about 0.5 Hz, 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz.

Accordingly, in certain embodiments, methods of facilitating sexual function are provided where the methods involve providing magnetic stimulation of the spinal cord at a location, frequency and intensity sufficient to facilitate sexual function. In certain embodiments the magnetic stimulation is at a single location. In certain embodiments the magnetic stimulation is at multiple locations (e.g., brain stem and thoracic region, etc.). In certain embodiments the stimulation location is characterized/verified by the observation or suppression of hyperactive BCR or normalization of BCR.

In certain embodiments the spinal cord stimulation can facilitate initiation of voiding of the bowel and/or bladder. In certain embodiments the spinal cord stimulation improves the efficacy of sexual function. Also, in certain embodiments the magnetic stimulation is of a frequency and magnitude sufficient to restore volitional control of sexual function in the absence of stimulation.

Illustrative Stimulation Parameters.

In certain embodiments the methods described herein utilize magnetic stimulators for stimulation of the spinal cord (e.g., spinal circuits) to facilitate sexual function. Magnetic spinal cord stimulation is achieved by generating a rapidly changing magnetic field to induce a current at the region(s) of interest. In certain embodiments effective spinal cord stimulation typically utilizes a current transient of about $10^8$ A/s or greater discharged through a stimulating coil. The discharge current flowing through the stimulating coil generates magnetic lines of force. As the lines of force cut through tissue (e.g., the spinal cord or brain stem), a current is generated in that tissue. If the induced current is of sufficient amplitude and duration such that the cell membrane is depolarized, neural/neuromuscular tissue will be stimulated.

Since the magnetic field strength falls off with the square of the distance from the stimulating coil, the stimulus strength is at its highest close to the coil surface. The stimulation characteristics of the magnetic pulse, such as depth of penetration, strength and accuracy, depend on the rise time, peak electrical energy transferred to the coil and the spatial distribution of the field. The rise time and peak coil energy are governed by the electrical characteristics of the magnetic stimulator and stimulating coil, whereas the spatial distribution of the induced electric field depends on the coil geometry and the anatomy of the region of induced current flow.

In various embodiments the magnetic nerve stimulator will produce a field strength up to about 10 tesla, or up to about 8 tesla, or up to about 6 tesla, or up to about 5 tesla, or up to about 4 tesla, or up to about 3 tesla, or up to about 2 tesla, or up to about 1 tesla, or up to about 0.8 tesla, or up to about 0.6 tesla, or up to about 0.5 tesla. In certain embodiments the nerve stimulator produces pulses with a duration from about 5 µs, or from about 10 µs, or from about 15 µs, or from about 20 µs up to about 10 ms, or from about 25 µs up to about 500 µs, or from about 25 µs or to about 100 µs, or from about 100 µs up to about 1 ms.

In certain embodiments the magnetic stimulation is at a frequency of at least about 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz.

In certain embodiments the magnetic stimulation is at a frequency ranging from about 0.5 Hz, or from about 1 Hz, or from about 2 Hz, or from about 3 Hz, or from about 4 Hz, or from about 5 Hz, or from about 10 Hz, or from about 10 Hz, or from about 10 Hz, up to about 500 Hz, or up to about 400 Hz, or up to about 300 Hz, or up to about 200 Hz up to about 100 Hz, or up to about 90 Hz, or up to about 80 Hz, or up to about 60 Hz, or up to about 40 Hz, or from about 3 Hz or from about 5 Hz up to about 80 Hz, or from about 5 Hz to about 60 Hz, or up to about 30 Hz.

In certain embodiments the magnetic stimulation is at a frequency ranging from about 1 Hz or from about 10 Hz, or from about 20 Hz or about 30 Hz up to about 90 Hz or to about 100 Hz.

In certain embodiments the magnetic stimulation is at a frequency, pulse width, and amplitude sufficient to initiate and/or improve sexual function. In certain embodiments the stimulation is at a frequency, pulse width, and amplitude sufficient to provide at least 30% improvement or at least 40% improvement, or at least 50% improvement, or at least 60% improvement, or at least 70% improvement, or at least 80% improvement, or at least 90% improvement, or at least 95% improvement, or at least 98% improvement in SHIM score.

Magnetic Stimulators.

Magnetic nerve stimulators are well known to those of skill in the art. Stimulation is achieved by generating a rapidly changing magnetic field to induce a current at the nerve of interest. Effective nerve stimulation typically requires a current transient of about $10^8$ A/s. In certain embodiments this current is obtained by switching the current through an electronic switching component (e.g., a thyristor or an insulated gate bipolar transistor (IGBT)).

Figure 5:
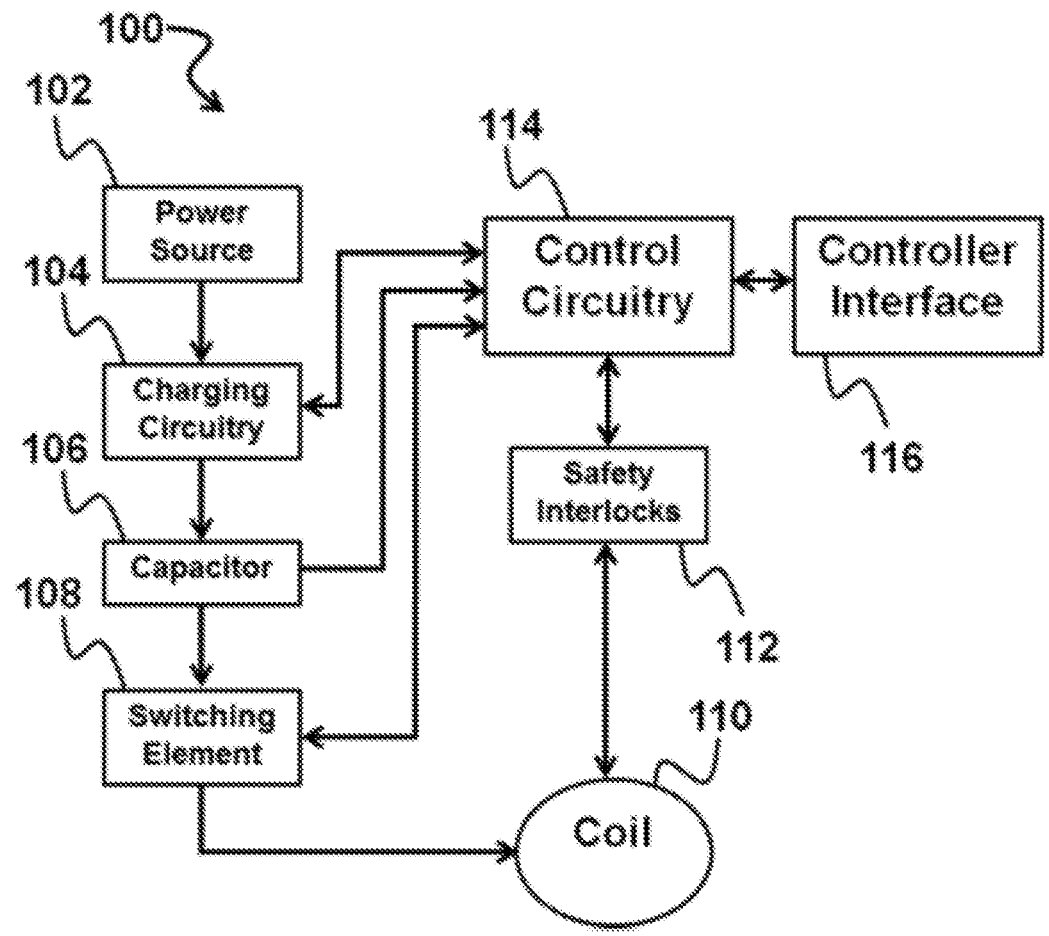
FIG. 5 shows a schematic illustration of one illustrative embodiment of a magnetic nerve stimulator.

FIG. 5 schematically shows one illustrative, but non-limiting embodiment of a magnetic stimulator. As shown therein, magnetic nerve stimulator 100 comprises two parts: a high current pulse generator producing discharge currents of, e.g., 5,000 amps or more; and a stimulating coil 110 producing magnetic pulses (e.g., with field strengths up to 4, 6, 8, or even 10 tesla) and with a pulse duration typically ranging from about 100 µs to 1 ms or more, depending on the stimulator type. As illustrated in FIG. 5, a voltage (power) source 102 (e.g., a battery) charges a capacitor 106 via charging circuitry 104 under the control of control circuitry 114 (e.g., a microprocessor) that accepts information such as the capacitor voltage, power set by the user, and various safety interlocks 112 within the equipment to ensure proper operation, and the capacitor is then connected to the coil via an electronic switching component 108 when the stimulus is to be applied. The control circuitry is operated via a controller interface 116 that can receive user input and/optionally signals from external sources such as internet monitors, health care professionals, and the like.

When activated, the discharge current flows through the coils inducing a magnetic flux. It is the rate of change of the magnetic field that causes the electrical current within tissue to be generated, and therefore a fast discharge time is important to stimulator efficiency.

As noted earlier the magnetic field is simply the means by which an electrical current is generated within the tissue, and that it is the electrical current, and not the magnetic field, that causes the depolarization of the cell membrane and thus the stimulation of the target nerve.

Since the magnetic field strength falls off with the square of the distance from the stimulating coil, the stimulus strength is at its highest close to the coil surface. The stimulation characteristics of the magnetic pulse, such as depth of penetration, strength and accuracy, depend on the rise time, peak electrical energy transferred to the coil and the spatial distribution of the field. The rise time and peak coil energy are governed by the electrical characteristics of the magnetic stimulator and stimulating coil, whereas the spatial distribution of the induced electric field depends on the coil geometry and the anatomy of the region of induced current flow.

The stimulating coils typically consist of one or more well-insulated copper windings, together with temperature sensors and safety switches.

In certain embodiments the use of single coils is contemplated. Single coils are effective in stimulating the human motor cortex and spinal nerve roots. To date, circular coils with a mean diameter of 80-100 mm have remained the most widely used magnetic stimulation. In the case of circular coils the induced tissue current is near z on the central axis of the coil and increases to a maximum in a ring under the mean diameter of coil.

A notable improvement in coil design has been that of the double coil (also termed butterfly or figure eight coil). Double coils utilize two windings, normally placed side by side. Typically double coils range from very small flat coils to large contoured versions. The main advantage of double coils over circular coils is that the induced tissue current is at its maximum directly under the center where the two windings meet, giving a more accurately defined area of stimulation.

The stimulating pulse may be monophasic, biphasic or polyphasic. Each of these has its own properties and so may be useful in particular circumstances. For neurology, single pulse, monophasic systems are generally employed; for rapid rate stimulators, biphasic systems are used as energy must be recovered from each pulse in order to help fund the next. Polyphasic stimulators are believed to have a role in a number of therapeutic applications.

Descriptions of magnetic nerve stimulators can be found, inter alia, in U.S. patent publications US 2009/0108969 A1, US 2013/0131753 A1, US 2012/0101326 A1, IN U.S. Pat. Nos. 8,172,742, 6,086,525, 5,066,272, 6,500,110, 8,676,324, and the like. Magnetic stimulators are also commercially availed from a number of vendors, e.g., MAGVENTURE®, MAGSTIM®, and the like.

Transcutaneous Electrical Stimulation.

In certain embodiments the transcutaneous electrical stimulation of the spinal cord (e.g., spinal circuits) is used to improve or restoring sexual function in a subject with impaired sexual function, where the subject does not have a neuromotor disorder. Thus, in certain embodiments, the transcutaneous stimulation is used in a subject that does not have a brain and/or spinal cord injury.

In various embodiments, the methods described herein involve transcutaneous electrical stimulation of the cervical spine or a region of the cervical spine and/or the thoracic spinal cord or a region of the thoracic spinal cord, and/or a region of the lumbosacral spinal cord as described herein to to improve or restoring sexual function (e.g., as described above).

In certain embodiments the transcutaneous stimulation is at a frequency of at least about 1 Hz, or at least about 2 Hz, or at least about 3 Hz, or at least about 4 Hz, or at least about 5 Hz, or at least about 10 Hz, or at least about 20 Hz or at least about 30 Hz or at least about 40 Hz or at least about 50 Hz or at least about 60 Hz or at least about 70 Hz or at least about 80 Hz or at least about 90 Hz or at least about 100 Hz, or at least about 200 Hz, or at least about 300 Hz, or at least about 400 Hz, or at least about 500 Hz.

In certain embodiments the transcutaneous stimulation is at a frequency ranging from about 1 Hz, or from about 2 Hz, or from about 3 Hz, or from about 4 Hz, or from about 5 Hz, or from about 10 Hz, or from about 10 Hz, or from about 10 Hz, up to about 500 Hz, or up to about 400 Hz, or up to about 300 Hz, or up to about 200 Hz up to about 100 Hz, or up to about 90 Hz, or up to about 80 Hz, or up to about 60 Hz, or up to about 40 Hz, or from about 3 Hz or from about 5 Hz up to about 80 Hz, or from about 5 Hz to about 60 Hz, or up to about 30 Hz. In certain embodiments the transcutaneous stimulation is at a frequency ranging from about 20 Hz or about 30 Hz to about 90 Hz or to about 100 Hz.

In certain embodiments the transcutaneous stimulation is applied at an intensity ranging from about 5 mA or about 10 mA up to about 500 mA, or from about 5 mA or about 10 mA up to about 400 mA, or from about 5 mA or about 10 mA up to about 300 mA, or from about 5 mA or about 10 mA up to about 200 mA, or from about 5 mA or about 10 mA to up about 150 mA, or from about 5 mA or about 10 mA up to about 50 mA, or from about 5 mA or about 10 mA up to about 100 mA, or from about 5 mA or about 10 mA up to about 80 mA, or from about 5 mA or about 10 mA up to about 60 mA, or from about 5 mA or about 10 mA up to about 50 mA.

In certain embodiments the transcutaneous stimulation comprises pulses having a width that ranges from about 100 µs up to about 1 ms or up to about 800 µs, or up to about 600 µs, or up to about 500 µs, or up to about 400 µs, or up to about 300 µs, or up to about 200 µs, or up to about 100 µs, or from about 150 µs up to about 600 µs, or from about 200 µs up to about 500 µs, or from about 200 µs up to about 400 µs.

In certain embodiments the transcutaneous stimulation is at a frequency, pulse width, and amplitude sufficient to initiate and/or improve standing, stepping, sitting, laying down, stabilizing sitting posture, stabilizing standing posture, arm motion, hand motion, griping, hand strength, and the like) and/or to induce or improve voiding of the bowel and/or bladder. In certain embodiments the stimulation is at a frequency, pulse width, and amplitude sufficient to provide at least 30% emptying or at least 40% emptying, or at least 50% emptying, or at least 60% emptying, or at least 70% emptying, or at least 80% emptying, or at least 90% emptying, or at least 95% emptying, or at least 98% emptying of the bladder and/or bowel e.g., upon application of electrical stimulation as described herein.

In certain embodiments the transcutaneous stimulation is superimposed on a high frequency carrier signal. In certain embodiments the high frequency carrier signal ranges from about 3 kHz, or about 5 kHz, or about 8 kHz up to about 30 kHz, or up to about 20 kHz, or up to about 15 kHz. In certain embodiments the carrier signal is about 10 kHz. In certain embodiments the carrier frequency amplitude ranges from about 30 mA, or about 40 mA, or about 50 mA, or about 60 mA, or about 70 mA, or about 80 mA up to about 300 mA, or up to about 200 mA, or up to about 150 mA.

Accordingly, in certain embodiments, the transcutaneous stimulation is applied as a high frequency signal that is pulsed at a frequency ranging from about 1 Hz up to about 100 Hz as described above. In one illustrative but non-limiting embodiment, the stimulation is a 1 Hz transcutaneous electrical stimulation evoked with a 10 kHz constant-current bipolar rectangular stimulus for 0.5 ms at 30 to 100 mA repeated at 1-40 times per second for 10 to 30 s. This results in a low (2% or less) duty cycle that is well tolerated. In certain embodiments the voltage is approximately 30 V at 100 mA. In certain embodiments each stimulation epoch is repeated 1-10, or 1-5 times per session, once per week for, e.g., 6-12 weeks.

Use of Neuromodulatory and Other Agents.

Neuromodulators.

In certain embodiments, the stimulation methods described herein are used in conjunction with various pharmacological agents, particularly pharmacological agents that have neuromodulatory activity (e.g., are monoamergic). In certain embodiments, the use of various serotonergic, and/or dopaminergic, and/or noradrenergic and/or GABAergic, and/or glycinergic drugs is contemplated. These agents can be used in conjunction with stimulation methods described above. In certain embodiments this combined approach can help to put the spinal cord in an optimal physiological state to initiate and/or to restore, and/or to maintain sexual function.

In certain embodiments, the drugs are administered systemically, while in other embodiments, the drugs are administered locally, e.g., to particular regions of the spinal cord. Drugs that modulate the excitability of the spinal neuromotor networks include, but are not limited to combinations of noradrenergic, serotonergic, GABAergic, and glycinergic receptor agonists and antagonists. Illustrative pharmacological agents include, but are not limited to agonists and antagonists to one or more combinations of serotonergic: 5-HT1A, 5-HT2A, 5-HT3, and 5HT7 receptors; to noradrenergic alpha-1 and -2 receptors; and to dopaminergic D1 and D2 receptors (see, e.g., Table 2).

TABLE 2

Illustrative pharmacological agents.

| Name | Target | Action | Route | Typical Dose (mg/Kg) | Typical Range (mg/kg) |
|---|---|---|---|---|---|
| Serotonergic receptor systems | | | | | |
| 8-OHDPAT | 5-HT1A7 | Agonist | S.C. | 0.05 | 0.045-0.3 |
| Way 100.635 | 5-HT1A | Antagonist | I.P. | 0.5 | 0.4-1.5 |
| Quipazine | 5-HT2A/C | Agonist | I.P. | 0.2 | 0.18-0.6 |
| Ketanserin | 5-HT2A/C | Antagonist | I.P. | 3 | 1.5-6.0 |
| SR 57227A | 5-HT3 | Agonist | I.P. | 1.5 | 1.3-1.7 |
| Ondanesetron | 5-HT3 | Antagonist | I.P. | 3 | 1.4-7.0 |
| SB269970 | 5-HT7 | Antagonist | I.P. | 7 | 2.0-10.0 |
| Noradrenergic receptor systems | | | | | |
| Methoxamine | Alpha1 | Agonist | I.P. | 2.5 | 1.5-4.5 |
| Prazosin | Alpha1 | Antagonist | I.P. | 3 | 1.8-3.0 |
| Clonidine | Alpha2 | Agonist | I.P. | 0.5 | 0.2-1.5 |
| Yohimbine | Alpha2 | Antagonist | I.P. | 0.4 | 0.3-0.6 |
| Dopaminergic receptor systems | | | | | |
| SKF-81297 | D1-like | Agonist | I.P. | 0.2 | 0.15-0.6 |
| SCH-23390 | D1-like | Antagonist | I.P. | 0.15 | 0.1-0.75 |
| Quinipirole | D2-like | Agonist | I.P. | 0.3 | 0.15-0.3 |
| Eticlopride | D2-like | Antagonist | I.P. | 1.8 | 0.9-1.8 |

Other Agents.

In certain embodiments the methods described herein are used in combination with the administration of various agents known to improve sexual function. Illustrative agents include, but are not limited to one or more drugs for treatment of an erectile dysfunction (e.g., tadalafil (CIALIS®), sildenafil (VIAGRA®), vardenafil (STAXYN®, LEVITRA®), alprostadil (CAVERJECT IMPULSE®), and the like).

The foregoing methods are intended to be illustrative and non-limiting. Using the teachings provided herein, other methods involving spinal stimulation and/or the use of neuromodulatory agents to initiate, and/or to restore, and/or to improve sexual function will be available to one of skill in the art.

EXAMPLES

The following examples are offered to illustrate, but not to limit the claimed invention.

Example 1

A Pilot Study of Transcutaneous Magnetic Spinal Cord Stimulation for Neurogenic Bladder Abstract of Example 1

Patients with chronic spinal cord injury (SCI) cannot urinate at will and empty the bladder by self-catheterization. They suffer diminished quality of life and increased risk of urinary infections and bladder trauma. We tested the hypothesis that non-invasive, transcutaneous magnetic spinal cord stimulation (TMSCS) would improve bladder function in individuals with SCI.

Five individuals with American Spinal Injury Association Impairment Scale A/B, chronic SCI and detrusor sphincter dyssynergia who were unable to urinate voluntarily enrolled in this prospective, interventional study. After a two-week assessment to determine effective stimulation characteristics, each patient received sixteen weeks of weekly TMSCS and then received "sham" weekly stimulation for six weeks while bladder function was monitored.

Bladder function was assessed with urodynamic studies and patient diaries. The primary outcome was voluntary urination volume per day.

Bladder function improved in all five subjects, but only during and after repeated weekly sessions of 1 Hz TMSCS. All subjects achieved volitional urination. After 16 weeks of TMSCS, the volume of urine produced voluntarily increased from 0 cc/day to 1120 cc/day (p=0.03); self-catheterization frequency decreased from 6.6/day to 2.4/day (p=0.04); the capacity of the bladder increased from 244 ml to 404 ml (p=0.02); and the average quality of life ranking increased significantly (p=0.007).

Volitional bladder function was re-enabled in five individuals with SCI following intermittent, non-invasive TMSCS. Voluntary bladder control ceased after TMSCS stopped. We conclude that neuromodulation of spinal micturition circuitry by TMSCS may be used to ameliorate bladder function.

Background

Spinal cord injury (SCI) leads to long-term disabilities with significant social and economic consequences. After SCI, bladder dysfunction is common and improved bladder function consistently ranks as the top quality of life priority in individuals with SCI (see, e.g., Simpson et al. (2012) *J. Neurotrauma*, 29: 1548-1555; Bloemen-Vrencken et al. (2005) *Disabil. & Rehab.* 27: 1381-1389). Patients with a neurogenic bladder following SCI often catheterize themselves to empty the bladder, and urinary tract infections and obstructive uropathies are common (see, e.g. Manack et al. (2011) *Neurourology & Urodynamics* 30: 395-401; Anderson (2004) *J. Neurotrauma*, 21: 1371-1383; Nicolle (2014) *Curr. Infect. Dis. Rep.* 16: 390). Direct muscle stimulation (see, e.g., Bartley et al. (2013) *Nat. Rev. Urol.*, 10: 513-521), stimulation of peripheral nerves (see, e.g., Brindley (1974) *J. Physiol.* 237: 15-16), or rhizotomy (see, e.g., Van Kerrebroeck et al. (1996) *J. Urol.*, 155: 1378-1381) to restore bladder function all have limitations: they are invasive, cause significant morbidity, resect functional sacral nerves (rhizotomy), which sacrifices sexual function, and are indicated only in selected patients. Most of these interventions fail to restore the complex, orchestrated sequence of muscle contraction and relaxation that normal, voluntary micturition requires (see, e.g. Seth et al. (2013) *Handbook of clinical neurology*, 117: 111-117).

Recently, epidural spinal cord stimulation has been used to enhance motor function in individuals with chronic SCI (see, e.g., Harkema et al. (2011) *Lancet* 377: 1938-1947; Angeli et al. (2014) *Brain: A J. Neurol.* 137: 1394-409; Lu et al. (2016) *Neurorehab. & Neural Repair*, 30: 951-962. It was our hypothesis that spinal networks have the capacity to execute a range of complicated movements requiring detailed coordination among motor pools within the spine with minimal or even no input from the brain, and electrical or magnetic stimulation of the spine restores coordinated activation of these spinal circuits. Epidural electrical stimulation can activate micturition in rodents (Gad et al. (2014) *PloS one* 9: e108184), but epidural stimulation is invasive and costly. Transcutaneous electrical stimulation can activate descending motor pathways non-invasively in paraplegic individuals, but such stimulation can be painful, and the spread of electrical current may activate other susceptible structures with adverse or painful consequences (Gerasimenko et al. (2015) *J. Neurotrauma*, 32: 1968-1980).

Magnetic stimulation can also be used to modulate neural circuits, and with figure-eight coils, the energy can be targeted to some extent. Moreover, transcutaneous magnetic stimulation is non-invasive and painless. Transcranial magnetic stimulation (TMS) has been used to modulate neuronal function in a variety of settings from migraine treatment (Zhu & Marmura (2016) *Curr. Neurol. Neurosci. Rep.* 16: 11) to depression (Perera et al. (2016) *Brain Stim.* 9: 336-346) to restoration of motor function after ischemic stroke (Kim et al. (2016) *J. Stroke*, 18: 220-226). In the current study, we used transcutaneous magnetic spinal cord stimulation (TMSCS) to stimulate the lumbar spine to try to improve bladder function in five patients with SCI who were unable to urinate voluntarily. We hypothesized that neuromodulation of the spine using TMSCS would allow these patients to achieve voluntary micturition and reduce or eliminate the need for bladder self-catheterization.

Methods.

Five individuals with American Spinal Injury Association Impairment Scale (AIS) A/B chronic, motor complete, SCI and detrusor sphincter dyssynergia (DSD), who were dependent on bladder self-catheterization, were enrolled in this prospective, interventional study. Subjects and the person delivering TMSCS were blinded to treatment, and each subject acted as his own control. After a two-week assessment phase to determine the effective frequency of TMSCS, each patient received sixteen weekly TMSCS treatments using the effective stimulation frequency during the treatment phase and then received "sham" weekly stimulation for six weeks in the follow-up phase of the study. Each session of TMSCS consisted of three 4-minute periods of TMSCS interrupted by 1-minute rest periods between stimulations.

TMSCS consisted of monophasic, single 250 μsec pulses of magnetic energy delivered at either 1 Hz or 30 Hz depending on the phase of the study. The intensity of TMSCS varied between 40 and 60% of the maximum delivered by the device based on what each patient could tolerate. Bladder function was assessed with urodynamic studies, and the bulbocavernousus reflex (BCR) and spinally evoked muscle activity were elicited during TMSCS at the beginning and end of the 16-week treatment period. Subjects completed quality of life metrics at intervals during the study and kept a diary of bladder-related functions throughout the study. The primary outcome was voluntary urination volume per day. Pre-specified secondary outcomes included urine stream flow rate, bladder capacity, catheterizations per day, sexual health inventory for men (SHIM), and urinary incontinence quality of life scale (iQOL).

Results:

Demographic information and indices of bladder function for all five subjects are shown in Table 3. The average duration of SCI was 8.8±7.5 years. None of the subjects had been able to void voluntarily since the time of injury as shown in at least three prior urodynamic studies in each subject.

Figure 2:
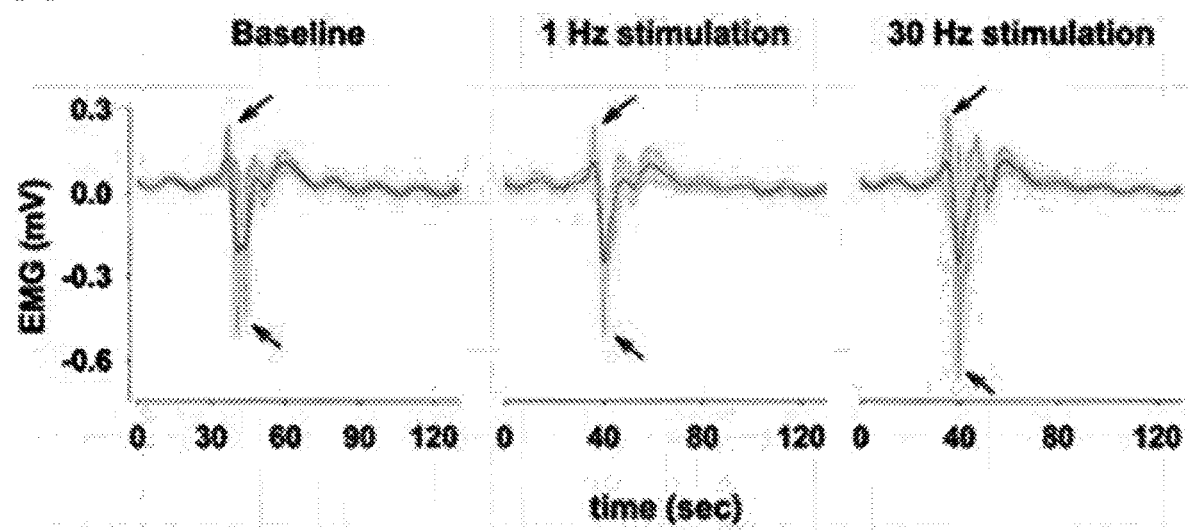
FIG. 2, panels A-C: An example of the BCR amplitude (panel A), which is measured from the perineal muscle EMG activity, obtained from subject C at baseline and during low frequency (1 Hz) and high frequency (30 Hz) TCSMS of the lumbar spine at the end of the assessment phase of the study. The BCR was elicited serially >100 times, and the mean (solid black line) ±2 times the SD (cyan shading) are shown for each stimulation condition. The average and standard deviation of BCR responses to 1 and 30 Hz TCSMS (panel B), expressed as a percent of the baseline value in each subject, are shown below after 16 weeks of 1 Hz TCSMS when the BCR amplitude was significantly reduced during 1 Hz TCSMS compared to 30 Hz TCSMS. Student's t-test: *=$p<0.0001$, n.s.=non-significant, N=100 BCR cycles. BCR=bulbocavernosus reflex. Examples of evoked EMG activity from a single subject in selected muscles are shown in panel C. Lumbar TCSMS at 1 Hz elicited significant EMG activity, but 30 Hz TCSMS did not alter EMG activity. Ensemble averages of EMG activity (solid black line) ±2 times the SD (cyan shading) were derived from greater than 100 cycles of stimulation. The stimulus artifacts are shown in the 30 Hz stimulation sequences since stimulation occurred multiple times within the recording window (large black spikes). The left (L) peroneal, left vastus lateralis, right (R) vastus lateralisl and left quadriceps femoris muscles were recorded.
Figure 2:
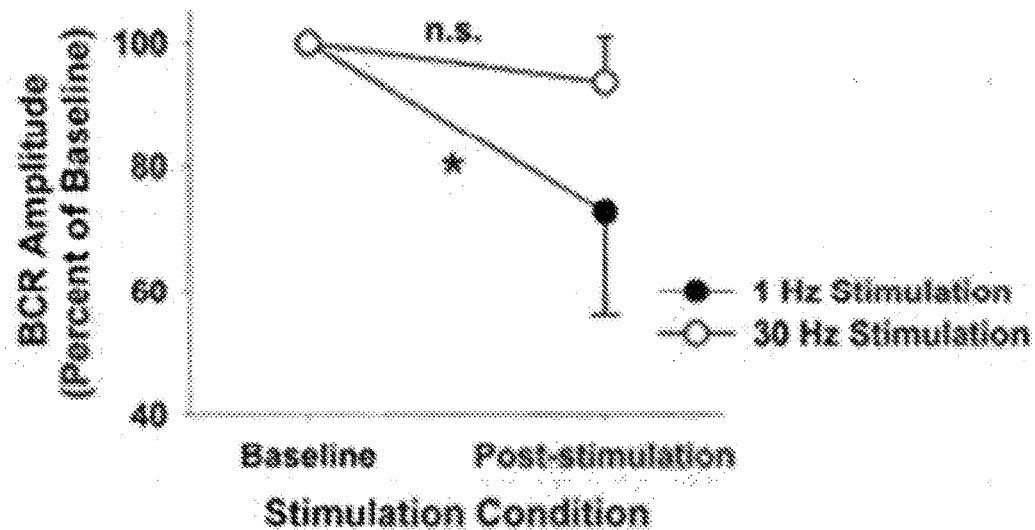

Spinal Function Before and After 16 Week TMSCS:

The bulbocavernosus reflex (BCR) is disinhibited and pathologically hyperactive after SCI (FIG. 2). The BCR amplitude was significantly reduced after 16 weeks of 1 Hz TMSCS in all five subjects (p<0.001). In contrast, high frequency stimulation either increased the BCR amplitude or had no significant effect. The average BCR latency was 35.2±5.3 ms during both 1 Hz and 30 Hz TMSCS, which is similar to the latency of the BCR in normal individuals (see, e.g., Granata et al. (2013) *Func. Neurol.* 28: 293-295).

During 1 Hz TMSCS, spinal cord evoked potentials could be elicited in selected lower extremity muscle groups (perineal, vastus lateralis and quadriceps femoris); whereas we were unable to detect any spinal evoked potentials at 30 Hz stimulation (FIG. 2).

Figure 3:
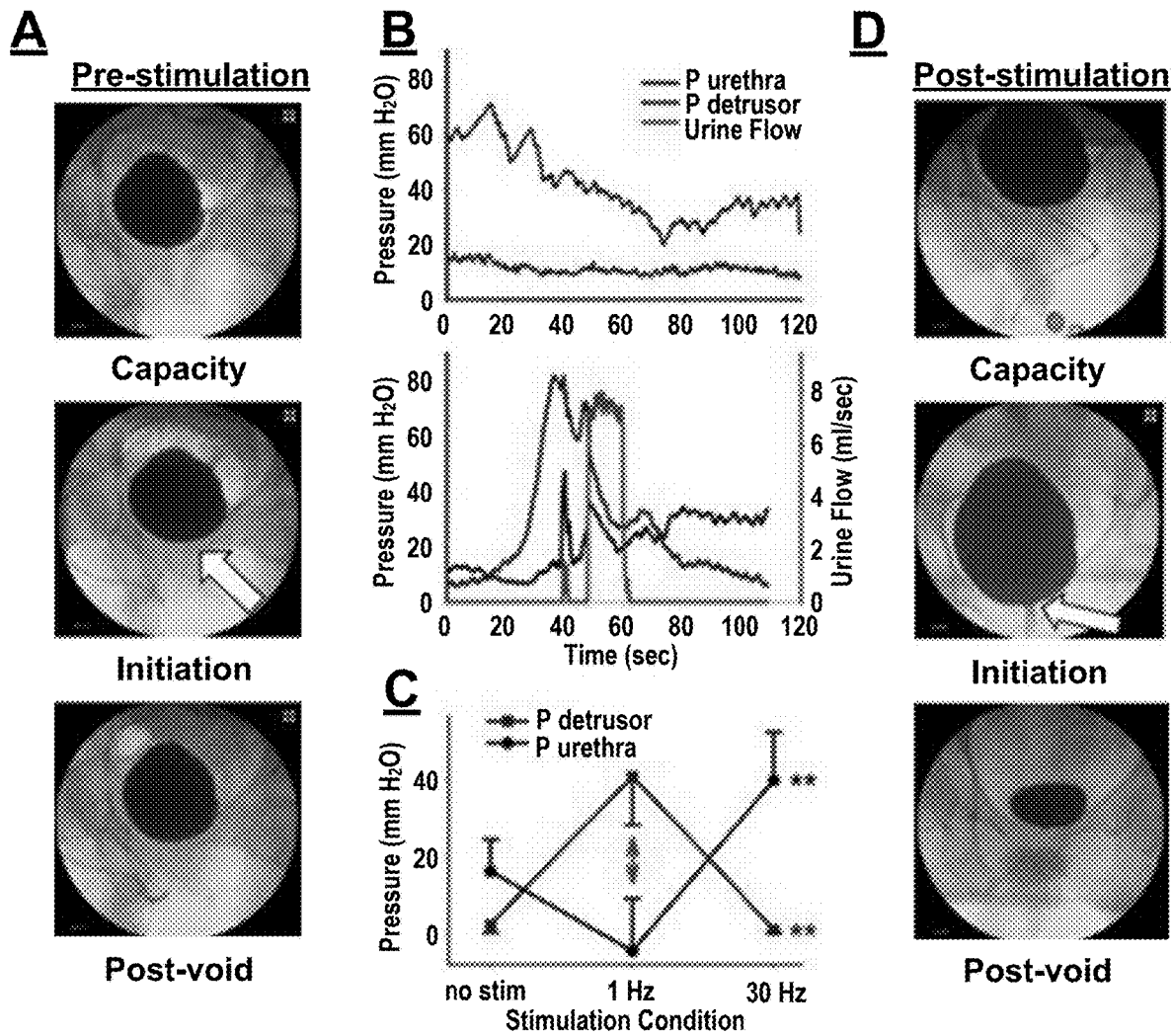
FIG. 3, panels A-D: Examples of video urodynamics are shown from patient A (panel A—before the 16 week TMSCS treatment and panel D—after the 16 week TMSCS treatment). The first video images in each sequence show the pre-voiding bladder capacity, which increased after TMSCS. The second images show the initiation of volitional voiding and opening the bladder neck (white arrows), and the final images show the post-void residuals. In panel B, examples of urine flow (red line); urethral pressure (black line) and detrusor pressure (blue line) are shown before (upper graph) and after the 16-week TCSMS treatment (lower graph). Note that detrusor pressure remained below urethral pressure before TMSCS, and no urine flow was generated; whereas detrusor pressure exceeded urethral pressure and urine flow was generated after 16 weeks of TMSCS. The average urethral and detrusor pressures±SD obtained during efforts to void after the 16-week TMSCS treatment are shown in panel C during baseline and 1 and 30 Hz TMSCS. The detrusor pressure rose significantly and the urethral pressure fell significantly only during 1 Hz TMSCS compared to the non-stimulated condition and the 30 Hz condition (**; $p<0.0001$), but the baseline, unstimulated state and the 30 Hz condition did not differ from each other based on an ANOVA and specific comparisons using Tukey's HSD.

Bladder Function Before, During and after TMSCS:

The urethral (P urethra) and detrusor pressures (P detrusor) obtained during urodynamic testing during volitional micturition were significantly different during high and low frequency TMSCS (FIG. 3). In all five individuals, stimulation at a low frequency resulted in a sustained increase in detrusor pressure and minimal or no effect on the urethral pressure. Stimulation at high frequency had the opposite effect: urethral pressure increased significantly, but detrusor pressure was not modified by 30 Hz stimulation. Increasing detrusor contraction and bladder pressure while simultaneously decreasing urethral pressure simulates and allows voluntary micturition (FIG. 3). Based on the BCR response, the evoked EMG activity and the response of urethral and detrusor pressures, only 1 Hz TMSCS was used for weekly TMSCS during the treatment period.

Figure 4:
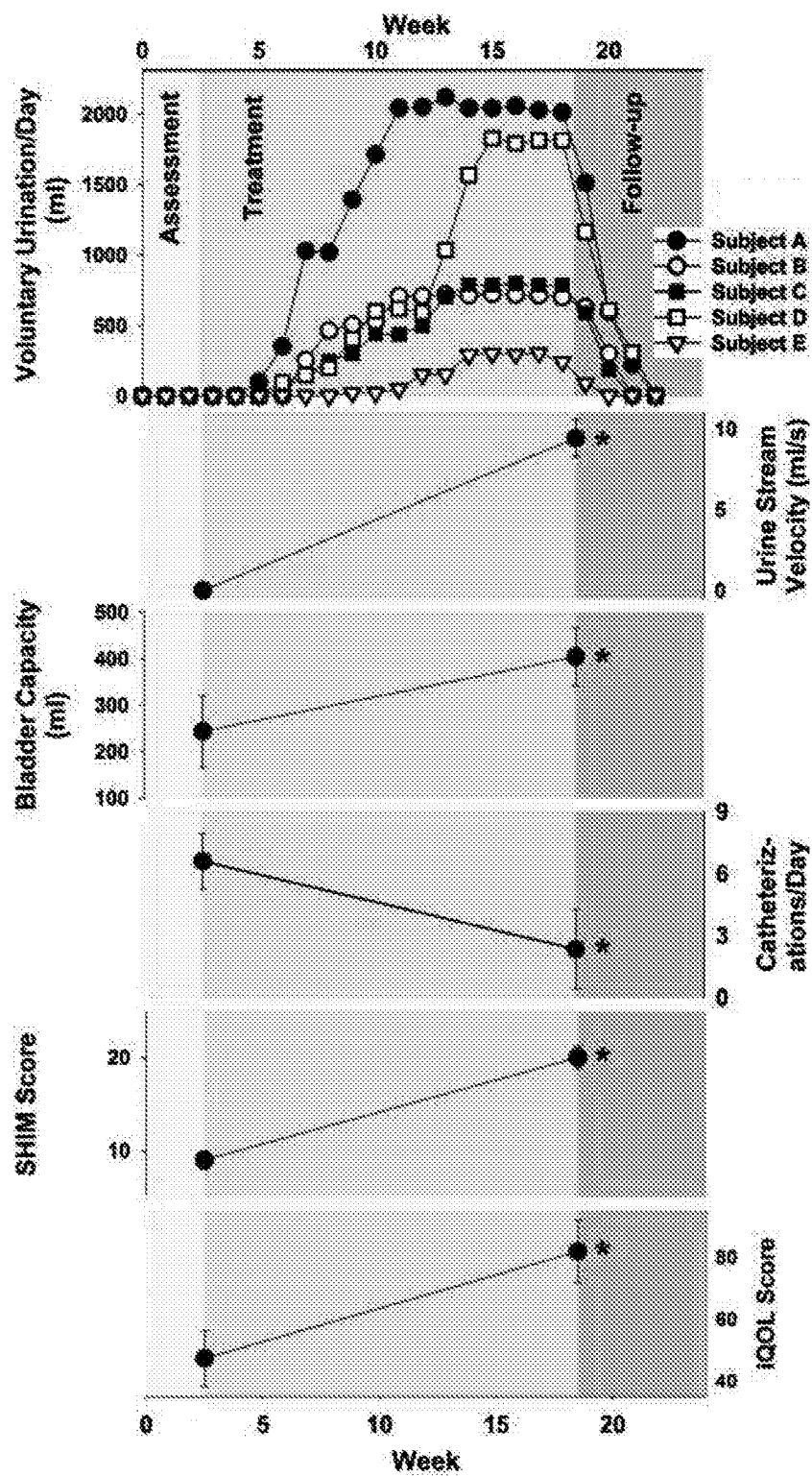
FIG. 4. Summary of urological functions for all five subjects and average daily volitional micturition volume for all five subjects during follow-up phase; all changes were statistical significant when tested with paired t-tests ($p<0.05$; see Results for details). The top panel shows the timing of recovery and loss of voluntary control of micturition and the volume of urine produced each day as a function of time. All five subjects recovered the capacity to urinate voluntarily, and about 2-3 weeks after the termination of TMSCS, the capacity to urinate voluntarily declined rapidly back to the baseline (unable to void voluntarily). The remaining panels indicate the initial value of each variable before the start of TMSCS and after 16 weeks of TMSCS. The urine stream velocity and the bladder capacity (both measured during urodynamic studies) increased significantly ($p<0.05$) after 16 weeks of TMSCS. The number of self-catheterizations diminished significantly ($p<0.05$), and the SHIM Score and the iQOL, both quality of life measures, increased significantly ($p<0.05$) after 16 weeks of TMSCS.

All five subjects achieved at least some volitional urination following 16 weeks of bladder rehabilitation with TMSCS (FIG. 4). No subject achieved volitional urination until at least 4 weekly TMSCS treatments had been given, and the capacity to urinate voluntarily was restored in all 5 subjects on average 5.6±1.5 weeks after TMSCS was begun. The capacity to urinate voluntarily was maintained throughout the 16-week treatment period.

Daily self-catheterization decreased from 6.6 times per day at baseline to 2.4 times per day at the conclusion of the 16-week bladder rehabilitation (p=0.04). Based on urodynamic studies conducted at the end of the TMSCS treatment, the average volume of urine generated voluntarily increased from 0 cc/day to 1120 cc/day (p=0.03), and the subjects were able to generate significant urine stream velocities, which rose on average from 0 cc/sec to 9.3 cc/sec (p<0.001).

The bladder capacity increased from 244 ml to 404 ml (p=0.02). Sexual function also improved from 9 to 20 as measured by Sexual Health Inventory for Men (SHIM) (p=0.0003) (see, e.g., FIG. 1). The subjects enjoyed a much higher quality of life; the average i-QOL score rose from 47 to 82 (p=0.007, FIG. 5). While all five subjects had improved bladder function and were able to achieve volitional micturition, their responses to TMSCS varied (the responsiveness order was A>D>B=C>E). This variation did not appear to be the result of differences in their AIS. (Table 3).

TABLE 3

Demographic information and the origin and nature of the SCI.
AIS = American Spinal Injury Association Impairment Scale.

| # | Sex | Age | Injury Level | AIS Grade | Injury Year | Mechanism of Injury |
|---|---|---|---|---|---|---|
| A | M | 42 | T4 | A | 1994 | MVA |
| B | M | 43 | T4 | A | 2012 | Wrestling |
| C | M | 22 | C5 | B | 2009 | Football |
| D | M | 25 | C6 | B | 2009 | MVA |
| E | M | 23 | C7 | A | 2012 | MVA |

Improvements in urinary function were not instantaneous; progressive improvement became apparent over the course of the study. Initially, simultaneous measurements of urethral and bladder pressures during volitional urination attempts revealed little (if any) sustained bladder contraction and persistently elevated urethral pressures, but after completion of at least 4 weeks of effective TMSCS, subjects became better able to generate sustained bladder contractions although detrusor-sphincter dyssynergia persisted (increased bladder pressures, but also increased urethral pressures, which prevented bladder emptying). At the end of the 16-week rehabilitation period, subjects were able to produce voluntary, coordinated bladder contractions with high detrusor pressures and reduced urethral pressures. Since bladder pressure exceed urethral pressure, urine flow velocity was increased and significantly higher urine volumes were achieved. (FIG. 3)

The average time that volitional micturition was maintained after the sham stimulation began was 3.2±0.8 weeks. Follow-up diary entries confirmed that the ability to void voluntarily rapidly decayed in all subjects after the cessation of effective TMSCS, and no subject maintained the capacity for voluntary micturition five weeks after the last effective stimulation.

Additional Findings:

Subjects reported improved bowel function. Two of the subjects were able to have daily bowel movements without any assistance; two subjects were able to have bowel movements with minimal assistance; and one subject noted no change in bowel function. All of the subjects reported improved posture, reflected by improved ease of lateral transfer and increased duration of standing with and without assistance that correlated precisely with improved voluntary bladder control. These improvements were noted both by the subjects and by the physical therapists during each subject's motor rehabilitation sessions. There were no significant adverse events and no episodes of autonomic dysreflexia or priapism. The only negative effect reported was increased lower extremity spasms; however, the spasms remained tolerable.

Discussion:

Voluntary micturition requires complex, orchestrated neuromuscular control of the urinary bladder by sensory, motor and autonomic systems. This control is achieved through fronto-pontine-spinal cord projections to parasympathetic ganglia in the abdomen and to sympathetic and somatic neurons in the caudal spine. During voluntary micturition, sympathetic inhibition of bladder contraction is withdrawn, parasympathetic activation of the detrussor contraction emerges to increase vesicular pressure, and contraction of the urethral sphincter is inhibited to allow urine to flow out of the bladder. In individuals with SCI, coordination among parasympathetic, sympathetic and somatic nerve activities is lost: bladder pressure is elevated, but the bladder cannot be completely emptied because contraction of the external sphincter is not inhibited. Patients with SCI must perform multiple bladder self-catheterizations each day, which increases the risk and frequency of infection and traumatic injury to the urethra. Any decrease in catheterization frequency, which was achieved in all study subjects, represents a potential decrease in complications associated with catheterization.

Isolated regions of lumbosacral spinal cord contain circuits that are capable of carrying out complex motor activities (see, e.g., Lu et al. (2015) *Front. Mol. Neurosci.* 8: 25; Alaynick et al. (2011) *Cell,* 146:178-el; Sugaya & De Groat (1994) *Am. J. Physiol.* 266: R658-667). Furthermore, spinal cord injury in most AIS A SCI subjects is not anatomically complete, and many spinal circuits remain intact, especially those below the level of the spinal cord injury. In both animal and human subjects with chronic paralysis from SCI, motor movements have improved after invasive, epidural, electrical stimulations (see, e.g., Harkema et al. (2011) *Lancet* 377: 1938-1947; Angeli et al. (2014) *Brain: A J. Neurol.* 137: 1394-409; Lu et al. (2016) *Neurorehab. & Neural Repair,* 30: 951-962). In this study, we hypothesized that the spinal micturition circuit remains intact in subjects with SCI, and since this circuit is semiautonomous, we should be able to enhance activation of patterned muscle activities controlled by these circuits and activate or modulate them using TMSCS over the thoracolumbar spine. Voluntary bladder control was restored by TMSCS in all five individuals with chronic SCI. Four out of five subjects (80%) were able to decrease the frequency of self-catheterization by at least 50%. One subject was able to void normally without any self-catheterization while another subject only needed one catheterization each day.

Other attempts to restore urination in SCI patients by stimulating multiple peripheral nerves, specifically the pudendal, pelvic, hypogastric and tibial nerves (see, e.g., Schneider et al. (2015) *European Urol.* 68: 859-867; Kennelly et al. (2011) *J. Spinal Cor. Med.* 34: 315-321; Burks et al. (2010) Urologic Clinics North America, 37: 559-565; Spinelli et al. (2005) *Neurol. & Urodynam.* 24: 305-30922-25, did not consistently improve bladder function (Schurch et al. (2003) *World J. Urol.* 20: 319-322). Furthermore, sacral nerve modulation requires electrode implantation, which is invasive and risky (see, e.g., Bielefeldt (2016) *World J. Gastroint. Pharmacol. Therap.* 7: 294-305; Zeiton et al. (2016) *Int. J. Colorectal. Dis.* 31: 1005-10010; Eldabe et al. (2015) *Pain Med.* (Malden, Mass). 7(2): 325-336). TMSCS differs in that it is non-invasive and painless in patients with SCI. In addition, TMSCS provides more consistent and effective bladder emptying than epidural stimulation of selected peripheral nerves. TMSCS allowed volitional activation of a coordinated pattern of parasympathetic withdrawal and sympathetic activation and somatic muscle inhibition as demonstrated in urodynamic studies.

While the precise mechanism of TMSCS remains unknown, the coordinated activity of detrusor and sphincter muscles suggests that TMSCS works by activating or enhancing activation of central pattern generating circuits within the lumbosacral spinal cord and does not rely solely on activation of motor neurons or peripheral nerves. This hypothesis receives further support from the divergent responses to TMSCS at 1 Hz and 30 Hz: 1 Hz TMSCS resulted in decreased urethral pressure, increased detrusor pressure and micturition, as opposed to 30 Hz TMSCS, which increased urethral pressure, decreased detrusor pressure and enhanced urine storage within the bladder. The different stimulation frequencies elicited different bladder behaviors as if different CPGs or different aspects of a micturition CPG were activated. These divergent responses suggest that TMSCS may be applicable to a broader range of conditions such as hyperactive bladder, which may benefit from higher frequency stimulation.

The BCR is a polysynaptic reflex, and BCR amplitudes in our subjects were 10 to 100 times larger at baseline than in normal individuals. Hyperactivity of the BCR may be analogous to the hyperactivity of tendon reflexes following SCI and suggests that subjects with SCI have decreased supraspinal inhibition of the BCR. During low frequency TMSCS, the amplitude of the BCR decreased, from which we infer that TMSCS induced greater inhibition of the BCR.

Magnetic stimulation may achieve these effects by modulation of spinal interneurons via dorsal root ganglion (DRG) or dorsal column stimulation, which is a putative mechanism of action for epidural spinal cord stimulation, 30 or TMSCS may modulate responses within the sympathetic chain and sacral parasympathetic centers and facilitate the process of micturition.

Our subjects were able to urinate voluntarily in between treatment sessions when magnetic stimulation was not present. We believe that TMSCS persistently raised the activation state (or reduced inhibition) of the micturition circuit so that residual neural pathways between the supraspinal micturition centers and lumbosacral micturition central pattern generators were re-invigorated, which is consistent with previous findings using epidural stimulation to enhance motor function recovery.12 Restoration of voluntary micturition required repetitive TMSCS over at least 4 weeks. The benefits of epidural electric stimulations on motor function also required 3-5 sessions/weeks before improvements in motor functions were seen (Lu et al. (2016) Neurorehab. & Neural Repair, 30: 951-962). Once supraspinal to spinal communication had been restored or re-enabled by TMSCS, it remained enabled so long as the subject received some minimal amount of TMSCS during each weekly treatment session, but the benefits of TMSCS were not permanent. All subjects lost the ability to control micturition soon after the termination of effective TMSCS (FIG. 4). The temporal dynamics of the onset and offset of benefit of TMSCS are consistent with remodeling of the spinal circuitry in which some relatively slow neuronal or circuit remodeling is required to re-establish effective inhibition and re-establish effective supraspinal communication, and some aspect of TMSCS was necessary between periods of volitional bladder emptying to maintain the integrity of communication between supraspinal and lumbar micturition circuits. The once weekly treatment interval and stimulation protocol represent a surprisingly small recurrent input to maintain volitional micturition, but this schedule is feasible for patients, and TMSCS could be administered in weekly physical therapy sessions at low cost. In any event, neuronal plasticity or remodeling are well recognized in TMS studies, specifically with low frequency (1 Hz) stimulation (see, e.g., O'Shea et al. (2007) Neuron, 54: 479-490; Lee et al. (2003) J. Neurosci. 23: 5308-5318). These results and our study of hand function (Lu et al. (2016) Neurorehab. & Neural Repair, 30: 951-962) provide two examples of the capacity of neuromodulation of spinal circuits to enable volitional control of motor functions below the level of SCI.

The responses to TMSCS varied among our five subjects. While we do not have a precise explanation for this, we know that the variation was not a result of differences among the AIS (Subject A, B, E were all category A, but subject A improved much more than the other two).

The reasons for the variation are likely multifactorial, but perhaps most importantly, our subjects have variable amounts of residual spinal function. The current AIS is not sensitive to the subtleties of residual spinal functions among subjects.

The main limitations of our study are its small size and the lack of proof of the actual mechanism of action. As this is a pilot study, we plan to continue to expand the study and enroll additional subjects. Further studies will focus on the molecular and cellular processes that follow magnetic stimulation to investigate the precise mechanism of action of magnetic stimulation.

Conclusions

Bladder dysfunction is consistently the top negative factor in quality of life assessments by patients with SCI, and the ability of TMSCS to restore voluntary micturition is highly encouraging. TMSCS was able to restore some level of voluntarily control of bladder function and decreased the frequency of self-catheterization in five paraplegic individuals with injuries classified as AIS A or B who had been unable to urinate for as long as 28 years. While the exact mechanism of action remains unknown, it is clear that TMSCS modulated the complex behavior required to empty the bladder rather than just activating multiple peripheral nerves.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of improving or restoring sexual function in a subject with impaired sexual function, said method comprising:
   determining a first frequency of a magnetic stimulation based on a plurality of bulbocavernosus reflex (BCR) measurements corresponding to an application of one or more frequency values;
   applying the magnetic stimulation to the cervical and/or thoracic, and/or lumbosacral spinal cord wherein the magnetic stimulation is at the first frequency, the first frequency ranging from about 0.5 Hz up to about 100 Hz, and wherein the magnetic stimulation is sufficient to and effective to improve or restore a volitional control of sexual function in said subject;
   repeatedly applying the magnetic stimulation at the first frequency after a first interval of time has passed, the first interval of time comprising one or more days until the volitional control of sexual function is achieved;
   applying the magnetic stimulation to the cervical and/or thoracic, and/or lumbosacral spinal cord at a second frequency once the volitional control of sexual function is achieved, wherein the second frequency is less than the first frequency; and
   repeatedly applying the magnetic stimulation at the second frequency at a second interval of time to maintain the volitional control of sexual function, wherein the second interval of time is longer than the first interval of time.

2. The method of claim 1, wherein:
   said subject is a subject without a neuromotor disorder but having impaired sexual function; or
   said subject is a subject with erectile dysfunction (ED), but who is otherwise healthy; or
   said subject is a subject with erectile dysfunction (ED), who is diagnosed with a pathology associated with said ED, other than a neuromotor disorder; or
   said subject is a subject with erectile dysfunction (ED), who is diagnosed with a pathology selected from the group consisting of heart disease, atherosclerosis, high cholesterol, high blood pressure, diabetes, obesity, metabolic syndrome, Parkinson's disease, multiple sclerosis, prostate cancer or enlarged prostate; or
   said subject is a subject with erectile dysfunction after prostate biopsy; or
   said subject is a subject with a neuromotor disorder.

3. The method of claim 1, wherein:
   the magnetic stimulation initiates or increases/improves erectile function in a male; and/or
   said method mitigates erectile dysfunction; and/or
   said method improves a sexual health inventory for men (SHIM) score of said subject.

4. The method of claim 1, wherein:
at least one of the first frequency or the second frequency ranges from about 1 Hz, or from about 5 Hz, or from about 10 Hz up to about 100 Hz, or up to about 80 Hz, or up to about 60 Hz, or up to about 50 Hz, or up to about 40 Hz, or up to about 20.

5. The method of claim 1, wherein:
said method comprises a single period of continuous stimulation, or 2, or 3, or 4, or 5, or 6, or 7, or 8, or 9, or 10 or more periods of continuous stimulation wherein said single period of continuous stimulation or said 2, or 3, or 4, or 5, or 6, or 7, or 8, or 9, or 10 or more periods of continuous stimulation each range in duration from about 10 sec, or from about 20 sec, or from about 3 sec or from about 40 sec, or from about 50 sec, or from about 1 min, or from about 2 minutes up to about 30 minutes, or up to about 15 minutes, or up to about 10 minutes, or up to about 8 minutes, or up to about 6 minutes.

6. The method of claim 5, wherein:
a delay between said 2, or 3, or 4, or 5, or 6, or 7, or 8, or 9, or 10 or more periods of continuous stimulation ranges from about 5 sec, or from about 10 sec, or from about 15 sec, or from about 20 sec up to about 5 minutes, or up to about 4 minutes, or up to about 3 minutes, or up to about 2 minutes, or up to about 1 min, or up to about 45 sec, or up to about 30 sec; or
a delay between said 2, or 3, or 4, or 5, or 6, or 7, or 8, or 9, or 10 or more periods of continuous stimulation is about 30 sec.

7. The method of claim 1, wherein the magnetic stimulation is stopped and said improving or restoring of sexual function persists in the absence of the magnetic stimulation.

8. The method of claim 1, wherein the second interval of time is every three days, or a weekly treatment, or about every 10 days, or about every 2 weeks.

9. The method of claim 1, wherein:
the magnetic stimulation is applied over one or more regions straddling or spanning a region selected from the group consisting of T1-T1, T1-T2, T1-T3, T1-T4, T1-T5, T1-T6, T1-T7, T1-T8, T1-T9, T1-T10, T1-T11, T1-T12, T2-T2, T2-T3, T2-T4, T2-T5, T2-T6, T2-T7, T2-T8, T2-T9, T2-T10, T2-T11, T2-T12, T3-T3, T3-T4, T3-T5, T3-T6, T3-T7, T3-T8, T3-T9, T3-T10, T3-T11, T3-T12, T4-T4, T4-T5, T4-T6, T4-T7, T4-T8, T4-T9, T4-T10, T4-T11, T4-T12, T5-T5, T5-T6, T5-T7, T5-T8, T5-T9, T5-T10, T5-T11, T5-T12, T6-T6, T6-T7, T6-T8, T6-T9, T6-T10, T6-T11, T6-T12, T7-T7, T7-T8, T7-T9, T7-T10, T7-T11, T7-T12, T8-T8, T8-T9, T8-T10, T8-T11, T8-T12, T9-T9, T9-T10, T9-T11, T9-T12, T10-T10, T10-T11, T10-T12, T11-T11, T11-T12, T12-T12; or
the magnetic stimulation is applied over one or more regions straddling or spanning a region selected from the group consisting of L1-L1, L1-L2, L1-L3, L1-L4, L1-L5, L1-S1, L1-S2, L1-S3, L1-S4, L1-S5, L2-L2, L2-L3, L2-L4, L2-L5, L2-S1, L2-S2, L2-S3, L2-S4, L2-S5, L3-L3, L3-L4, L3-L5, L3-S1, L3-S2, L3-S3, L3-S4, L3-S5, L4-L4, L4-L5, L4-S1, L4-S2, L4-S3, L4-S4, L4-S5, L5-L5, L5-S1, L5-S2, L5-S3, L5-S4, L5-S5, S1-S1, S1-S2, S1-S3, S1-S4, S1-S5, S2-S2, S2-S3, S2-S4, S2-S5, S3-S3, S3-S4, S3-S5, S4-S4, S4-S5, and S5-S6; or
the magnetic stimulation is applied over one or more regions straddling or spanning a region selected from the group consisting of C0-C1, C0-C2, C0-C3, C0-C4, C0-C5, C0-C6, C0-C7, C0-T1, C1-C1, C1-C2, C1-C3, C1-C4, C1-C7, C1-C6, C1-C7, C1-T1, C2-C2, C2-C3, C2-C4, C2-C5, C2-C6, C2-C7, C2-T1, C3-C3, C3-C4, C3-C5, C3-C6, C3-C7, C3-T1, C4-C4, C4-C5, C4-C6, C4-C7, C4-T1, C5-C5, C5-C6, C5-C7, C5-T1, C6-C6, C6-C7, C6-T1, C7-C7, and C7-T1; or
the magnetic stimulation is applied over a region between T11 and L4; or
the magnetic stimulation is applied over one or more regions selected from the group consisting of T11-T12, L1-L2, and L2-L3; or wherein said magnetic stimulation is applied over L1-L2 and/or over T11-T12; or
the magnetic stimulation is applied over L1.

10. The method of claim 1, wherein said subject is administered one or more drugs for an erectile dysfunction.

11. The method of claim 2, wherein said subject has a spinal cord injury.

12. The method of claim 1, wherein the magnetic stimulation is applied by a magnetic stimulator disposed over the cervical and/or thoracic, and/or lumbosacral spinal cord.

13. The method of claim 1, wherein:
the magnetic stimulation comprises magnetic pulses ranging in duration from about 5 µs, or from about 10 µs, or from about 15 µs, or from about 20 µs up to about 500 µs, or up to about 400 µs, or up to about 300 µs, or up to about 200 µs, or up to about 100 µs, or up to about 50 µs; or
the magnetic pulses are about 25 µs in duration.

14. The method of claim 10, wherein said one or more drugs comprises:
a drug selected from the group consisting of tadalafil, sildenafil, vardenafil, and alprostadil; or
a monoaminergic agonist selected from the group consisting 8-hydroxy-2-(di-n-propylamino) tetralin, 4-(benzodioxan-5-yl) 1-(indan-2-yl) piperazine (S15535), N-{2-[4-(2-methoxyphenyl)-1-piperazinyl]ethyl}-N-(2-pyridinyl) cyclo-hexanecarboxamide, Quipazine, Ketanserin, 4-amino-(6-chloro-2-pyridyl)-1 piperidine hydrochloride, Ondanesetron, Buspirone, Methoxamine, Prazosin, Clonidine, Yohimbine, 6-chloro-1-phenyl-2,3,4,5-tetrahydro-1H-3-benzazepine-7,8-diol, 7-chloro-3-methyl-1-phenyl-1,2,4,5-tetrahydro-3-benzazepin-8-ol, Quinpirole, and Eticlopride.

* * * * *

UNITED STATES PATENT AND TRADEMARK OFFICE
CERTIFICATE OF CORRECTION

Page 1 of 1

PATENT NO. : 12,434,068 B2
APPLICATION NO. : 16/615765
DATED : October 7, 2025
INVENTOR(S) : Daniel C. Lu It is certified that error appears in the above-identified patent and that said Letters Patent is hereby corrected as shown below:

In the Specification

Column 4, Line 63, "C4-05" should be --C4-C5--.

Signed and Sealed this
Twenty-fifth Day of November, 2025

John A. Squires
*Director of the United States Patent and Trademark Office*